United States Patent
Yuschik et al.

(10) Patent No.: US 9,218,128 B1
(45) Date of Patent: Dec. 22, 2015

(54) METHOD AND SYSTEM FOR TRAINING USERS TO UTILIZE MULTIMODAL USER INTERFACES

(76) Inventors: Matthew John Yuschik, Cincinnati, OH (US); Cordell Amos Coy, Villa Hills, KY (US); Jayant M. Naik, Mason, OH (US); Karthik Narayanaswami, Cincinnati, OH (US); Ajay Warrier, Cincinnati, OH (US)

( * ) Notice: Subject to any disclaimer, the term of this patent is extended or adjusted under 35 U.S.C. 154(b) by 1079 days.

(21) Appl. No.: 12/394,508

(22) Filed: Feb. 27, 2009

Related U.S. Application Data

(63) Continuation of application No. 12/325,692, filed on Dec. 1, 2008, now abandoned.

(60) Provisional application No. 60/991,242, filed on Nov. 30, 2007.

(51) Int. Cl.
| | |
|---|---|
| *G06F 3/00* | (2006.01) |
| *G06F 3/0489* | (2013.01) |
| *G06F 9/44* | (2006.01) |
| G09B 9/00 | (2006.01) |
| G06N 99/00 | (2010.01) |
| G09B 5/00 | (2006.01) |
| G09B 5/06 | (2006.01) |
| H04M 3/51 | (2006.01) |
| G09B 19/00 | (2006.01) |

(52) U.S. Cl.
CPC .......... *G06F 3/04895* (2013.01); *G06F 9/4446* (2013.01); *G06N 99/005* (2013.01); *G09B 5/00* (2013.01); *G09B 5/06* (2013.01); *G09B 9/00* (2013.01); *G09B 19/0053* (2013.01); *H04M 3/5175* (2013.01); *H04M 3/5183* (2013.01)

(58) Field of Classification Search
CPC ..... G06F 3/04895; G06F 9/4446; G09B 5/00; G09B 5/06; G09B 9/00; G09B 19/0053; G06N 99/005; H04M 3/5183; H04M 3/5175
USPC .......................................................... 715/705
See application file for complete search history.

(56) References Cited

U.S. PATENT DOCUMENTS

| | | | | |
|---|---|---|---|---|
| 5,311,422 | A | * | 5/1994 | Loftin et al. ...................... 703/2 |
| 5,442,759 | A | * | 8/1995 | Chiang et al. ................. 705/326 |
| 5,493,658 | A | * | 2/1996 | Chiang et al. ................. 715/709 |

(Continued)

OTHER PUBLICATIONS

Schalk, T.B., "Voice Recognition in Cellular Mobile Telephones," Speech Technology, vol. 3(3) (Sep.-Oct. 1986) pp. 24-28.

(Continued)

*Primary Examiner* — Patrick Riegler
(74) *Attorney, Agent, or Firm* — Crowe & Dunlevy

(57) ABSTRACT

Training for a multimodal user interface may be organized into a plurality of modules. In embodiment, modules may include data corresponding to a "Push to Talk" tool, a set of data corresponding to navigation through a graphic user interface via voice input, and a set of data corresponding to entering data into a graphic user interface via voice input. Such training may be implemented in a variety of manners, including those which utilize data stored on a computer readable medium. Also, the structure and content of training may be streamlined and directed towards teaching a user to operate a multimodal user interface in an adequate manner. The structure and content of training may be configured to work in conjunction with the operation of a multimodal user interface being used in a real-time setting.

25 Claims, 35 Drawing Sheets

(56) References Cited

U.S. PATENT DOCUMENTS

| | | | |
|---|---|---|---|
| 5,535,422 A * | 7/1996 | Chiang et al. | 715/709 |
| 5,782,642 A * | 7/1998 | Goren | 434/307 R |
| 6,301,573 B1 * | 10/2001 | McIlwaine et al. | 706/61 |
| 6,914,975 B2 * | 7/2005 | Koehler et al. | 379/265.05 |
| 7,412,652 B2 * | 8/2008 | Habon et al. | 715/705 |
| 7,620,895 B2 * | 11/2009 | Adkins et al. | 715/709 |
| 7,707,033 B2 * | 4/2010 | Geurts | 704/241 |
| 8,023,636 B2 * | 9/2011 | Koehler et al. | 379/265.05 |
| 2002/0154153 A1 * | 10/2002 | Messinger et al. | 345/705 |
| 2003/0091163 A1 * | 5/2003 | Attwater et al. | 379/88.01 |
| 2004/0032431 A1 | 2/2004 | Hymes et al. | |
| 2005/0026129 A1 * | 2/2005 | Rogers | 434/322 |
| 2005/0027538 A1 * | 2/2005 | Halonen et al. | 704/275 |
| 2005/0181854 A1 * | 8/2005 | Moshal | 463/16 |
| 2005/0216269 A1 * | 9/2005 | Scahill et al. | 704/270.1 |
| 2005/0226398 A1 * | 10/2005 | Bojeun | 379/93.15 |
| 2008/0249782 A1 * | 10/2008 | Ativanichayaphong et al. | 704/275 |
| 2009/0013255 A1 | 1/2009 | Yuschik et al. | |

OTHER PUBLICATIONS

Office Action issued against U.S. Appl. No. 10/633,250 dated Feb. 21, 2007.
Final Office Action issued against U.S. Appl. No. 10/633,250 dated Jul. 17, 2007.
Office Action issued against U.S. Appl. No. 10/633,250 dated Dec. 12, 2007.
Final Office Action issued against U.S. Appl. No. 10/633,250 dated Jun. 25, 2008.
"Dragon Naturally Speaking 10 Standard," Nuance Communications, Inc. (2008) pp. 1-2.
U.S. Appl. No. 11/198,934, Aug. 5, 2005, Claridge et al.

* cited by examiner

| FILE SAVE CLOSE SEARCH QUIT |
| VOLUME: Increase  Decrease         PAGE: Next  Previous |

BASIC CONCEPTS

Page 10 of 10

Assessment Questions (1) How does PTT work? Select one answer from the following.
    (a) XXX
    (b) XXX
    (c) XXX (2) How would you describe your knowledge regarding PTT? Select one answer from the following.
    (a) XXX
    (b) XXX
    (c) XXX
    (d) XXX (3) How does AVA work? Select one answer from the following.
    (a) XXX
    (b) XXX
    (c) XXX
    (d) XXX (D) Do you have any questions regarding the subject matter explained to you? If yes, please enter your question below.

Click HERE when finished.

| Transcription | Annotations | PTT | Word | AVA Sentences | Error Handling | Timeliness | Empathy | Focus | Closure |
|---|---|---|---|---|---|---|---|---|---|
| I'd like to place delay delivery | Service Selection | | | | | | | | |
| Okay | | | | | | | | | |
| Uh this' Paul | FN | | | | | | | | |
| Last name is Sweatland ~ s w e a t l a n d | LN | | | | | | | | |
| Uh, three one oh Eight three nine One seven zero two | TN | | | | | | | | |
| The address is thirty seven fifty five westwood boulevard | ADDR | | | | | | | | |
| Los Angeles, California | | | | | | | | | |
| Uh it's apartment number four | AD | | | | | | | | |
| Oh can you hold on for one second | | | | | | | | | |
| Hello, ok I'm ready | | | | | | | | | |
| Uh the zipcode is nine zero three four | ZIP | | | | | | | | |
| Go ahead on February | Date2 | | | | | | | | |
| I'll just pick it up | Redel | | | | | | | | |
| Ok, yes, uh huh | | | | | | | | | |
| One nine zero eight | CN | | | | | | | | |
| Ok, thanks, bye | | | | | | | | | |

FIG. 14

Checklist - used to monitor the agent/learner
+ for competent, - for help needed, 0 if ok.
don't need to mark every agent action

Key skill set

+

PTT correctly used
correct AVA word(s)
use standard AVA sentences
transparently handle exceptions
respond in timely manner
show empathy yet move forward
get data to resolve the issue
close the call

−

ASR indicates no input
ASR has low confidence
use MUTE often
put caller on hold
pause longer then 10 secs
continue to chat on tangents
wait for data
let the customer talk on

602

| PTT | word | AVA sentences | error handling | timeliness | empathy | focus | closure |
|-----|------|---------------|----------------|------------|---------|-------|---------|
|     |      |               |                |            |         |       |         |
|     |      |               |                |            |         |       |         |
|     |      |               |                |            |         |       |         |
|     |      |               |                |            |         |       |         |

Agent Call Handling Skills

AVA Volume—Finding the Best Setting

Push to Talk Training

After Selecting the test scenario, click the PTT Button below to start speaking

What vocabulary words?: [Home Screen ▼]

Please say One of the following words

| | | | | |
|---|---|---|---|---|
| May|Can I help you? | Redeliver | Locations | Consumer Affairs Office | Track (the|that) Item |
| Clear Scratch|Voice Pad | Redelivery | Hours and Locations | Address Lookup | Track (the|that) Envelope |
| GoodBye | Complaint | Consumer Affair(s) | Change of Address | Track (the|that) Package |
| Thanks for calling | Document | | Package ID | |
| Thank you for calling | Service Request | | Tracking Number | |
| New Service | | | | |
| New Service issue | | | | |
| Query | | | | |
| Query Service(s) | | | | |

Push to talk

[ AVA ] [ AVA & Caller ]

Listen to your speech...
Speech characteristics...
AVA Heard...
Confidence is...
The Number is...

Applet Started                                    Internet

702 →

Bring up the PTT tool and practice a few times

1. Write down the original volume setting (baseline value)
Say the word "Delay Delivery" 5 times
Write down the confidence.
See if you get No Match.

703 →

2. Move the volume setting up one notch (louder gain)
Say the word "Delay Delivery" 5 times
Write down the confidence.
See if you get No Match.

| volume word | original | louder | softer |
|---|---|---|---|
| 1 Delay Delivery | | | |
| 2 Delay Delivery | | | |
| 3 Delay Delivery | | | |
| 4 Delay Delivery | | | |
| 5 Delay Delivery | | | |

3. Move the volume setting down two notch (softer gain)
Say the word "Delay Delivery" 5 times
Write down the confidence.
See if you get No Match.

4. Compare the confidence obd the No Match of the 3 settings.
A better settings is one without No Matches and with a higher confidence.
Mover the slider to that setting.

FIG. 16

| | Strgly disagree | disagree | neutral | agree | strgly agree |
|---|---|---|---|---|---|
| It was easy to speak to the computer. | | | | | |
| I like the normal system better than AVA. | | | | | |
| AVA had enough to show me it was useful. | | | | | |
| I would use voice more than the KB or mouse. | | | | | |

Check the box that best matches your opinion.

Outline of Training Modules

1. AVA Description -
   Screen shots
   AVA words - navigation and data entry
   Step-by-step transactions
   Streamlined transactions
   Review 802  2. Word Sequences -
   Review words
   PTT training tool
   Role-playing for standard transactions-agent + caller
   Transaction handling - words given to complete Interaction
   Error handling
   Assessment
804

3. Simulation of Caller Transactions -
   review PTT and words
   train step-by-step procedure
   assessment of PTT, words and step-by-step
   train streamline
   train error handling
   step-by-step for "live calls"
   more complex calls - 2 transactions
   error handling
   assessment
806

4. On-the-floor Coaching -
   Job Aid
   Call Control and Streamlining
   Error handling
   Closing a Call
808                                                                   800

5. Debrief and Remediation -
   Step-by-step
   Streamlining
   Error Handling
810

| concepts | training session | | | | |
|---|---|---|---|---|---|
| | 1 | 2 | 3 | 4 | 5 |
| AVA overview | x | | | | |
| ASR | x | x | | | |
| PTT | x | x | x | x | x |
| words | x | x | x | | |
| Screens | x | x | | | |
| Seq - step-by-step | | x | x | | x |
| Seq - stream lines | | x | x | | x |
| exception handling | | x | x | x | x |
| Sim - step-by-step | | | x | | |
| Sim - stream lining | | | x | | |
| work flow | | | | x | x |
| step - by - step / coach | | | | x | |
| Stream line / coach | | | | x | |

FIG. 18

METHOD AND SYSTEM FOR TRAINING USERS TO UTILIZE MULTIMODAL USER INTERFACES

PRIORITY

This application is a continuation of U.S. Non-provisional patent application Ser. No. 12/325,692, of the same title filed Dec. 1, 2008 by the present inventors, the disclosure of which is hereby incorporated by reference herein in its entirety, and which claims the benefit of U.S. Provisional Patent Application Ser. No. 60/991,242, entitled "Method and System for Training Users to Utilize Multimodal User Interfaces," filed Nov. 30, 2007, which is hereby incorporated by reference in its entirety.

FIELD OF THE INVENTION

The present application is directed to interactive training, and in particular, to methods and systems for computerized interactive skill training.

BACKGROUND

When enabling human-computer interactions, a variety of modalities are available, with different modalities having different strengths and difficulties. Due to the differing capabilities of various interfaces, systems have been created which allow users to utilize multiple modalities, thereby potentially allowing the strengths of one modality to compensate for the weaknesses in another. One such system is described in U.S. Non-provisional patent application Ser. No. 11/966,393, filed Dec. 28, 2007, Matthew Yuschik et al. (Method and System for Supporting Graphical User Interfaces), the disclosure of which is incorporated by reference in its entirety. Another such system is described in U.S. Non-provisional patent application Ser. No. 11/198,934 (Method and System for Processing Audio Via a Contract Service Representative Workstation) filed on Aug. 5, 2005, Phillip Claridge, the disclosure of which is incorporated by reference in its entirety. However while multimodal interfaces have the potential beneficial effect of allowing users to combine modality strengths, achieving that effect can require users to acquire new habits which may have to replace older, established techniques. Accordingly, there is a need in the art for a system, including a programmed computer, that provides a plurality of modules encompassing a method of training individuals in the use of multimodal interfaces.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings:

FIG. 4 depicts an exemplary multimodal user interface presented to a customer service representative while processing a customer's request;

FIG. 8 depicts a third exemplary user interface relating to learning to use a multimodal user interface;

FIG. 13 depicts an eighth exemplary user interface relating to learning to use a multimodal user interface;

FIG. 14 depicts an exemplary evaluation sheet that may be used in conjunction with a user's training of a multimodal user interface;

FIG. 15 depicts an exemplary skill category checklist that may be used during a user's training with a multimodal user interface;

FIG. 16 depicts an ninth exemplary user interface and instruction sheet therefore that both relate to learning to use a multimodal user interface;

FIG. 18 depicts an exemplary sequence of training to learn the operation of a multimodal user interface;

DETAILED DESCRIPTION OF EMBODIMENTS

Figure 1:
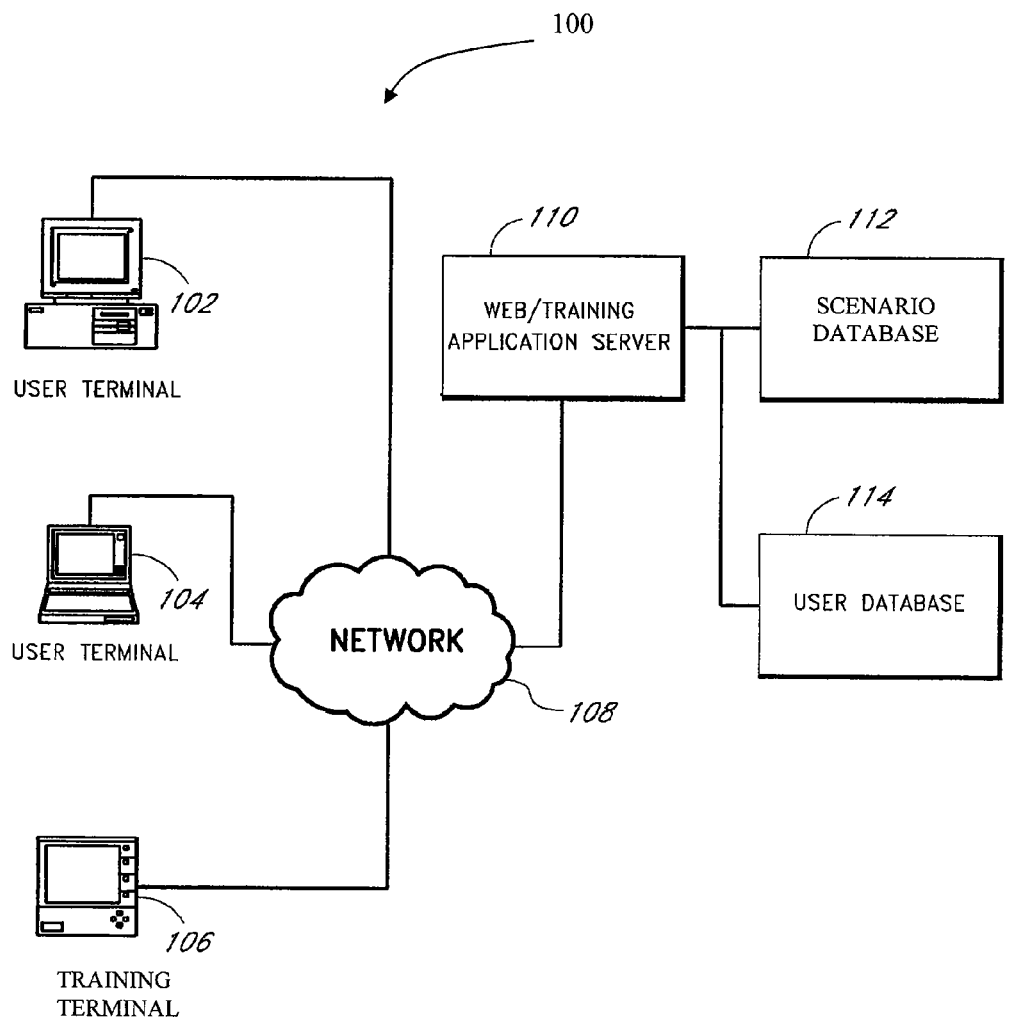
FIG. 1 depicts a partial schematic and block diagram of an exemplary dedicated computer network for executing a program according to some of the exemplary training programs described in the current application.

The following description of certain examples of the current application should not be used to limit the scope of the present invention as expressed in the appended claims. Other examples, features, aspects, embodiments, and advantages will become apparent to those skilled in the art from the following description. Accordingly, the figures and description should be regarded as illustrative in nature and not restrictive.

At least some of the embodiments described in the current application are directed toward a system, including a programmed computer, wherein the computer is operable to display a plurality of modules to a user where the modules encompass a method of training the user to operate multimodal user interfaces in the context of customer service applications, including call center transactions. Further, at least some of these embodiments are directed toward implicit training of respective users. However, it should be understood that the systems described herein are not limited to being applied in the customer service context, and may also be utilized to enable the use of multimodal user interfaces in other contexts, such as consumer tutorials for handheld or mobile devices. Accordingly, the discussion below should be understood as being illustrative only of systems which can be used in training for the operation of multimodal user interfaces in communication with programmed computers, and should not be treated as being limiting on any claims included in this application or any related applications.

The systems described herein can be implemented through computers utilizing a computer readable medium having stored thereon a set of data. The data supports a plurality of modules corresponding to areas of learning in the operation of a multimodal user interface. For the purpose of clarity, certain terms used in the preceding sentence should be understood as having particular meanings in the context of this application. For example, the term "data" may be understood to mean information which is represented in a form which is capable of being processed, stored and/or transmitted. Similarly, a "computer readable medium" may be understood to refer to any object, substance, or combination of objects or substances capable of storing data or instructions in a form in which it can be retrieved and/or processed by a computer. The term "computer readable medium" should not be limited to any particular type or organization, and should be understood to include distributed and decentralized systems however they are physically or logically disposed, as well as storage objects or computer systems which are located in a defined and/or circumscribed physical and/or logical space.

The term "module" may be understood to refer to an identifiable part or component. The term "area of learning" may be understood to refer to a particular division in a skill or field of endeavor. The term "multimodal user interface" ("MMUI") may be understood to refer to the combined use of voice, graphics, tactile, or other common means to provide input or output to interact with a computer. Any and all of the modalities are active for the acceptance or presentation of information to or from the computer user. The term "computer" may be understood to refer to a device or group of devices which is capable of performing one or more logical and/or physical operations on data to produce a result.

The term "modality" may be understood to refer to a sense through which a human can receive the output of the computer. For example, a modality may refer to vision or hearing. The term "modality" may also be understood to refer to a sensor or device through which the computer can receive the input from the human. Examples of sensors and devices include, but are not limited to, a mouse, a keyboard, a touch screen and other tools that are explained herein. Overall, any suitable definition for the term "modality" may be used by those skilled in the art where the modality functions as a path of communication between a human and a programmed computer.

As mentioned earlier, a computer readable medium, such as described above, may be implemented in a manner such that a plurality of modules are stored on the computer readable medium. Each respective module aids a user in learning to operate a MMUI. Each respective module may include an assessment which is defined below for example, and/or other content relating to the operation of a MMUI. As a further example of how the teachings of this application may be implemented, a computer readable medium may be implemented in a context where the MMUI is adapted to enable a user to utilize a graphic user interface via voice input or output. However, it should be understood that a MMUI does not necessarily include either a graphic user interface or the potential to accept voice input.

For the sake of clarity, additional terms used in the current application may be understood to have particular meanings in the context of this application. For example, the term "assessment" may be understood to refer to a test, appraisal, or other measure or evaluation. Further, the term "graphic interface" may be understood to refer to a type of user interface which allows people to interact with a computer through a visual medium. Many commercially known "graphic interfaces" employ graphical icons, visual indicators or special graphical elements called widgets, along with text, or labels to represent the information and actions available to a user.

The term "voice interface" may be understood to refer to the use of speech input or output medium to interact with a computer. The term "voice input" may be understood to refer to information provided to a computer through sounds (e.g., words, phrases, clauses, tones, patterns of emphasis or volume, or other manners of expressing information through sound). The term "voice output" should be understood to refer to either a synthetic or digitized speech rendering of textual information (numbers, letters, words, sentences) into sound output recognized as speech. As mentioned earlier, further refinements of these descriptions are also possible based on the teachings of this disclosure.

Continuing with descriptions, some exemplary embodiments of the instant application may comprise a plurality of modules programmed with respect to a first set of data corresponding to a "Push to Talk" tool, a second set of data corresponding to navigation through the graphic user interface via voice input, and a third set of data corresponding to entering data into the graphic user interface via voice input. The term "Push to Talk" tool ("PTT tool") may be understood to refer to a tool to mediate the provision of voice input to a computer. The tool may be implemented as a button on a screen, a hot-key, a hot-word, an external button, a foot pedal, or other suitable technique or structure. Operating a PTT tool may involve interacting with a training procedure to teach a user to successfully use the PTT tool. However, it will be understood by those skilled in the art that a PIT tool or similar technique or structure may not be used to mediate the provision of voice input to a computer. For example, any words or other similar input from a user may automatically be configured as input to the computer whereby the user may be able to avoid being tasked with distinguishing output (words, phrases, signals, tones) into voice input to be received by a computer.

The term "navigation" may be understood to refer to a form of movement. In the context of interfaces, examples of "navigation" include (but are not limited to) transferring control from one form to another within the interface, transferring between aspects of an interface within an application, and even transferring between applications. Navigation may be between computer screens, applications or web-pages, and may involve multiple steps.

Further, the term "entering" in the context of "entering data into a user interface" may be understood to refer to the act of making the data being "entered" available to the user interface, for example, by typing in a text field, selecting options using radio buttons or checkboxes, or by any other similar technique, structure, or method. For example, in a graphic user interface, a user may enter words into a data field by speaking the words or letters. The data field will then be populated as the words are entered. In another example, an interactive voice response system ("IVR system"), a user may enter data by speaking a phrase. While the user may not visualize the data being entered, the user is still entering data into the system.

Additionally, the term "corresponding" may be understood to indicate the existence of a relationship between the things identified as "corresponding" to each other. For example, a set of data "corresponding" to a PTT tool may include data operable to configure a computer to operate a PTT tool, data operable to configure a computer to instruct a user in the operation of PIT tool, or other data related to a PTT tool.

Figure 30:
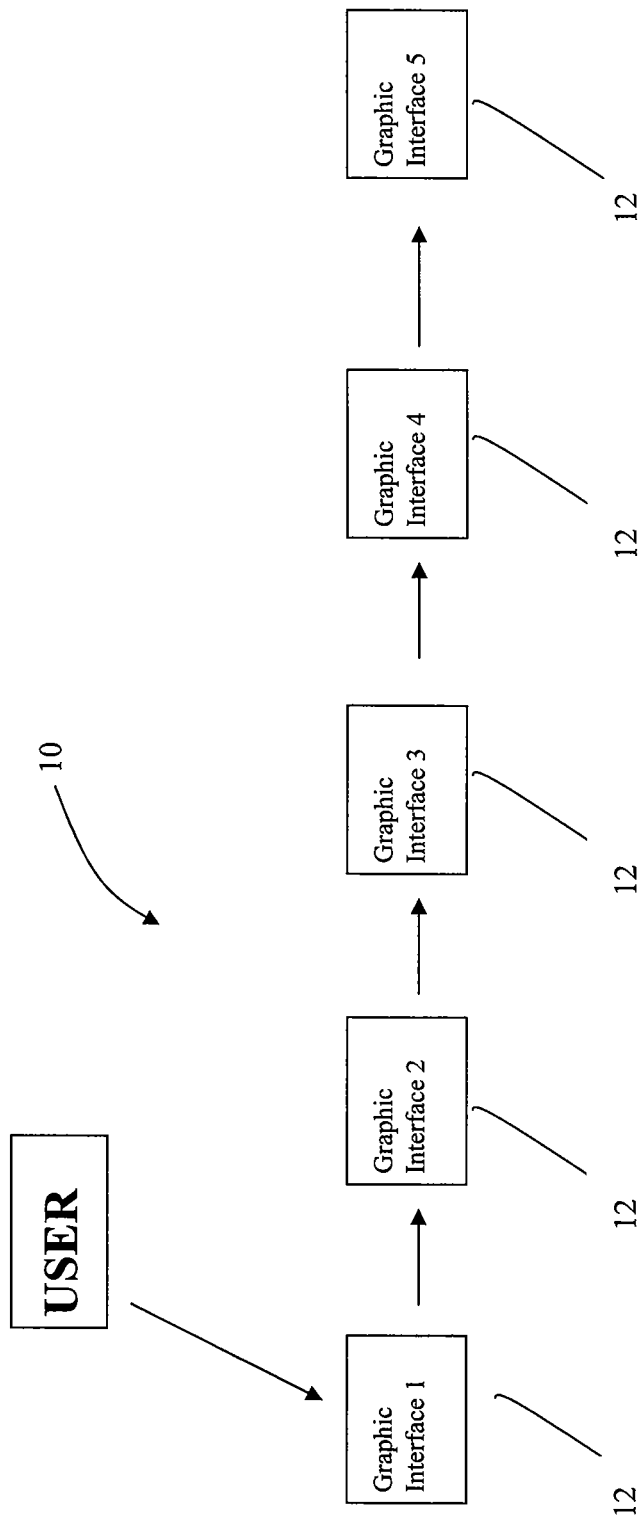
FIG. 30 depicts a schematic diagram showing a prior art configuration of a series of user interfaces.
Figure 31:
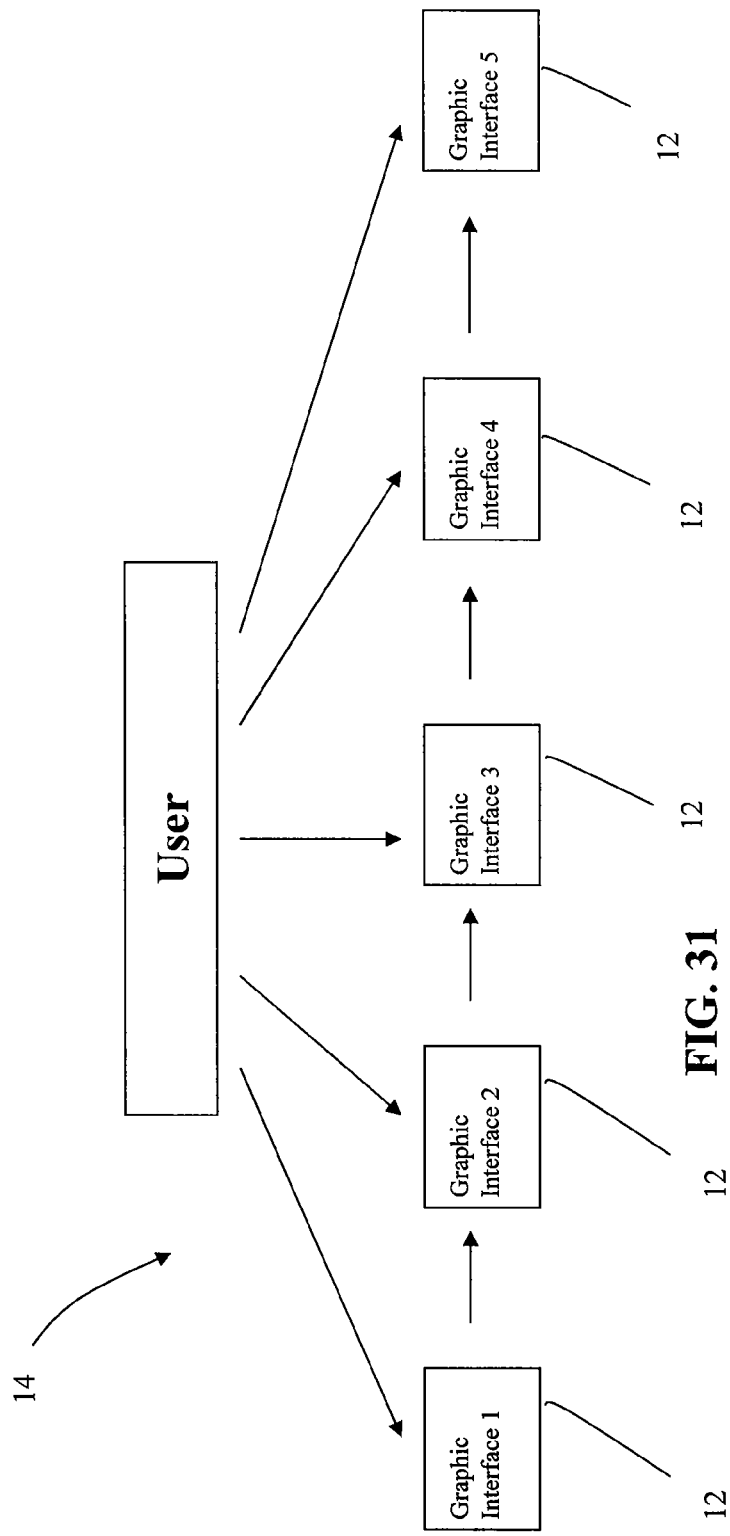
FIG. 31 depicts a schematic diagram showing a configuration of user interfaces.

The term "streamlining" may be understood to indicate that the steps used to complete a transaction need not be taken in a serial manner dictated by the sequence of user interface screens. For example, a MMUI may allow a user to operate the underlying application using an existing user interface in a step-by-step manner, but additionally may allow a user to trigger navigational steps to vary the sequence of the user interfaces in a manner that is different from the serial manner described above. For example, FIG. 30 depicts a schematic showing a prior art sequence (10) of graphic user interfaces (12) such that the sequence only permits the user to access the various screens in the specified sequence shown. As shown, the user must first access the graphic user interfaces (12) in the following serial order: Graphic Interface 1, Graphic Interface 2, Graphic Interface 3, Graphic Interface 4, and Graphic Interface 5. In contrast, FIG. 31 depicts a schematic according to the present application and shows a configuration (14) allowing a user of a MMUI to access a series of graphic user interfaces (12) in a sequence specified by the user. For example, the user navigates to Graphic Interface 2 before navigating to Graphic Interface 1, or to navigate to Graphic Interface 4 from Graphic Interface 1 without first navigating through Graphic Interface 2 and Graphic Interface 3. As will be discussed later, this type of navigation may be described as streamlining as it allows a user to save resources and provides a more efficient procedure to achieve a task. Yet further, this streamlined approach may be structured in a manner whereby actions by the user automatically cause navigation. For example as referenced above, if the user acts in a certain manner, navigation may occur from Graphic Interface 1 to Graphic Interface 4 without the user explicitly selecting this navigation course. In some examples, some data fields of Graphic Interfaces 2, 3, 4 may be populated despite this direct navigation from Graphic Interface 1 to Graphic Interface 4. Any suitable structure and/or technique may be used to implement streamlining including those disclosed in U.S. application Ser. No. 11/966,393, the disclosure of which is incorporated herein.

It will be understood by those skilled in the art that streamlining may include steps used to complete a transaction where multiple transactions occur within the same engagement. For example, in a call center setting, if a customer requests a redelivery and to lodge a complain during the same call via a MMUI application, the user of the system may respond to both requests in a manner dictated by the sequence of user interface screens. For example, the user may capture data relating to the redelivery request. Upon finishing this task, the user may collect data whereupon the user is directed towards a page for complaints. The navigation steps that occur are based on the data gathered by the user. However, the user retains the ability to navigate the application in a serial manner. However, streamlining the training allows the user to learn to complete a transaction in an efficient, productive, or similar manner by being able to control various aspects of the interface with which the user is interacting. For example and as mentioned, streamlining the training relates to the navigation of a user based on the data provided by the user, and the data fields populated in a plurality of screens associated with at least one target application.

In at least one embodiment disclosed herein, there is a set of computerized modules with progressive degrees of complexity which train a user in the operation of a MMUI. Complexity may be based upon the number of components present in a graphic user interface and the scope of skill, ability, experience, proficiency, or related characteristic required of the user and/or trainer. In another embodiment, it is disclosed that modules may be presented in a specific order and/or sequence. In another embodiment, it is disclosed that certain training exercises and assessment metrics may be performed to confirm competence in one module before moving on to a progressively more complex module.

It may be understood that the descriptions above are intended to be illustrative only of potential implementations of the teachings of this disclosure. Other implementations of the teachings of this disclosure, including in the forms of methods, systems, apparatuses or alternate computer readable media may be created by those of ordinary skill in the art without undue experimentation. Accordingly, the discussion above should not be treated as limiting the claims included in this application or any related applications.

As discussed in greater detail below, example embodiments utilize a computer-based training system to train users with respect to acquiring certain information and skills. Certain embodiments train a user to utilize the acquired information and skills in a simulated real-world environment where the user interacts with another "person" (real or simulated). The user is scored based on their retention of the information, and their ability to provide the information to others in a natural, confident manner (e.g., without hemming and hawing). Further, the training system optionally enables real-time or post-testing scoring of user training sessions. The scoring optionally includes subcategory scoring, consolidated category scoring and scoring which helps the user and others to focus upon areas that need significant or the greatest improvement. For example, the category can be financial transactions, and sub-categories can include saving deposits, withdrawals, debit cards, checking accounts, and credit cards. Optionally, the consolidated scoring report may provide a total score, and subcategory scores report individual scores for corresponding subcategories, so the user and others may better understand the user's performance deficits at a more detailed level, and may focus additional training on lower scored subcategories.

So as not to make a user unduly nervous regarding the training process and to reduce the fear of obtaining a low score, scoring may be deleted or otherwise not retained in computer accessible memory long term (e.g., it is removed from memory when the user logs out of the training system or earlier) and is optionally not printed out in hardcopy form, and instead a report is generated and stored indicating simply that the user needs help or further training with respect to certain categories/subcategories (e.g., without making a point or grade distinction with respect to other users that also need help). The score may be valuable to measure agent performance on an continual basis where the scores are stored. While the score does not need to be displayed to the agent, the score is valuable for training/remediation purposes, and is a metric upon which to base the results of repeated training. For example, the score of a candidate may be used to compare the agent's knowledge, skill or similar characteristic to other agents whose scores have been stored. For example, the score of a candidate who later become a successful user of a system may be the bar to which present candidates are compared to. Likewise, scores of individual gents may be saved to compare these scores to the same agent should the agent participate in the training process at another time.

Training may optionally enable a user to provide answers and information in real life situations with customers and prospects in a manner that instills trust and confidence with respect to the user. Training may aid users in internalizing and behaviorally embedding information and skills learned during training. Users may be trained to provide information, respond to objections, or ask questions, as appropriate, automatically or almost automatically, without undesirable pauses. The training system as described herein may be configured and used to provide training with respect to academic knowledge, and/or other skill improvement that involves verbalization, including relationship building. Examples of categories include, but are not limited to, some or all of the following: information (e.g., product information, information regarding an academic subject, information about a person, etc.), objections (e.g., product objections, objections to a course of action, etc.), generic objections (e.g., generic objections to products or services), service queries, resolving service problems, dealing with angry customers, dealing with life events (e.g., divorce, marriage, birth, death, travel, etc.), making referrals to specialists, differentiation and orientation statements, sales, service and relationship technique drilling.

In an example embodiment, a user utilizes a computer-based training terminal (e.g., a personal computer, an interactive television, a networked telephone, a personal digital assistant, an entertainment device, etc.) or other device, to access a training program stored locally or remotely in computer readable memory. One exemplary networked system (100) is shown in FIG. 1 and includes a Web/training application server (110), used to host the training application program and serve Web pages; a scenario database (112), that stores prerecorded scenario segments; and a user database (114) that stores user identifiers, passwords, training routines for corresponding users (which can specify which training categories/scenarios are to be presented to a given user and in what order), training scores, recordings of training sessions, and user responses provided during training sessions. The training system (100) is coupled to one or more user terminals (102, 104), and a trainer terminal (106) via a network (108), which may be the Internet or other network. It will be understood by those skilled in the art that any suitable networked system may be used that effectively supports the training program. For example, in the above networked system (100), the user terminals (102, 104) and trainer terminal (106) may comprise the same terminal as opposed to having multiple terminals.

Figure 2:
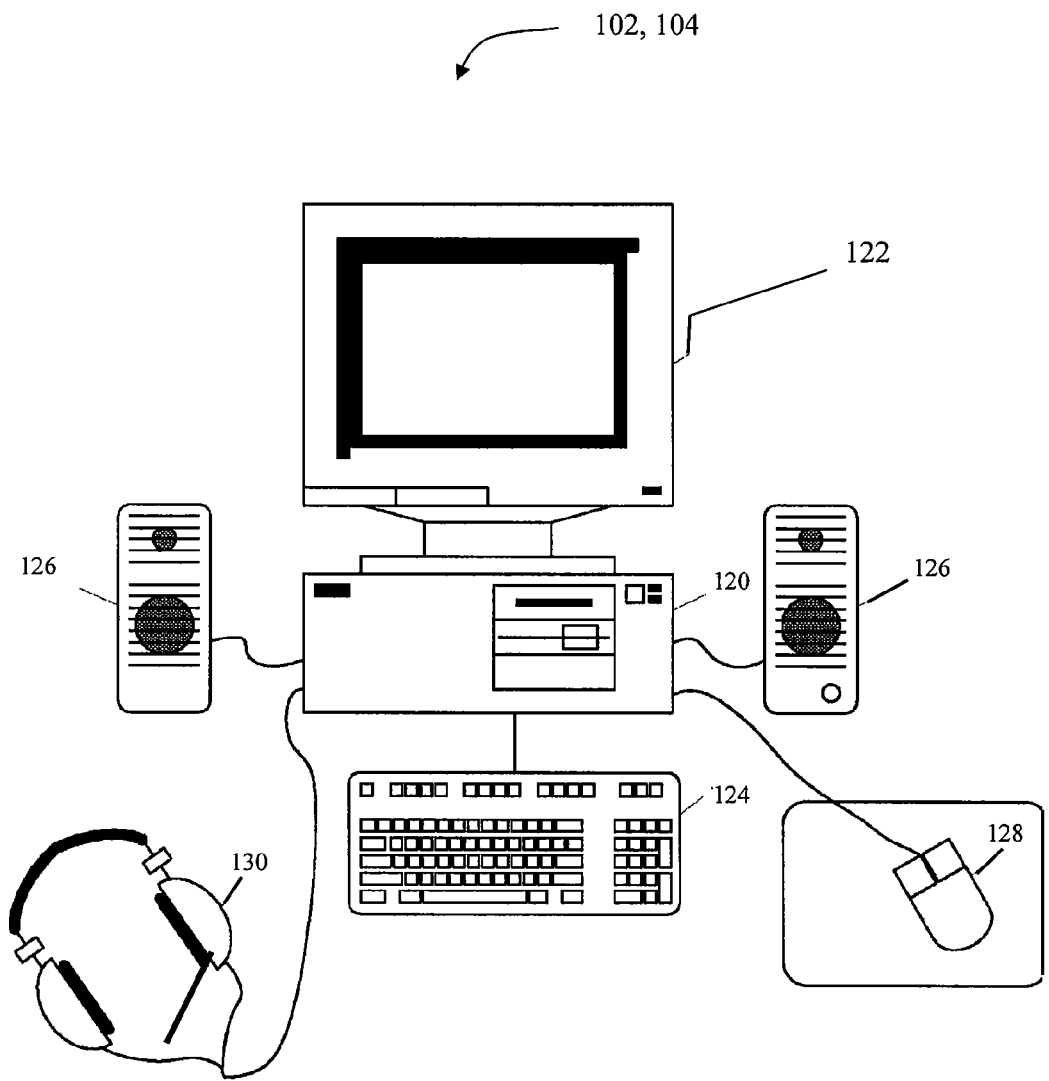
FIG. 2 depicts a partial schematic and block diagram of an exemplary dedicated computer system for executing a program according to some of the exemplary embodiments disclosed in the current application.

Further, it will be understood by those skilled in the art that any suitable terminal (102, 104) may be used. An exemplary user terminal (102, 104) is shown in FIG. 2 wherein terminal (102, 104) includes a computer (120), having a CPU, memory, hard disk and CD ROM drive (not shown), attached to a monitor (122). Monitor (122) provides visual prompting and feedback to the subject during execution of the computer program. Attached to the computer (120) are a keyboard (124), speakers (126), a mouse (128), and headphones (130) having a microphone. In some embodiments, speakers (126) and headphones (130) provide auditory prompting, stimuli, and feedback to the user during execution of the computer program. Mouse (128) allows the subject to navigate through the computer program, and to select particular responses after visual or auditory prompting by the computer program. Keyboard (124) allows an instructor to enter alphanumeric information about the subject into computer (120), and/or response by the subject. Although a number of different computer platforms are applicable to the present application, embodiments of the present application execute on either IBM compatible computers or Macintosh computers, or similarly configured computing devices such as set top boxes, personal digital assistants (PDAs), gaming consoles, etc.

The user may be requested or required to log-in (e.g., provide a password and/or user name) to access the training program and/or one or more training modules. Optionally, the training system utilizes the log-in information and/or a cookie or other file stored on the user's terminal to determine what training modules the user has already attempted and/or completed so that the system can automatically select the appropriate training module for the user and store the user's interactions and/or score in a database in association with the user identifier.

A cataloging function provides users the ability to precisely choose the skill training desired. Optionally, the user may choose full categories and/or sub-categories. For example, the system may present the user (or a trainer) with a selection of modules (e.g., in the form of categories/training sequences) whereupon the user and/or trainer selects the desired module. Optionally, the system automatically selects which module (or segment therein) is to be presented based on the user's training history (e.g., which modules the user has completed and/or based on corresponding module training scores), the user's training authorization, and/or other criteria. The trainer may act as a coach during the training process.

Different training modules may be provided that train users with regard to specific areas or subject matters. For example, a module may be directed toward a general area of learning the functioning of operating a MMUI. For example, a module may be directed toward the operation of a PTT tool or the Voicepad tool as will be described later. In another example, a module may be directed toward subject matter related to a user's industry or job function. For instance, certain modules may be intended to prepare users for dealing with customers in the apparel industry. Modules may therefore be focused on learning about products and/or services, comparisons of product and/or services (e.g., comparisons of product and/or services offered by the user's employer, comparisons of product/services offered by the user's employer with products and/or services of another company or other entity), handling customer complaints, resolving service issues, providing customers with background information on the company, etc. Modules may also be focused on academic training and/or relationship building.

The structure of a training program may include individual modules that present concepts with which a person or entity receiving training ("user") would become familiar with such that the complexity and skill level of the modules increases as training progresses. Hence, it will be understood by those skilled in the art that a ladder approach may be used to configure a training sequence.

In one example, various modules are directed toward various aspects of a MMUI where the first module relates to simple concepts with subsequent modules relating to more complex subject matter. In this example, each module builds on the concepts of previous modules. This exemplary training program provides a sequence that leads the user in a step-by-step manner through all the operations contained in a typical application with an MMUI. Modules may be shortened, deleted, changed, reordered or even added, based on the experience of the user. In some embodiments, modules are presented in a particular order to reduce the time and effort necessary to learn how to successfully utilize a MMUI. For example, the modules may be configured to address the following subjects in the following order: entering certain information into the computer; using speech for navigation; using speech for data entry either through data fields or drop-down menus; using speech to perform error correction; using the Voicepad; and, using speech to streamline the data input to match the normal transaction workflow. The normal transaction workflow may vary from situation to situation, user to user, customer to customer, or some other similar metric. The same standard may be used to structure the transaction to increase the efficiency between the user and customer, and so on in order to achieve transaction efficiency. For example, in a customer call center setting, two separate customers A and B ordered products that are currently being processed for shipping. Customers A and B respectively call to change the delivery address of the packages. The flow of each transaction between A and B should be relatively identical in some situations. For example, the navigation through the various user interfaces of the application may be identical (i.e. home screen to change address screen). As will be discussed below, a relatively identical operation of the application may be not occur for example where the updated shipping address for customer A has been previously stored in the system but the updated shipping address for customer B has not been previously stored in the system. Generally, where the circumstances of a particular situation are identical, operation of the application by the user should be similar.

The modules might also include assessments which may be used to ensure that the user has achieved a requisite level of competence or familiarity with material presented in a given module before proceeding to a subsequent module. Additionally, modules may be included which involve coaching the user in the actual operation of a MMUI, based on real and/or simulated use of that interface. Modules may be included which involve debriefing the user. Such debriefing could include gathering data regarding the use of the MMUI that might indicate a need for additional training or remediation, or which could be used to modify future training programs or the operation of the MMUI itself, or for the development of additional customized training adapted to the specific user. It is also possible that the time and detail devoted to and provided in each module might be customized to the specific characteristics of the particular MMUI being taught.

Figure 3:
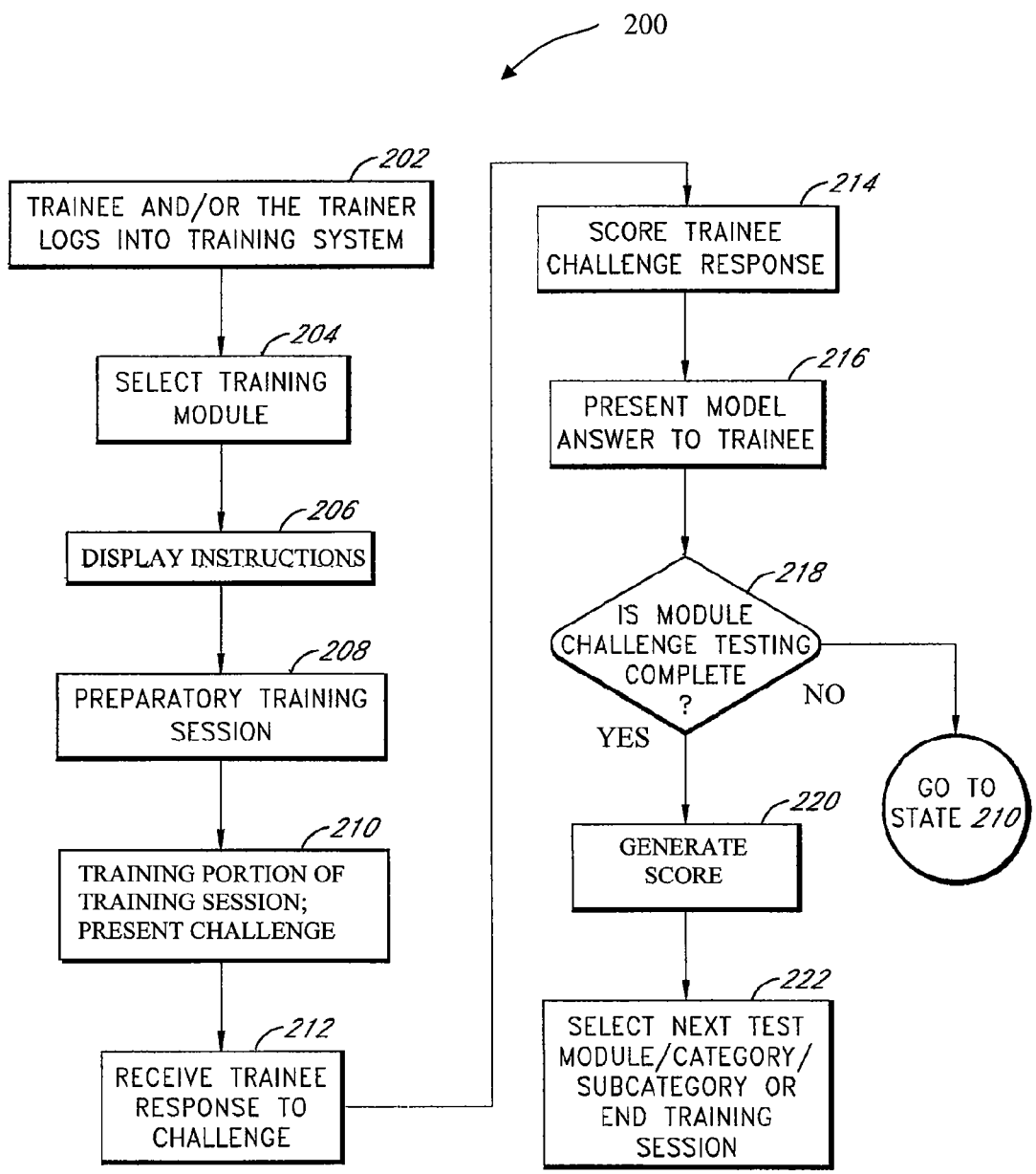
FIG. 3 depicts a flowchart showing an exemplary training technique.

FIG. 3 depicts an exemplary training process (200). As shown in the exemplary process (200) of FIG. 3, a user logs into the training system in step (202). Upon logging into the system, the user selects a module in step (204) to access. Instructions for the module selected are then displayed in step (206). The instructions may be general instructions (i.e. not specific to any particular module) and/or instructions specific to the module selected. After the instructions are displayed, an educational preparatory training session may be incorporated into the process in step (208). The training session may include any suitable instrument to educate and/or offer the user a preview of the upcoming module, tools to be utilized in the module, purpose of the module, and/or any other relevant information relating to the module or the subject matter of the module. For example, the education session may comprise a discussion of the goals of this training, the skills that should be developed, and/or the knowledge that should be gained. Accordingly, the user is offered a preview of the subject matter of the module, or a demonstration of the knowledge that the module should convey to the user.

After exposing the user to this preparatory session, step (210) occurs wherein the user operates and participates in training offered by the respective module. More specifically, the user is presented with a challenge in this module. This may come in the form of an assessment and/or interactive tutorial. Any suitable module of a training program, for example as will be described below with reference to FIG. 18, may be configured according to the sequence shown in FIG. 3. This includes for example modules relating to the basic concepts of a certain subject matter such as the operation of a MMUI, and modules relating to the simulated operation of a MMUI.

Figure 17:
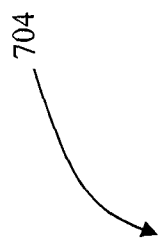
FIG. 17 depicts an exemplary questionnaire that may be used to measure a user's familiarity with a multimodal user interface.

After the training program is complete, the user provides feedback with respect to the participation in the respective training in step (212), or any other aspect of the training program. As will be discussed in further detail below, an exemplary questionnaire is shown in FIG. 17 that allows a respective user to provide feedback. Various feedback will be provided to the user in view of the specific training module selected and/or the user's conduct during the simulation. Finally, the user's conduct during the simulation may be scored in step (214). The feedback received in step (212) may be used to score the trainee and/or the score may be based on qualitative or quantitative data received during the training.

A model answer may exist for each respective training. A respective model answer may be presented to the user in step (216). A determination may then be made in step (218) to determine if the simulation testing is complete. Any suitable technique or structure may be used to determine if the simulation is complete based on whether the user achieved a certain score. For example, if the user achieved a 70% score, then the simulation may or may not be deemed to be complete. If the simulation is not deemed to be complete, then the user would return to step (210) to allow the user to participate in the simulation again. If the simulation test is deemed to be complete, the test results are generated in step (220). Upon generating the test results, any suitable choice may be selected in step (222) including selecting a next module, a next category within the same module, a subcategory with the same module, or ending the training session.

It will be understood by those skilled in the art that the above process represents one exemplary sequence for a training module. The various steps shown in this example may be rearranged or modified in any suitable manner to ensure that the user adequately learns and/or otherwise gains a valuable experience with respect to a certain subject matter taught by a module. Likewise, various steps may be removed from or added to this process. For example, step (216) may be removed from the process or only allowed to occur should the user receive an adequate score during the training. One rationale for limiting the occurrence of step (216) is that allowing a user to view the model answer before the user receives an adequate score prevents the user from adequately learning the subject matter if the user is simply able to memorize the model answer. In some embodiments, a step (not shown) may be added that provides the user with tips or suggestions. The tips and suggestions may relate improving skills in preparation for the next module. The tips or suggestions may also relate to the user's training score. For example, if the user performed poorly in using a PIT tool but well with respect to another tool, this step may notify the user of the areas that need improvement (i.e. PTT tool) and the areas where training has been successful (i.e. navigation). In another example, steps (206) and (208) may be combined into a single step whereby the user receives instructions for participating in the training, the grading system used to judge a user, a tutorial on using the training system in a single step.

The following includes non-limiting illustrative examples of modules directed toward training a user to operate a MMUI. For example, consider a scenario of instructing a user on the operation of an Agent Voice Assist ("AVA") Interface, such as described in U.S. patent application Ser. No. 11/966, 393, with the goal of instructing a user in acting as a call center employee. As described in the incorporated application, an AVA interface can be configured to allow a user to supplement traditional mouse and keyboard data entry and navigation in a graphical user interface with voice signals. It will be understood by those skilled in the art that various aspects of the following embodiments and features thereof may include suitable structures and techniques as disclosed in U.S. patent application Ser. No. 11/966,393. For example, the process for streamlining an application, including a training simulator of a MMUI, may be structured as described in U.S. patent application Ser. No. 11/966,393.

Figure 4:
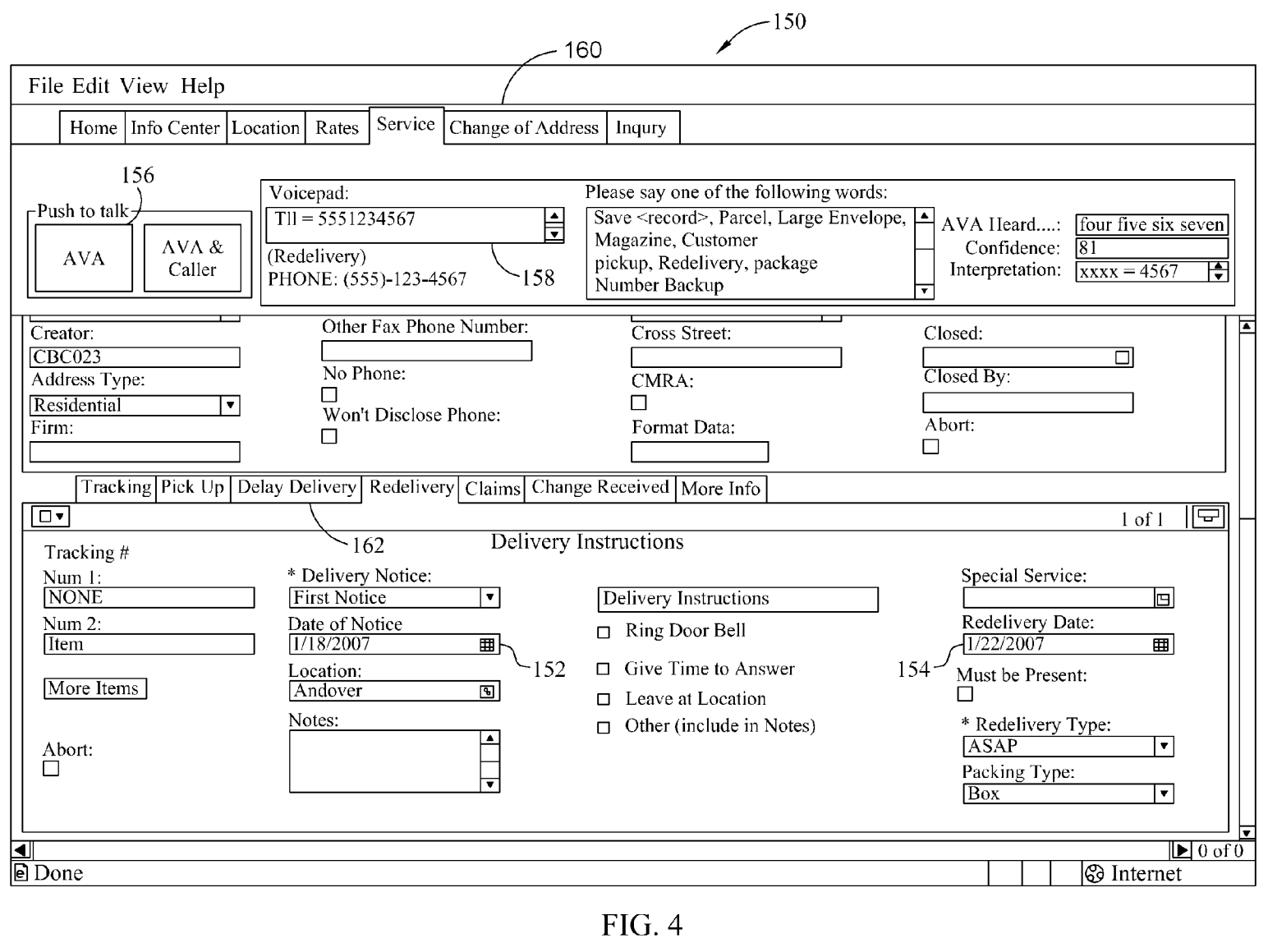

FIG. 4 depicts an exemplary MMUI (150). In this example, MMUI (150) relates to an application that may be used by a customer service representative working for a delivery service who wishes to process a customer's redelivery request using an AVA interface. As shown in FIG. 4, MMUI (150) includes a plurality of fields, including fields (152, 154) for entering data. Data may be entered into these fields in any suitable manner. For example, data may be freely entered into the fields and/or selected from a list of options. For example, as shown in the "Delivery Notice" field, the data entered into the field is selected from a dropdown menu. In contrast, the "Notes" field allows the user to freely enter data into the respective field. Further, the various fields may also be automatically populated by an underlying software system, in a process which may be implemented to train the user in a technique for streamlining workflow. Various training modules may be directed toward learning to operate these and other various components of a variety of MMUIs (150).

The MMUI (150) shown in FIG. 4 further comprises a "Push to Talk" tool (156), a Voicepad (158), and tabs (160, 162). Each component may be respectively navigated by the use of mouse and/or keyboard commands, or through voice commands from the agent. It will be understood by those skilled in the art that any suitable instrument, technique, or structure may be used that provides the adequate capability to use these tools, including those described in U.S. patent application Ser. No. 11/966,393. For example, a touch screen may also be used. In some embodiments of a MMUI (150), the user can manipulate the entire interface. Alternatively, a MMUI (150) may be programmed so that only a subset of components are available for interaction with a user.

As discussed below, the training process for learning to operate a MMUI (150) may include teaching a user to hold down PTT tool (156) when the user wishes for the recognizer to be activated. The training process may also include learning how to operate a Voicepad (158) where Voicepad (158) may be described as a temporary memory component in which data can be stored during a call for later use. For example, information entered into Voicepad (158) is stored for later automatic entry into data fields as they become available as part of a streamlined workflow.

Figure 5:
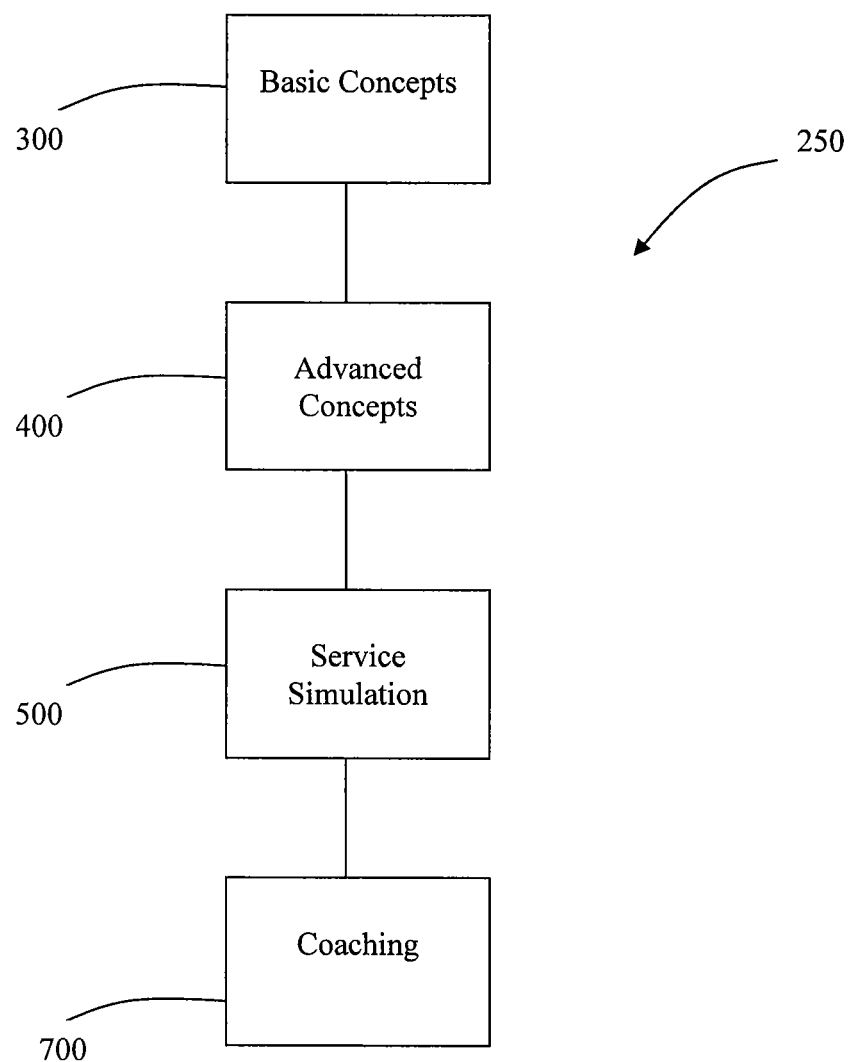
FIG. 5 depicts a block diagram showing an exemplary configuration of modules for training a user to use a multimodal user interface.

As in FIG. 5 and discussed below, an exemplary training program for learning to operate a MMUI, such as MMUI (150) depicted in FIG. 4, may be organized into a plurality of modules. As shown in FIG. 5, an exemplary training program (250) may be organized into modules of: Basic Concepts (300); Advanced Concepts (400); Service Simulation (500); and Coaching (700). In this embodiment, the modules support training through a sequence of logical steps. The range of complexity for the modules increases, for example, from entering input to error correction. The configuration may allow the user to utilize the modules to develop a skill set allowing the user to operate MMUI (150) in a streamlined manner. The following discussion of modules (300), (400), (500), and (700) relates to MMUI (150), and the AVA system supporting MMUI (150). However, it will be understood by those skilled in the art that the discussion is not limited to this particular MMUI (150) or AVA system. Therefore, the following discussion is not meant to be limiting such that these training programs may relate to different systems and comprise different modules.

Figure 6:
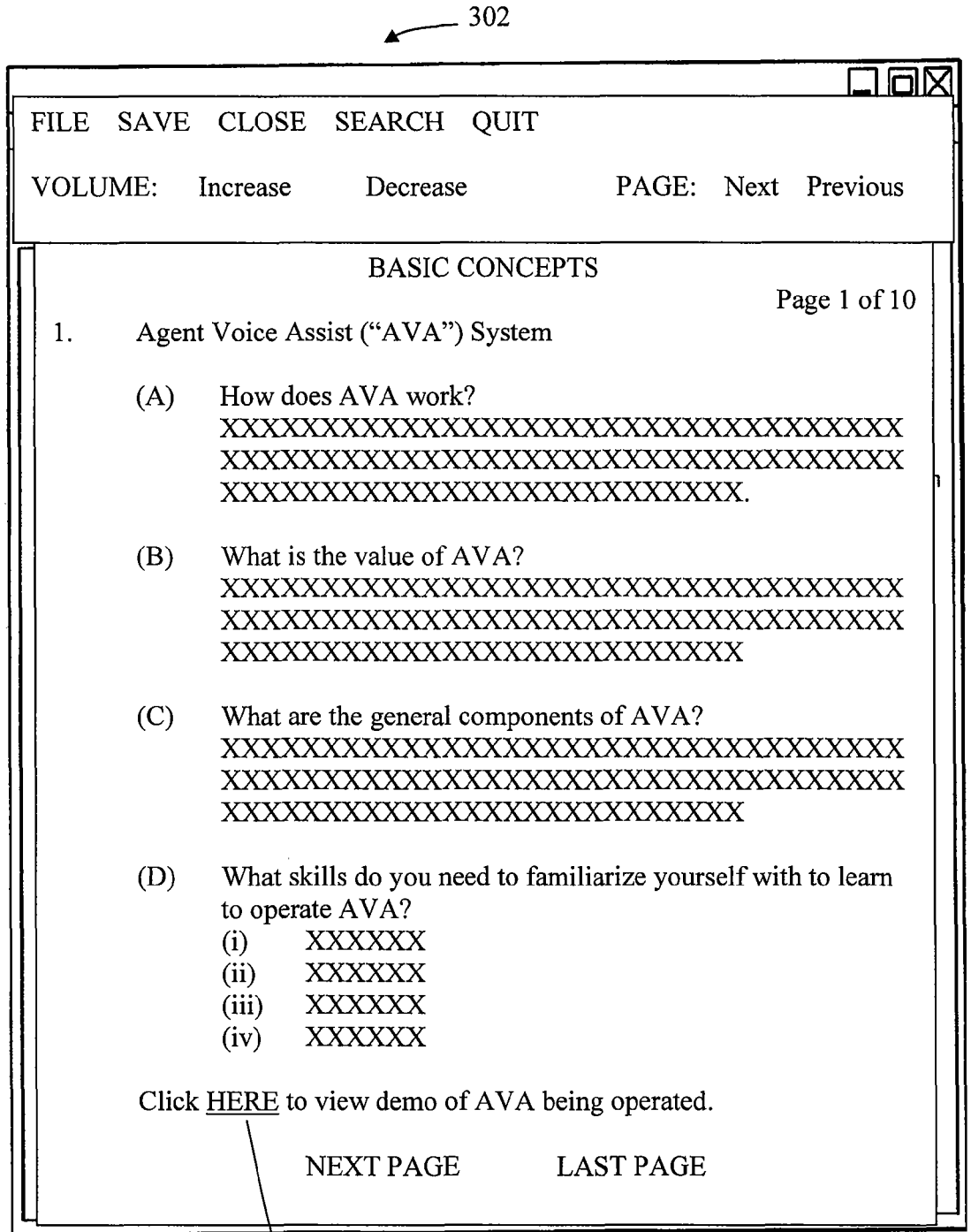
FIG. 6 depicts a first exemplary user interface relating to learning to use a multimodal user interface.
Figure 7:
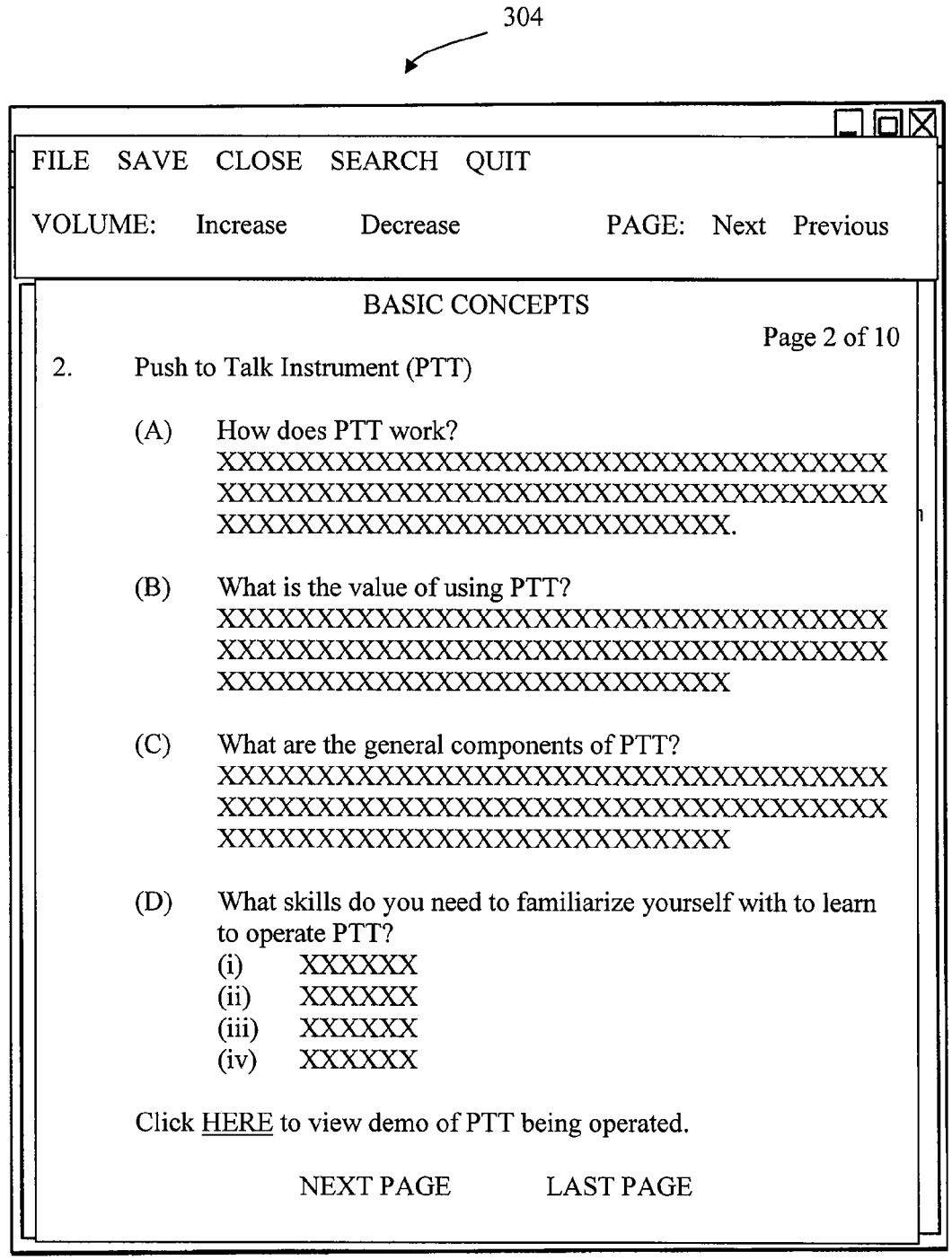
FIG. 7 depicts a second exemplary user interface relating to learning to use a multimodal user interface.

Turning now to the Basic Concepts module (300), such a module may be designed to provide a user with a general description of a MMUI (150). As shown in FIGS. 6-8, Basic Concepts module (300) may introduce the concept of speech recognition with respect to an AVA system, as well as explaining how best to use a speech recognition system (e.g., speak normally, do not place the microphone too close, etc). Exemplary user interfaces of Basic Concepts module (300) are shown in FIGS. 6-8. The information presented to a user through a module, including module (300), may be presented in any suitable manner to effectively train the user.

For example and as just referenced, user interface (302) of FIG. 6 illustrates a general description of an AVA system that educates the user on the purpose and advantages of using an AVA system. As shown in FIG. 6, user interface (302) of module (300) poses the following question to a user: "what skills do you need to familiarize yourself with to learn to operate AVA?" The user may or may not be required to answer a question posed in a module. Hence, the question may be rhetoric in nature. In contrast, the answers may be listed below the question and the user may be required to respond. In some embodiments, the user may not be able to proceed in the module until a question is answered correctly based on a series of answers provided to the user.

Basic Concepts module (300) may also describe the various tools and functions which may be used with a MMUI (150). For example and as shown in a user interface (304), Basic Concepts module (300) may explain the use of a PIT tool and the advantages of the tool. User interface (304) may describe the various capabilities of a PTT tool, the general components of a PTT tool, and the skills necessary to operate a PTT tool. It will be understood by those skilled in the art that any suitable information relating to a MMUI (150) may be provided to the user in the basic concepts module (300), including subject matter not shown in FIGS. 5-7. For example, one component of operating a MMUI (150) is learning input, i.e., of entering data using a modality including for example a voice interface. In view of this, a Basic Concepts module (300) may explain words which may be used to navigate, control, and/or otherwise operate a MMUI (150). For example, a Basic Concepts module (300) may explain to a user that if certain fields in a MMUI (150) are voice enabled, those fields could be presented with some type of identifier (e.g., highlighting) to instruct the user that those fields may be activated via voice input. The Basic Concepts module (300) may further explain that the PTT tool includes these words in its active vocabulary so that a user should adequately learn to speak the word or words until a competence and/or comfort level is reached. Even further, the Voicepad tool may be explained in a similar fashion compared to the PTT tool.

Also, knowledge directed toward the use of Voicepad (158) in the context of data entry may be explained in a Basic Concepts module (300). The use of, and specific techniques for, streamlined workflow may also be initially described during a Basic Concepts module (300). For example, in some MMUIs (150), there may be multiple manners of invoking a streamlined workflow (e.g., saying a keyword such as "Address Lookup" or waiting a predetermined time for a streamlined workflow to be automatically invoked). A Basic Concepts module (300) may present and explain various techniques to the user, and/or provide specific goals that the training hopes to achieve. For example, the Basic Concepts module (300) may set the standard for the user that a call be completed in an average time of 60 seconds and/or without navigating through a MMUI in a serial manner.

As mentioned, a further component of operating a MMUI (150) is navigating from one GUI "state" to another GUI "state". This may be a one step action such that a speaking of a word causes transition from one screen to another screen. Data may or may not be entered by default at the second screen, based on whether a streamline is activated or whether there is content stored in the Voicepad that is germane to the second screen. Basic Concepts module (300) may explain this component of a MMUI (150). As mentioned, the implementation and/or discussion of streamlining techniques and/or structure thereof includes nay suitable matter including that disclosed in U.S. patent application Ser. No. 11/966,393, the disclosure of which is incorporated herein.

At the completion of the Basic Concepts module (300), a set of assessment questions could be presented to verify that the user has achieved a desired level of familiarity with the material presented in that module. An example user interface (306) of this portion of a Basic Concepts module (300) is shown in FIG. 8. In this example, the user is asked a first question of "How does PTT work? Select one answer from the following." Any suitable technique or structure may be used to prepare, display, and otherwise present the questions in a manner to adequately verify the user has achieved a desired level of familiarity. For example, the user may be required to answer a certain number of questions correctly before proceeding. There may also be a more a subjective aspect to this portion of the Basic Concepts module (300) such as having a user draft answers to questions. For example, a question may be presented to the user in the form "Please describe the PTT tool?" The user is then required to describe the PTT tool in their own words. A trainer or supervisor may review the responses, and/or the review may be automated.

It will be understood that user interfaces (302, 304) of module (300) include links to video demonstrations. Throughout any module, links to video demonstrations or other instructional tools may be incorporated to further train the user. For example, after the user learns about an AVA system, the user may click on a link (308) to visually watch a demonstration of an individual using an AVA system. It will also be understood that the modules may be synched with narration. In this example, the user may view the contents of the Basic Concepts module (300) while also receiving an oral narration of the subject matter.

Figure 9:
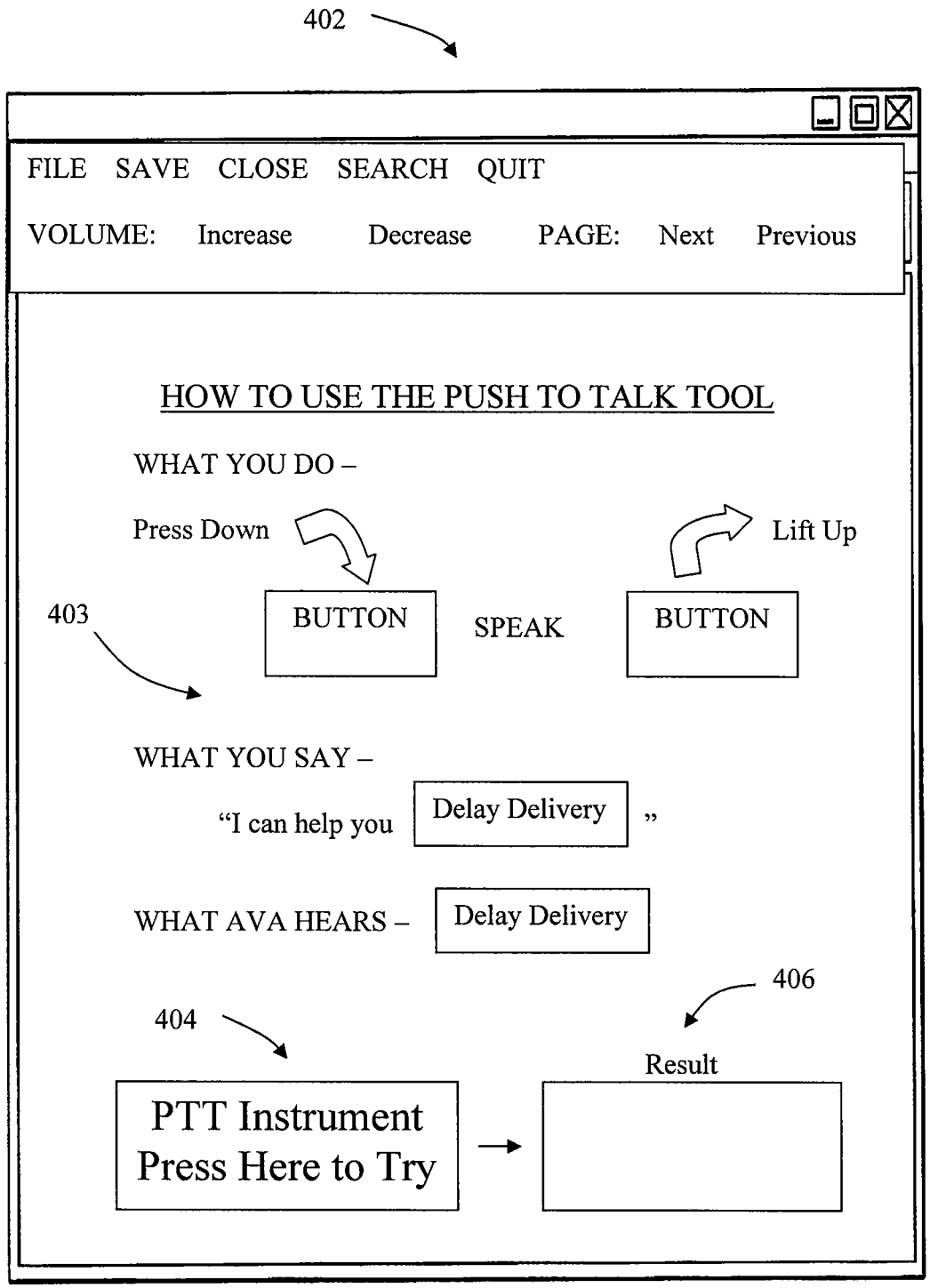
FIG. 9 depicts a fourth exemplary user interface relating to learning to use a multimodal user interface.

After completion of a Basic Concepts module (300), training could proceed to an Advanced Concepts module (400) directed at least in part to hands-on activities. An Advanced Concepts module (400) could include exercises designed to ensure competence with the tools provided by a MMUI, such as by providing practice communicating with a PTT tool. An exemplary user interface (402) which might be presented to a user during such exercises is shown in FIG. 9. As shown in FIG. 9, the user would first read a set of instructions (403) directed toward a PIT tool. In this example, instructions (403) direct the user to "Press Down" on a button, speak, then release the button. Multiple modalities are being used because the user is utilizing a mouse or similar device, and voice input simultaneously.

After reading the instructions (403), the user may then use a PTT tool (404) in the manner specified in the instructions. In this example, the user would utilize PIT tool (404) by stating "I can help you delay delivery," while simultaneously activating PTT tool (404). The results of the user's interaction with PIT tool (404) will be shown in a result window (406). The results shown in window (406) may show the result as "successful", "correct", "unsuccessful", or "incorrect". Alternatively, window (406) may show the results as being the terms, phrases or other signals that would be heard by a respective MMUI (150) associated with PTT instrument (404). For example, if the user were to say "Delay Delivery", window (406) may display the voice input that is registered.

In addition to, or as an alternative to providing exercises in the use of tools included in MMUI (150), an Advanced Concepts module (400) may train a user to use a MMUI (150) in the context of a specific situation or application. For example, a MMUI (150) may be designed to recognize certain words at certain times and/or allow a user to complete some, but not other, tasks using voice input. Based on such a scenario, an Advanced Concepts module (400) may train a user on the terms that are available and/or preferred to be used to accomplish tasks, and which tasks may be performed using certain voice input features such as "redelivery" or "change of address."

Figure 10:
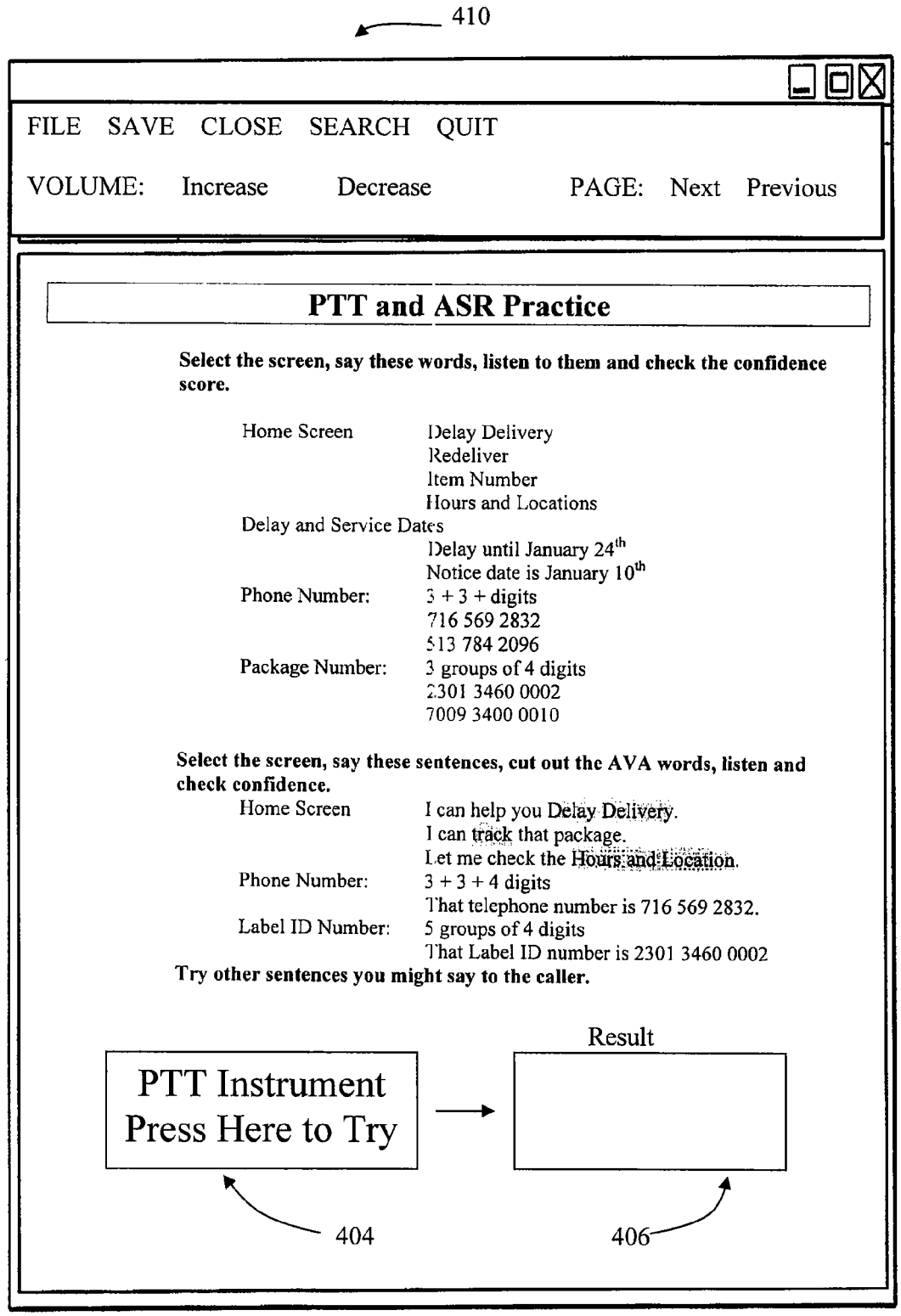
FIG. 10 depicts a fifth exemplary user interface relating to learning to use a multimodal user interface.

For example, as seen in FIG. 10, a user interface (410) of an Advanced Concepts module (400) contains instructions relating to how to use a PTT tool (404) with a focus on the particular definitions, phrases, and terms relating to a MMUI (150). User interface (410) may include using a specialized interface which is designed to facilitate training, or may proceed with a combination of those, or with other techniques designed to enable the use of the interface (410) by the user. Interface (410) is specialized in the sense that it lists key terms and phrases specific to the operation of a MMUI (150). For example, in a customer service industry and as shown in FIG. 10, the phrase "Redeliver" may be helpful when using a related MMUI (150). Therefore, it may be worthwhile to include this phrase in interface (410) for practice purposes.

More particularly, user interface (410) allows a users to use multiple modalities to gain more formality with the tools associated with a MMUI. For example, user interface (410) directs the user to "Select the screen, say these sentences, cut out the AVA words . . . " This training configuration allows the user to build on the skills previously developed with respect to the PTT tool (404). For example, since the user hopefully has learned the basic background of the PTT tool (404), the user may now attempt to "cut out the AVA words" as opposed to merely saying a single word or phrase in its entirety and having the word or phrase registered by PTT tool (404) in its entirety. Allowing a user to broaden their experience with respect to the various features of a MMUI (150) will prepare the user to interact with more complex training modules as well as for future real-time use of a MMUI (150). This increase in knowledge also increases the user's ability to streamline operation of the MMUI by improving navigation skills.

Figure 11:
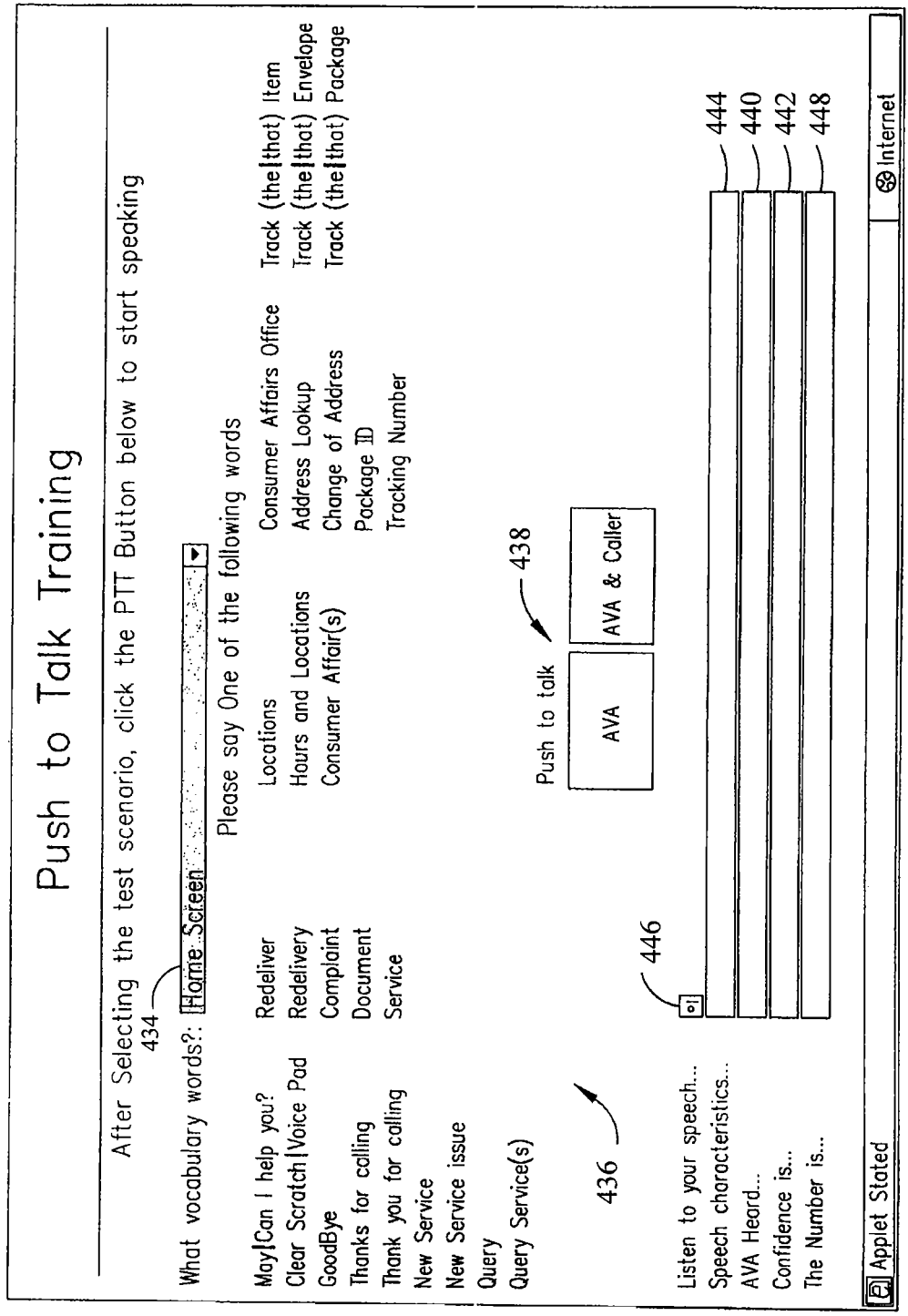
FIG. 11 depicts a sixth exemplary user interface relating to learning to use a multimodal user interface.

Another exemplary user interface (430) of Advanced Concepts module (400) is shown in FIG. 11 where interface (430) enables the user to select a screen option (434) from a list that may otherwise exist in a MMUI (150). Selecting a screen option (434) displays a list of vocabulary (436) related to that screen option (434). With a particular screen selected and the appropriate vocabulary list (436) displayed, the user can then use a PTT tool (438) to practice communicating the words on vocabulary list (436) to module (400). The user may switch between vocabularies associated with a respective screen option and practice communicating the words on the subsequently-selected list (436).

As shown in FIG. 11, the user currently has the "Home Screen" selected. When this option is selected, the list of vocabulary (436) includes phrases such as "Can I help you?," "Redelivery," and "Change of Address." In this example, these are phrases that would presumably relate to the Home page of a MMUI interface for a customer service application. Therefore, interface (430) includes this vocabulary as a starting point. The user may navigate by selecting a different option (434) to view the associate vocabulary list (436). For example, the user may select a "Service Screen" or a "Change of Address Screen" to learn the applicable vocabulary associated with these screens. Allowing the user to become acquainted with this vocabulary may allow the user to navigate a MMUI in a streamlined manner as opposed to navigating in serial manner. Particularly, when the user simulates operating a MMUI during training, the user may then use their vocabulary knowledge to capture data. In some examples, capturing the data, including voice input, causes the MMUI to navigate to a screen page in a non-serial manner where data fields in the respective pages may be appropriately populated, including those screen pages that were not displayed to the user.

For example, the user may retain the phrase "Change of Address" as a vocabulary word so that later, possibly during a simulation or real-time setting, the user may use a PTT tool to capture this phrase and streamline the process for changing an address. The streamlining occurs where the user is navigated to the "Change of Address" screen without first navigating through the Info Center, Location, Rates, and Service screens. In this example, it is not necessary to navigate the screens (Info Center, Location, etc.) to complete the task of changing the address. Given that the user has been exposed to the various screens as well as the vocabulary and inputs fields of the screens, the user is then familiar with steps that may be taken to efficiently streamline the process of changing the customer's address. Further, some data fields may be populated in the various pages/screens—including for example those pages/screens that are not actually displayed to the user. Populating data fields in the pages/screens that are not actually displayed to the user is helpful if the user were to later navigate to those pages/screens during the same transaction. As mentioned, any suitable structure and/or technique may be used to implement streamlining including those disclosed in U.S. patent application Ser. No. 11/966,393, the disclosure of which is incorporated herein.

To further aid the user in becoming acquainted with various vocabulary terms in conjunction with using tools associated with a MMUI (150), interface (430) also includes features which can provide feedback to the user. Examples of these features include a recognition display (440) which shows the interpretation of the user's speech by a recognizer used to process speech input. For example, if the user stated the phrase "Tracking Number," recognition display (440) would display the voice input registered with the recognizer. If successful, the recognition display (440) would read "Tracking Number."

Interface (430) may also include a confidence display (442) which displays the confidence level the recognizer has in its interpretation. In the above example where the user states "Tracking Number" in conjunction with using PTT tool (438), the confidence display (442) may provide a numerical measurement of 85% as to the probability of being correct that this is the data the user intended to capture. Any suitable technique or structure may be used to effectively communicate the confidence level of the recognizer to the user. For example, the confidence display (442) may display such terms as "Low," "Adequate," or "Confident."

An analysis display (444) is further included that may inform the user of characteristics relating to the voice input. For example, if the user's speech volume is above a pre-defined threshold, analysis display (444) might inform the user that his or her speech is too loud. For example, if the user's speech is being stated too quickly, analysis display (444) might inform the user of this issue. For example, if the user's speech is strung together such that the spacing between spoken words is too short, then analysis display (444) might inform the user of this issue. Any suitable technique or structure may be used to effectively inform the user of characteristics relating the voice input. For example, phrases such as "speak slower," "increase volume," or "decrease volume" may be used in conjunction with the analysis display (444).

As shown in the example of FIG. 10, the user may use a speaker utility (446) to hear the words spoken by the user. Speaker utility (446) provides auditory feedback on how well the word is spoken and how well PTT tool (438) is used. For example, where the user needs to increase the volume, the user may increase the volume of the voice input tool or otherwise speak louder. In order to gauge the volume, a user may then use speaker utility (446) to play back the voice input to analyze the volume level. This same approach may be taken in various other situations to ensure that a user is adequately knowledgeable in multiple areas including using a PTT tool and becoming acclimated to speaking various vocabulary. For example, in the call center industry, it is common for agents to interact with customers in a different country. These agents may then be required to become familiar with a language different then the natural language. Allowing the user to hear the spoken speech provides an additional tool to analyze a user's progress with respect to operating a MMUI (150).

In addition to training with vocabulary list (436), interface (432) may also allow the user to speak numbers as entire strings or in natural "chunks", and display the recognized numbers in a number display (448). For example as shown in FIG. 11, the user could speak the number 253 in any of the following ways: "two five three," "twenty-five three," "two fifty-three," "two-hundred and fifty three." Natural chunks are exemplified by the phrases "twenty-five three" and "two fifty-three." It will be understood by those skilled in the art that any suitable technique may be used to effectively speak numbers using a voice input tool. Overall, through the various tools provided in interface (430), the user may learn the appropriate use of vocabulary for a MMUI (150), and, in implementations where appropriate, may learn different vocabularies which might be used at different times.

Figure 12:
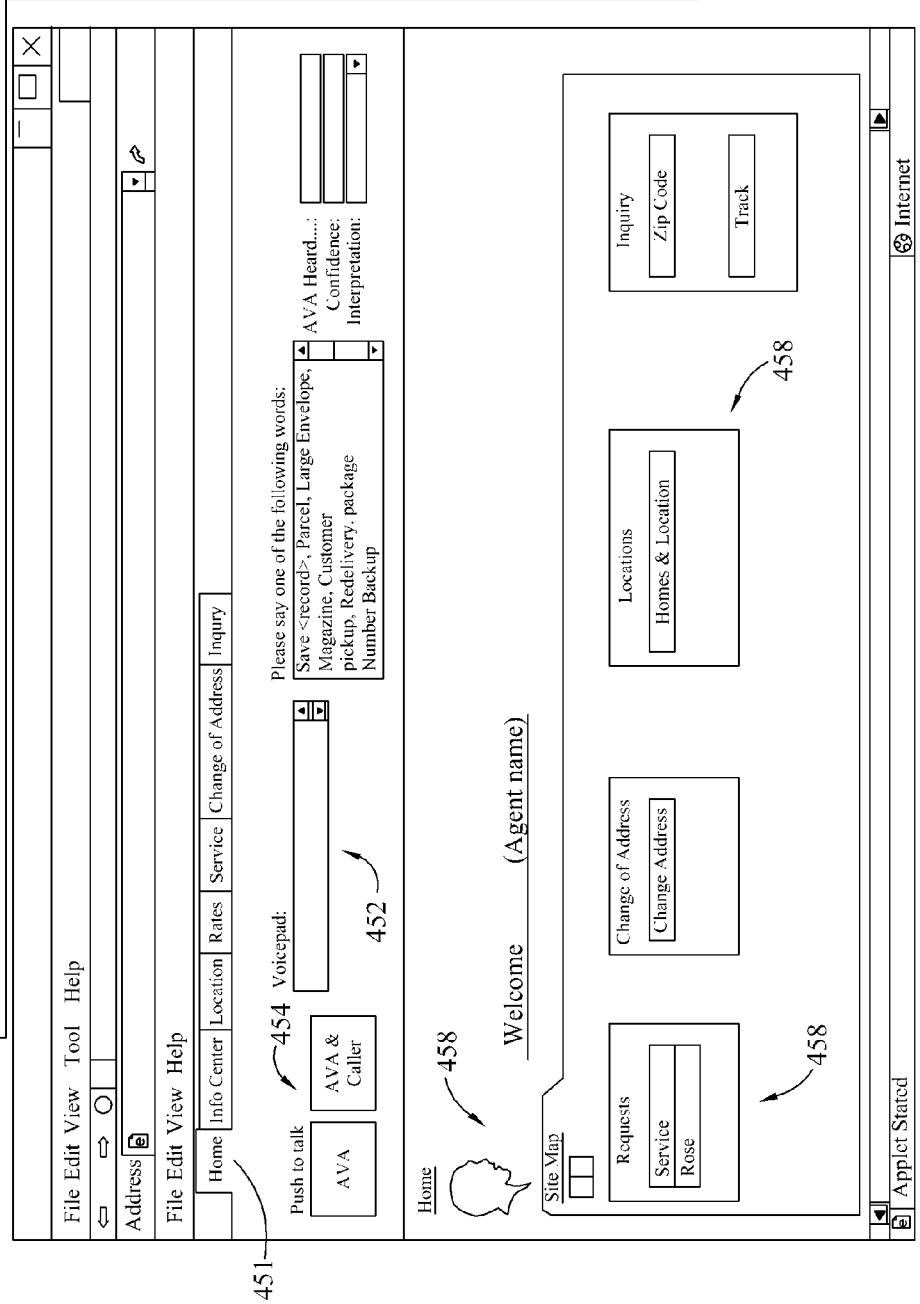
FIG. 12 depicts a seventh exemplary user interface relating to learning to use a multimodal user interface.

FIG. 12 further depicts user interface (450) of module (400) where module (400) presents an exemplary MMUI to the user. Interface (450) is configured to reproduce a MMUI that may be used in a customer service setting including for example MMUI (150). As shown in FIG. 12, interface (450) is configured to display a variety of settings having a plurality of navigation indicators (i.e. home screen (451), info center, etc.) a Voicepad (452), and a PTT tool (454). Interface (450) also includes a navigation aid (456) which might be presented to instruct a user on how to move between fields and options in the interface (450). By presenting materials shown in FIG. 12, an Advanced Concepts module (400) may enable a user to familiarize himself or herself with a MMUI in a training setting before being expected to use a MMUI (150) to respectively process interactions with real callers or practice callers.

A user may navigate interface (450) in conjunction with a prepared training simulation. For example, the user may operate interface (450) based on a simulation. Under these circumstances, the user may be exposed to directions and expected to navigate interface (450) based on these directions. For example, the user may be directed to navigate the "service" page or record a phone number in Voicepad (452). Module (400) may be configured such that the user successively handles various tasks in a certain order where the user is provided the opportunity to complete a task only when the preceding tasks have been successfully completed. The order of the task may correspond generally to a streamlined manner in which a task is handled including entering data in data fields (458). Any suitable structure and/or technique may be used to implement this streamlining including those disclosed in U.S. patent application Ser. No. 11/966,393, the disclosure of which is incorporated herein.

For example, in a situation regarding the changing of a delivery address in a customer service setting, the user may be exposed to a various tasks that begin with interacting with the "Home" page (451) displayed in FIG. 12. Eventually, the user may be directed to interact with the "Change of Address" page. However, under some circumstances, the user may navigate to the "Info Center" page, "Location" page, "Rates" page, etc. before reaching the "Change of Address" page. This is described as navigating in a serial manner. In some systems, users are directed to navigate in this manner in order to ensure that the user's response is complete. Allowing the user to freely navigate may prevent issues including for example problems caused by a user when the mistakenly misses entering data into a navigation page. However, for a variety of reasons including efficiency and better customer service, it is beneficial to train a user to navigate in a streamlined manner. In this example, navigating in a streamlined manner occurs where the user navigates from the Home screen to the Change of Address screen without first navigating to other screens. This navigation may occur based on the data-gathering activities of the user, and independent of the user's choice to navigate to this screen. Streamlining the training allows the user to more quickly learn the operation of a MMUI. This streamlined approached allows the user to learn, for example in a call center setting, to operate in an efficient manner and therefore more quickly address another call and presumably satisfy the customer's desire for a quick resolution. Interface (430) should prepare the user for these training exercises by separately exposing the user to the various screens (434) and the vocabulary (436) associated with a screen such that a user is capable of then later learning to navigate through the screens (434) in their entirety.

It will be understood by those skilled in the art that various situations may be simulated in Advanced Concepts module (400). For example, in a customer service setting, the user may be exposed to situations where customers inquire about product characteristics, return policies, or ordering merchandise. Further, Advanced Concepts module (400) may be configured to expose the user to separate training simulations respectively corresponding to a customer situation where each simulation involves directing the user to complete various tasks necessary to adequately respond to the customer. For each task, the training process is programmed to occur in a streamlined manner whereby data fields are populated and navigation to various screens occurs based on the activities of the user, even where the user does not particularly target that a certain data field is populated or that a certain screen is navigated to.

In another exemplary embodiment, Advanced Concepts module (400) exposes the user to customer statements. Prior to each statement, the user is instructed to achieve a particular goal with respect to the statement. For example, the user may be tasked with storing the phone number of a customer using Voicepad (452). Accordingly, when a customer's statement is presented to the user, the user is then responsible for using the appropriate tools to store the phone number in Voicepad (452). The simulation may continue whereafter the user is prompted to further address the situation regarding the customer whose number was retained. In this circumstance, the user may then be exposed to the remaining sequence of a call where a customer's telephone number is changed for contact purposes, or to record a customer's complaint. For example, if after being told by the customer that "my phone number is 555 123 4567," the user may verbally respond by stating "I am inputting that your number is 555 123 4567 in the system." The user utilizes the PTT tool while simultaneously speaking "555 123 4567" in order to capture this data.

A user of module (400) may be exposed to various other tasks including those directed toward error handling, which includes error detection and error correction. Error detection is enabled by the confidence, interpretation and n-best list rendered by the recognizer. The term "n-best list" refers to a list of words, vocabulary, or selections that most likely correspond to the voice input. In this example, a graphic output for the spoken input and a measure of recognizer certainty is provided. For example, if the voice input is "Redelivery," but the confidence level is low or there are problems with interpretation, the user may be prompted or permitted to view a list of n-best alternatives. Depending on the circumstances, several steps may be taken including error correction that entails using a graphic user interface to type the entry. Another error handling mechanism is to select from a list of n-best alternatives using the keyboard or mouse. Yet another mechanism is to repeat the spoken words. Interface (450) may support a two-step process by speaking a keyword which directs the application to erase the current entry and back-up to the specific location where the error occurred, and then re-entering the data again. This concept is valid for both data and instructions. Navigational error correction is handled in a similar manner, whereby speaking the name of the prior screen directs the application to back-up, and speech is again used to navigate to the target screen of interface (450).

An example of error detection will now be provided. In interface (450) shown in FIG. 12, a user activates PTT (454) to capture the term "Redeliver." The recognizer component of PTT tool (454) does not recognize the phrase such that an error occurs. This error may occur for a variety of reasons including that the voice input was spoken too softly or too quickly. Regardless, the user is prompted to address the issue.

As mentioned, one option is for the user to select from a list of n-best alternatives where 'n' represents a numerical value. In this example, the user may be prompted with a list of words that start with "r". In some embodiments, depending on the navigation location of the user, the user may only be presented with alternatives relating to the navigation location. For example, a user that is currently located in the Home screen may only receive those alternatives relating to the Home screen. Assuming the correct option is available in the list of alternatives, the user may then select the correct choice. Alternatively and as mentioned earlier, the user may correct the matter by using another voice input to replace the error. The user could achieve this by stating "Redelivery" and simultaneously activating the PTT tool.

Further, an Advanced Concepts module (400) may include various types of training other than presentation of information or interfaces. For example, there could be self-paced, computer-assisted exercises in the use of the interface, instruction by a teacher/coach, or other types of activities designed to increase the user's competence. Of course, it should be understood that the discussion of an Advanced Concepts module (400) as set forth herein is not intended to imply limitations on the potential implementations for that or similar modules. Other material, such as previews describing what will be taught in the module, additional interfaces, such as particular task interfaces, and work aids, such charts showing commonly used structures such as confirmation numbers and the phonetic alphabet could also be provided. Thus, the description of the Advanced Concepts module (400) provided herein should be treated as illustrative only, and not limiting.

During or after completing an Advanced Concepts module (400), a set of assessment questions may be presented to verify that the user understands an adequate portion of the applicable material. The user may be prevented from continuing to the next module unless a certain score or knowledge level is reached. The user may also be prompted to answer questions directed toward their comfort level in proceeding to the next module. For example, a set of questions as shown in FIG. 17 may be used. The questions displayed in FIG. 17 relate to whether the user felt it was easy to speak to the computer, whether the user preferred the normal system to the various features of a MMUI (150) to which they have been exposed, the usefulness of the MMUI (150), and whether the user felt as though they would use the tools which they were exposed to. The user may simply check a box to convey their opinion with respect to the questions. It will be understood that any suitable technique or structure may be used to effectively gauge a user's comfort level with training and/or success with training. The user may be offered the opportunity to participate in the module again.

Figure 13:
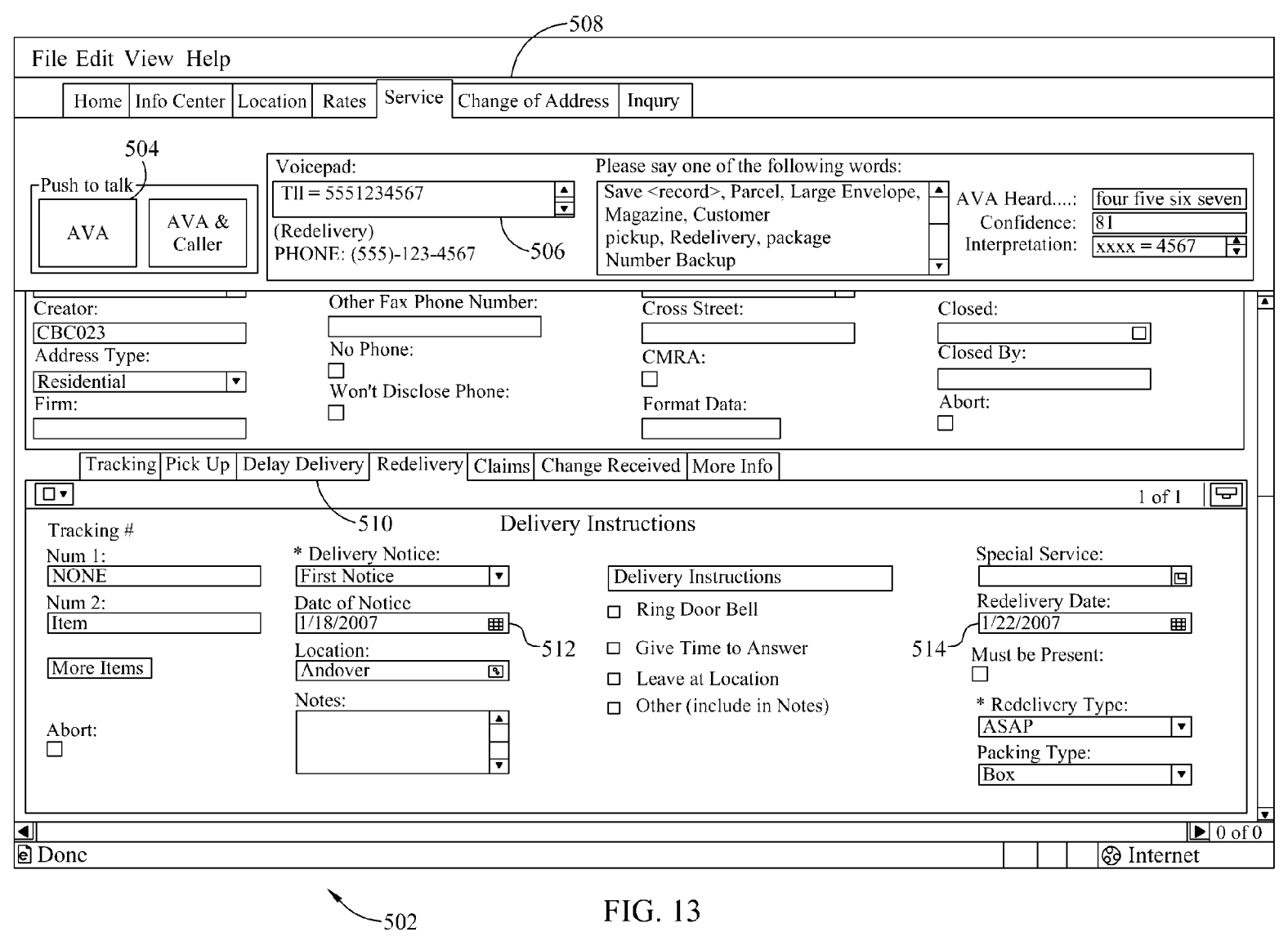

Once Advanced Concepts module (400) has been completed, training may continue with a Service Simulation module (500). Such a module (500) could build on the information presented in the previous modules and tie together the steps needed to complete transactions using a MMUI (150). Generally and as shown in FIG. 13, a Service Simulation module (500) is configured to simulate a real-life MMUI (150) via an interface (502). For example, Service Simulation module (500) may offer a user a chance to use voice input as a direct substitute for inputs which might otherwise be provided using a keyboard and/or mouse. For instance, the user might store a customer's fax number using a PTT tool (504). Service Simulation module (500) may thus illustrate a technique for streamlining the completion of activities using an MMUI (150). As an example of how this might take place, the user may begin by speaking the name of a service, then provide more data as voice input where the data becomes available, have it placed into the Voicepad with other data being automatically filled into data fields as appropriate. As the data is gathered and data fields populated, navigation may occur independent of a user's explicit choice to navigate. In this manner, the user is being taught streamlining by demonstrating to the user the particular fields that are generally populated during this transaction as well as the navigation sequence that occurs to complete the transaction.

Streamlining may use a specially configured set of computer executable instructions configured to accept a spoken keyword to start a service transaction (or partial service transaction). This starts a sequence of events based on assumptions that have a high confidence value. It follows the best path of call handling for each particular service type. Streamlining captures a complete task in a tightly scripted dialog. The user of a MMUI initiates the specific service, through voice, which starts a sequence of shortcuts comprised of navigation steps and population of specific data fields with default values. The transaction may pause at specific points to accept data that the user requested, the caller provided, and the user spoke. The streamlined transaction then moves to next task, until the service is completed. For example, "Hours and Location" starts the process and waits for entry of the ZIP to provide contact information about the vendor or retrieves ZIP information from Voicepad to continue.

Streamlining begins with identifying the work flow used by the user and caller to complete a service. The key steps of the spoken dialog that supports the work flow are determined, irrespective of the underlying interface. The key steps are pre-determined and may be designed to be as minimal or as complete as desired. A command sequence that is triggered by speaking the service name, and expects only the minimal amount of critical-path information in order to complete the service. It is assumed that typical default values for all details while permitting changes to the details if the user or caller volunteers the information. When the user speaks, the data is accepted and the transaction is automatically attempted to be moved further. Streamlining lets the user enter the data when it is provided by the caller rather than when a data field appears. The data is stored in a larger context (e.g., the Voicepad) until interface presents the screen to accept it, and auto-launches any subsequent steps in the meantime. In streamlining, steps are not removed but are automatically executed if assumptions are found to be true. Any suitable structure and/or technique may be used to implement streamlining including those disclosed in U.S. patent application Ser. No. 11/966, 393, the disclosure of which is incorporated herein.

As an example of streamlining with respect to FIG. 13, an initial command like "Redelivery" leads to execution of "new service selection." The application supporting the MMUI then waits for the agent to speak the telephone number upon which it auto-launches the next series of tasks (which may themselves comprise subtasks). For the Redelivery transaction type, these tasks may include Address Lookup Request, Pick Record, and Start Service Selection. A call flow shortcut may be automatically launch a "new service selection," "Redelivery," or "No Package received." "New Service Selection" may also be individually accessed with a voice command.

As mentioned earlier, the user is placed at the Service Selection screen, awaiting a Telephone Number after stating "Redelivery." When this telephone number is given, the following sequence may be executed:

Telephone number is stored in Voicepad
Address Lookup will be automatically launched;
if one address is available, screen will be updated with customer data
if multiple addresses are returned, pick record will be launched
<service type> will be placed in the service type field;
Start service selection will be automatically launched.

If conditions of the customer record do not enable automatic launch, the user is left in a recoverable state where other responses can be used to carry on the transaction. An error can be handled by speaking "cancel" or a similar word to back-up to the service selection screen or the last state where the transaction is known to be correct for re-entry of the telephone number (TN). An exemplary dialogue further demonstrating this example is provided in Table 1 and explained in more detail later.

In at least one embodiment, the training for streamlining involves teaching the user to control the dialog and therefore to obtain the data required to complete the transaction. While a streamline is developed to capture the normal sequence in which data is provided by the caller, it is often the case that some information may be given out of order (hence, using the capabilities of the Voicepad), or that the information is missing so that the user is required to request the information. Streamlining may also include learning the model of the overall transaction so as to drive it to completion. Streamlining may also including learning components of an overall transaction so as to allow the user to drive the transaction to completion where the user may not begin the transaction from a common starting point. This issue is relevant where a user is being requested to complete several tasks (i.e. Task A, Task B, and Task C). The user may be taught to complete these tasks out of order (where possible), in order if necessary, or otherwise complete these tasks in a streamlined manner where the user only becomes aware that multiple tasks exists after completing a first task. For example, this would exist in a call center setting where a customer requests the user to complete a first task of tracking a delivery and then a second task of changing the delivery address. Streamlining involves teaching the user to complete the transaction and both tasks in an adequate manner.

Streamlining often includes multiple navigation steps, and may include "time-out" events wherein the user can review the retrieved data and accept the results or change them, before the application automatically defaults to a predetermined value and moves to the next state (screen). Repeated practice and use of a Service Simulation module (500) aids in the learning of streamlining and hence enables the user to achieve a degree of MMUI competence suitable for handling real-life tasks without the concern for explicitly recalling the actions to navigate, enter data, or obtain closure of a transaction.

In an aspect which might be incorporated into a Service Simulation module (500), users are presented with pre-determined, potential call flows which the users may then practice processing using interface (502). For example, to provide practice for the transaction of requesting redelivery of a package, the following example transaction, as shown in Table 1, might be presented. The text in normal print represents words spoken by the user ("John"). The text in italicized print represents words spoken by the customer. The text in bold is the voice input being captured by the user. Other wording is displayed in Table 1 that references action taken by the user (i.e. "Click OK").

TABLE 1

Exemplary transaction for redelivery service.

Hello. This is John. How may I help you?
   *I got a notice on my door that says you tried to deliver a package to me.*
I can help you with a new service to redeliver that package.

TABLE 1-continued

Exemplary transaction for redelivery service.

I need some of your information. What is your telephone number?
   *My number is 555 123 4567*
That number is 555 123 4567.
Let me do an Address Lookup
   [agent verifies information]
I need to Format the Address
OK, Input Record.
And the service is Redelivery of your package.
   Click OK [required mouse click, or KB "enter"]
When did you receive the notice?
   *"January 18th"*
   [provides notice date]
Notice Date was January 18th.
When do you want the package redelivered?
   *"January 22$^{nd}$"*
   [provides redelivery date]
Redelivery Date is January 22$^{nd}$.
I'll "save" this transaction.
The Confirmation Number is . . .
   Click OK
Thank you and "GoodBye"
   [return to Home Page]

A discussion of navigating the system supporting interface (502) will now be discussed with respect to the transaction in Table 1. The transaction begins with the user stating "Hello. This is John. How may I help you?" In response, the following is presented to the user: "I got a notice on my door that says you tried to deliver a package to me." At this time in the transaction, the user may decide to take several courses of options to respond to the user. It is presumed that the user is currently positioned at a Home screen interface, similar to that shown in FIG. 12. The user may engage in a conversation with the user and store data into the Voicepad tool while remaining at the Home screen. Alternatively, the user may navigate in a serial manner through the various screens (i.e. Info Center, Location) until reaching the screen that is applicable to this issue. This former approach would be efficient for training purposes.

Based on the user's previous training in Basic Concepts module (300) and Advanced Concepts module (400), the user is navigated directly to the "Service" screen (508) shown in FIG. 13. The user is navigated to this screen by using the PTT tool (504) to capture the spoken words "New Service." Upon capturing these words, the user is automatically navigated to screen (508) without the user independently selecting the service page. Upon navigating to the "Service" page, the user is then presented with the issues of navigating through a series of sub-screens (510) including "Tracking, Pick Up, etc." In order to select the page, the user then prompts the caller for information to verify the user's identity. In this case, the user prompts the caller for a phone number. After the caller provides the phone number, "555 123 4567," the user verifies the phone number and simultaneously activates PIT tool (504) to capture the phone number in Voicepad (506). Various data fields, including those shown in FIG. 12, are populated with the telephone number. This may include respective data fields relating to the Info Center screen and Change of Address screen. The user then activates PTT tool (504) to capture the spoken phrase "Address Lookup" to verify the caller's address. Capturing the phrase "Address Lookup" causes the stored address of the customer to appear. The user would have known to use this phrase for this purpose based on the training received in the prior modules. Upon verifying the customer's address, the user then formats and inputs the address whereupon the address data field is populated in interface (502), as well as data fields not displayed in interface (502).

The user then activates PTT tool (504) to navigate the "Redelivery" sub-screen (510) by capturing the spoken words (i.e. voice input) "Redelivery." Upon navigating to the "Redelivery" sub-screen, the user is then prompted to fill in the required entry fields having an asterisk (*) proximate thereto including for example the "Delivery Notice" field and the "Delivery Type" field.

The user may also input data into the Date of Notice field (512) and Redelivery Date field (514). Data may be entered into these fields by asking the caller questions about the applicable data. For example, the user may be asked "When did you receive the notice?" and "When do you want the package redelivered?" The dates provided by the caller or user may be captured as shown, and stored in Voicepad (506) to be entered into the respective data fields. Finally, a record of the call transaction may be saved and completed using the PTT tool via the voice inputs "save" and "Goodbye." Upon capturing the phrase "Goodbye," the user is navigated to the Home screen.

This example transaction in Table 1 displays that the user may control the flow of the call to streamline the response. For example, by using PIT tool (504), the user is more easily able to navigate through interface (502) and enter data into respective data fields. Basic Concepts modules (300) and the previously-encountered portions of Advanced Concepts module (400) prepared the user to complete this portion of the training by first exposing the user to the broad principles of a MMUI and then later to the more detailed features of a MMUI including keywords and phrases, as well as the various navigation screens and/or pages.

The user could then practice processing that transaction shown in Table 1 to gain familiarity using interface (502) shown in FIG. 13. For example, the user could perform the necessary interactions for two to three repetitions to gain a comfortable feeling with it. Streamlining this process, including by navigating the user to a certain location or populating data fields based on the data captured by the user, allows the user to more quickly learn at least adequate operation of a MMUI (150).

As a further feature which could be incorporated into Service Simulation modules (500), there might also be role play sessions, where a user speaks with an automated response system performing the role of a caller. Such role play exercises might be facilitated in a variety of manners. For instance, in some cases, the automated response system may be provided with a content and a manner for use during the call. In this context, the "content" would refer to the information which would be typically supplied by the caller for completion of the transaction, such as telephone number and zip code. By contrast, the "manner" refers to the communications style (e.g., word order, rate, phrases, etc.) that the caller uses. Of course, other techniques may also be used, such as providing a script to the automated response system. For example, a trainer (including human or automated) may configure the role-play session prior to its start. The trainer may enter a set of keywords that the user should be tested on during the session. The keywords may be populated into an array of the module. During the training, the user may be exposed to these words for various purposes including but not limited to having the user become exposed to the words, providing the user the opportunity to capture the words, and other similar methods. Of course, other variations are also possible, and those set forth explicitly herein should be understood as illustrative of possible techniques only, and not limiting.

During interaction with a Service Simulation module (500), it is possible not only for users to practice simulated transactions, but also to receive feedback on their performance in those transactions, potentially resulting in a more effective learning experience. This feedback can be derived in a number of manners. For example, there might be a coach observing the various simulated transactions and monitoring the performance of the user playing the role of the agent. Alternatively, or in addition to the use of coaches, the user playing the role of the caller might record his or her partner's performance. This might be facilitated, for example, by a feedback sheet (600) keyed to a script, such as shown in FIG. 14. In FIG. 14, feedback sheet (600) is depicted with each row in the table corresponding to a different statement which would be made by a caller. The user playing the part of the caller might fill in a row of the table after each statement. The information placed in the rows of the table might be structured according to a predetermined format, and the users might be instructed in that format in order to ensure that the marks placed in the table could be meaningfully interpreted.

An example of information (602) which might be provided to enable users to properly indicate performance using the symbols "+", "−", and "○" is shown in FIG. 15, though it should be understood that other techniques for indicating performance (e.g., a 1-10 scale, ratings of "good"→"indifferent"→"bad", etc) may also be used, and that the techniques described herein are not limited to being implemented in the manner shown in FIG. 15.

After successful completion of Service Simulation Scenario module (500), training for the use of a MMUI (150) may continue with a Coaching module (700), one example being shown in FIG. 16. In some scenarios, Coaching module (700) may include training or remediation on optimization techniques and/or frequently encountered situations. For instance, in a case where the user would be expected to handle live customer calls during Coaching module (700), module (700) may begin with adjusting the equipment such that the user will use the settings that he or she is most comfortable with, and/or improves recognizer performance. As an example of this type of adjustment, FIG. 16 shows a volume adjustment procedure which might be performed by users in preparation for taking live calls. As shown in FIG. 15, instructions are provided to the user to appropriately modify a MMUI. In addition to the optimization which may occur during a user's interaction with Coaching module (700), Coaching module (700) might also include review of certain frequently encountered call types. As an example of such a review, Coaching module (700) may include instruction on how to create a New Service, and how to enter a tracking and confirmation number.

After presenting any necessary refreshment or optimization, Coaching module (700) may continue with users handling some number (e.g., 20) of live calls under the supervision of a coach. The coach may record the users' performance, for example by using a skill category checklist such as shown in FIGS. 14 and 15. Using the information recorded regarding the performance of the users in handling live calls, the coach could then provide any necessary remediation, or could identify any areas which might need to be subjects of assessment in the future.

Coaching module (700) may also include subject matter directed toward debriefing a user. Such subject matter may include one or more sessions during which users might discuss or describe issues which had arisen during call handling. During such sessions the users can be encouraged to reflect on their actions, and may be presented with feedback from their peers and/or a coach. Specific types of calls and/or callers who may have presented problems for the users could also be discussed in the debriefing. An additional aspect of the debriefing may be a questionnaire designed to elicit feedback from the users which can be used to measure their satisfaction with a training system (100), and to identify areas where the training system (100) may potentially be improved. An example of such a questionnaire (704) is shown in FIG. 17, though that questionnaire should not be thought of as limiting. For example, questionnaires could be presented to gather information about a user's ability with regard to navigation, terminology, flow, voice processing, ease of use, service, tasks, effort, etc.

Another aspect of debriefing may be to detect whether the user is having difficulty with particular areas and/or may be in need of additional training. This aspect could be implemented in a variety of ways. For example, the identification of areas in which a user is having difficulty may proceed based on measurement of predetermined factors, such as whether the user has a generally slow average call handle time when using the multimodal interface, whether the answers provided by the user in a questionnaire indicate difficulty using the multimodal interface, whether the user has difficulty using a PTT tool, whether the user's statements generally have a low recognition rate, whether the user excessively uses a mute button, whether the user's speech shows uncertainty in which words to use (or the user uses the wrong words), or whether the user's workflow shows a reluctance to use streamlining. If such difficulties are detected, the user might be provided with additional training designed to focus on the particular areas where a deficiency has been identified. Alternatively, it is possible that the user will be given a grade which indicates that the user has successfully mastered the use of the interface (or multiple grades showing proficiency with parts of a MMUI (150), as appropriate for a particular situation).

Finally, in the case of training relating to a MMUI (150) provided to prospective users in a customer call center, once the users have been identified as having successfully completed the training (e.g., as shown by a grade, or a certificate designating competence level), the users can be assigned to the processing of customer interactions using a MMUI (150).

As set forth previously, the inventors contemplate that the techniques described herein can be applied in a variety of situations beyond training call center agents in the use of MMUIs such as described above. For example, the use of training modules can be integrated into training for consumer devices, such as PDAs, where particular training modules might be activated in response to user request (or detected user inability to use particular interface features). Similarly, if an internet site were augmented with a MMUI, then training such as described herein could be presented to a user of that internet site to enable him or her to more effectively benefit from that site's enhanced interface. Also, it is possible that the techniques described herein could be included in a "train the trainer" type service, which may be used to train coaches and others who might then provide further instruction to additional users. Such a "train the trainer" program may include tips which would help the trainer contextualize their material to be presented to users, and understand how different concepts and activities are integrated into the broad scheme of a training program.

As an example of such an application, FIG. 18 shows an outline (800) of different training modules correlated with concepts which are included in each module of training. In one exemplary embodiment, each module corresponds to a different level of complexity related to the underlying operations of an MMUI (150). Of course, it should be understood that materials, such as FIG. 18, are not limited to applicability in a "train the trainer" scenario, and may also be provided directly to end users themselves. Thus, the techniques described herein should not be limited to the training of employees.

As further shown in FIG. 18, the outline (800) depicts a total of five modules: an AVA Description module (802); a Word Sequences module (804); a Simulation of Caller Transactions module (806); an On-the-Floor Coaching module (808); and a Debrief and Remediation module (810). Below each module is a list of subject matter associated with the respective module. These lists are not meant to be inclusive or exclusive. Hence, it will be understood by those skilled in the art that any suitable subject matter may be included provided it serves to train the user. Likewise, it will be understood that this outline may be applied to other systems, aside from an AVA system.

The first module is the AVA description module (802) that trains the user by displaying screens shots that explain the use, components, and other aspects of the AVA system. This may include teaching the user about specific AVA words that are used to navigate through the AVA system as well as populate data entry fields.

Module (802) may include a discussion of step-by-step transactions that a call center agent using an AVA system may typically encounter For example, a user may be exposed to a transaction where a customer is attempting to lodge a complaint regarding a product or service, or request redelivery of a product. The user may be exposed to demonstrations of the successful operation of an AVA system as well as unsuccessful operation of an AVA system. Training users with respect to successful operations may encompass training in streamlining. For example, the user may exposed to a tutorial explaining the purpose and definition of streamlining, and/or a demonstration of a streamlining.

The second module is Word Sequences module (804). As shown in FIG. 18, this module may encompass reviewing keywords and phrases with the user. For example, the user may be provided by sheet or chart displaying the words in various categories. Subsequently, the user may practice capturing phrases or words using a PTT training tool. Depending upon the circumstances and language barriers, there may be particular words that a user is educated on. For example, in a customer service application, the names of products or product lines may be tested to increase a user's familiarity with words that are not otherwise commonly used.

Word Sequences module (804) may include role-playing. The role-playing may be governed by a guidance system including a human or automated agent. The role-playing may include standard transactions and/or transactions that a user commonly has problems performing. Additional components of this module include features directed towards transaction handling and error handling. An assessment may be provided in Word Sequences module (804) in a variety of ways. The assessment may include interaction with a human trainer or an automated trainer. For example, the assessment in this case may relate to questions for judging the user's knowledge of the AVA system or aspects thereof, and/or an interview of sorts where the trainer asks the user questions about their familiarity with the AVA system and/or to complete a series of tasks. For example, the user may be instructed to "Describe the Push to Talk tool and the uses for it" and/or "Please capture the phrase 'complaint' using the Push to Talk tool."

The Simulation of Caller Transactions module (806) provides a user the chance to operate an interface in a real-life situation, or simulated situation. The module (806) begins by receiving knowledge of the PTT tool and respective keywords. For example, the user may be reminded of the various screens of a system, such as the Home screen, Redelivery screen, and so on. The user may then be exposed to a step-by-step procedure (AKA serial procedure) for a caller transaction. In this example, the user may be allowed to interact with an interface of an AVA system to respond to a caller who would like to track a package. The user would complete this transaction in a step-by-step manner that would not otherwise fall under the category of being streamlined. Following the completion of this transaction, the user views the assessment of the step-by-step response. Any suitable technique or structure may be used for the assessment provided it adequately measures the user's actions.

Upon completing this assessment, the user is then exposed to streamline training. In this training, the user relies more heavily on using the various tools of an AVA system, such as the PTT tool and Voicepad, to more efficiently respond to a customer. This training may include error detection training where the user learns to deal with problems that occur during operation of the AVA system such as the PTT tool not recognizing a voice input. Positioning the streamline training proximate to the step-by-step training should illustrate the differences between the approaches and the advantages of using the streamlined approach.

This same approach may be taken with live calls where the user first takes the step-by-step approach when dealing with a live call, and then uses a streamlined approach in response to a call. The complexity of the call (either in a given interaction or subsequent interactions), may increase over time. Finally, error handling, and assessments may be incorporated into the real-time training.

After Simulation of Caller Transactions module (806), the user is exposed to On-the-floor Coaching module (808). This module provides real time feedback and guidance with respect to a user's training. For example, when a user is operating an AVA system in a call center setting, the user may receive feedback after completing a call. This feedback may come from a human coach. This coaching may taken place for any suitable period of time that is adequate to train a user. For example in the call center setting, the coach may remain with the user for a period of sixty minutes while the user interacts with numerous customers. After each customer call is completed and/or at the end of the hour, the coach may offer the user feedback with respect to the user's operation of the AVA system. For example, the coach may critique the user's ability to streamline the operation of the AVA system and/or use the PTT tool. This coaching may also include real-time aid. For example, the coach may have the ability to take control of a customer call from the user in order to intervene and demonstrate to the user a correct way for responding to the customer. This module is monitored by an automated system. This module may be monitored such that the transactions and/or activities occurring during the user's interaction with the module may be recorded. This allows the user to later review the events that occurred during the module for further educational emphasis. The human coach may input feedback into the module that the user is able to access. Likewise, the feedback may not be accessible by the user. This feedback may become part of the stored record.

Further, the coaching may occur remotely such that the coach monitors the activities of the user and interacts with the user via voice or text, or other similar method. For example, as the user is operating the MMUI, the coach may offer feedback via a pop-up window or via voice through computer speakers, earphone, or similar device. The coach, via a second interface, has access to the events being displayed to the users via all modalities.

Finally, the last module is Debrief and Remediation module (810) where a coach, either human or automated, may provide the user with feedback regarding the user's specific performance. For example, this feedback may include quantitative data collected during the user's performance such as call handling time, number of calls received and so on. Likewise, the feedback may include qualitative data with respect to supervisor's feedback or coach's feedback. The data may be compared to a target including the average scores received by previous trainees. Specific subject matters may be mentioned in module (810) including the user's ability with regard to the following: operating the system using a step-by-step approach, operating the system using streamlining, and error handling. Overall, various modules may be used in various capacities provided these modules are suitable to adequately train a user.

As a further example of variations which could be implemented on the description set forth above, it should be understood that even training which is implemented in a call center setting might vary from what was previously described. For example, instead of having modules as set forth previously, a training program may have modules as shown below in Table 2.

TABLE 2

Exemplary module progression.

| Module Title | Summary Description | Time |
| --- | --- | --- |
| Basic Concepts | What is the interface (overview) Words, steps and streamlines | 1-2 hrs |
| "Push to Talk" | Using the PTT tool | 1 hr |
| More Concepts and Hands-on | Visual screens and verbal phrases Practice steps, streamlines, and error correction | 2-3 hrs |
| Flows | Step-by-step and streamlined workflows Exceptions and error correction | 2 hrs |
| Simulations | Goals and types of calls Practice | 2 hrs |
| Coaching | Optimization Controlling the dialog Key phrases Best practices | ¼ hr |
| Debrief and Shared Experiences | Unexpected events Feedback Extra training | ½ hr |

In the example training program described in Table 2, the user is first exposed to a Basic Concepts module. This module describes the MMUI to which the training program relates. For example, in a customer service setting, the Basic Concepts module may broadly describe the customer service industry, the goals of this particular business entity for whom the user is employed, a demonstration of the MMUI itself, and/or the various components of the MMUI. Finally, the module may present subject matter relating to the purpose of the training. For example, the module may explain to the user that the goal of this training is to learn how to streamline the user's operation of the MMUI. Depending upon whether a new user or current user of the MMUI is being trained, the content of the Basic Concepts module and the other modules may be different. The duration of the Basis Concepts module may be equal to a period of one to two hours. However, as with any of the modules disclosed herein, any suitable time length may be used provided the duration effectively conveys information to the user.

Upon completing the Basic Concepts module in Table 2, the user may be exposed to a Push to Talk module. This module may be directed towards teaching the user about the functionality and purpose of a PTT tool, as well as providing the user with the ability to interact with a PTT tool. For example, the user may be shown a demo of a PTT tool being used. In another example, the user may be prompted to enter a phrase into a display box using a PTT tool. As with any of the modules discussed herein, the user may be prompted to answer a series of questions regarding the subject matter of the module. For example, the user may be prompted to answer a question such as "what is a PTT tool?" The user may also be prompted to provide any comments or concerns regarding the module or the subject of the module. The Push to Talk module may last approximately one hour.

After the Push to Talk module, the user is then exposed to the More Concepts and Hands-on module. As with other modules, this module builds on the skills and knowledge conveyed to the user in the previous modules. Hence, it increases the complexity of the subject matter. For example, the module may include practice steps using various tools associated with a MMUI and/or an explanation of the streamline process and error correction. This module may explain the Voicepad feature of a MMUI. The module may then permit a user to interact with the Voicepad feature. This module may last two to three hours.

The next module is the Flow module. The Flow module encompasses subject matter directed towards streamlining a user's operation of a MMUI. For example, the Flow module may encompass a demonstration of a user operating a MMUI in a successful manner and/or a poor manner. Further, the module may contain a step-by-step tutorial for processing a simulation. The simulation may include a complete situational use of a MMUI. For example, in a call center example, the simulation may include a simulation of a customer call from beginning to end. As mentioned, during this simulation, the user is able to operate the MMUI with the aid of guidance in the form of a human or an automated system. For example, there may be pauses or decision points in the simulation where a user is prompted to take action. In one simulation, the user may be prompted with a simulated caller asking to change the shipping address of a package. The simulation may prompt the caller with a question or command directing the user to operate a PTT tool associated with the MMUI to capture a portion of the caller's voice input. If the user acts incorrectly, for example capturing the spoken words "Hello" instead of "Change Address," then the simulation may prompt the user to try again.

As mentioned earlier, the Flow module is also directed at teaching the user to streamline the operation of the MMUI. For example, the user may be prompted to observe a streamlined demonstration and/or non-streamlined demonstration. After observing this demonstration, the user may then interact with a simulation in an effort to act in a streamlined manner. For example, in the customer service setting, a user may be prompted to interact with a simulated caller who wishes to track a package. As opposed to gathering the simulated caller's information and/or otherwise interacting with other features of a MMUI, the user may be limited to navigating directly to a "Tracking" page of the MMUI. The user may be provided with a certain amount of time to accurately navigate to this page, and/or a certain number of actions to navigate to this page. If the user does not complete the simulation in the manner required, the simulation may then offer guidance to the user via a voiceover, pop-up window, or any other suitable system that effectively guides the user. Various simulations may exist to be used with the Flow module. For example, a simulation may be directed towards streamlining where a customer is interested in lodging a complaint. The duration of the Flows module may be two hours.

As shown in Table 2, the Simulations module may follow the Flows module and allow the user to interact with a MMUI during a variety of simulations. In this example, the user may interact with a MMUI without receiving any guidance. The user may be provided an amount of time to successfully complete the simulation. As with other modules, a goal or set of goals may be presented to the user before entering the simulation. Providing the user with a goal may allow the user to develop an understanding of a suggested manner for interacting with the MMUI. For example, before beginning a module, the user may be prompted that the goal is "Streamline the Call With Respect to the Customer's Change of Address Request." This provides the user with a general concept as to the purpose of the module. Because the Simulations module may not offer the user any guidance during a simulation, it may be worthwhile to provide the user with the purpose of the simulation. The Simulations module may last approximately two hours.

In the example of Table 2, the Coaching Module follows the Simulations module. The Coaching Module may include allowing a trainer to interact with a user and/or be completely automated. Accordingly, a trainer may receive a data sheet describing the user's interaction with the previous modules. The trainer may use this data sheet to judge and offer tips for how the user may improve, as well as acknowledgment of the user's success. The trainer may also observe at least a part of the user's interaction with the previous modules such that the trainer is able to provide first-hand feedback. It will be understood that any suitable technique or method may be used to effectively provide feedback to a user via a trainer.

Automated coaching may include monitoring and recording the user's interactions with the previous modules. Various data that may be collected includes, but is not limited to, the duration of the user's interaction with the modules, the success rate of the user, the overall scores of the user, and the amount of guidance provided to the user. These scores may be provided to the user as well as compared to a target including a set target or other users. The Coaching module may include a summary of tips describing ways that the user may improve. These tips may include for example a list of vocabulary words which the user needs to become more acquainted with, and/or skill sets that require improvement such as streamlining. The Coaching module may last thirty minutes.

After completing the Coaching module, the user may interact with a Debrief and Shared Experiences module. This module may allow the user to provide any comments, questions, or concerns regarding the training. For example, the user may convey their comfort level with respect to various aspects of a MMUI, including the PTT tool or Voicepad. If the user conveys a certain level of comfort, then the user may be prompted to complete a certain portion of the training again. The user may convey suggestions for improving the training process. During this module, the user may view input from other users or other sources. For example, the user may view information regarding tips for continuing success in operating a MMUI. The users themselves may offer tips for users to view before beginning the training program including any suggestions for successfully completing the training program. The Debrief and Shared Experiences module may last about thirty minutes.

As mentioned earlier, training may occur in various settings. For example, a user of a MMUI may be trained during real-time use of a MMUI. In an exemplary embodiment, the user is trained during the use of a MMUI without being aware of the training. In this sense, the training is implicit in the structure and content of a MMUI. Allowing a user to learn at least adequate operation of a MMUI is an important goal to achieve for a variety of reasons. For example, allowing a user to learn the skills necessary to operate a MMUI may be important for businesses that allow customers to access a MMUI as part of their business relationship. For example, a bank may allow its customers to access bank accounts using a MMUI. It may be in the bank's interest to increase the customers' abilities to adequately operate an MMUI in order to avoid the time and expense necessary to remedy any problems created by inexperienced users operating a MMUI. This banking feature may also act as a great marketing tool to attract new customers who desire constant and easy access to their accounts.

Any suitable technique, component, or structure may be used to train users in the operation of a MMUI. For example, a ladder approach may be used whereupon a user first learns basic concepts regarding a MMUI then the complexity of the subject matter increases as the training progresses. Additionally, a user may be trained in a manner as described above where a MMUI is configured so the user is first exposed to features of a Basic Concepts module (300), then those features of an Advanced Concepts module (400), and so on. As the user gains more experience, the user may be exposed to more complex components of an MMUI. Further, a MMUI may be configured such that the user learns a streamlined process for operating a MMUI. Regardless of the training process or technique, the respective MMUI may be configured such that the structure and content of the MMUI supports the respective training process or technique.

Figure 19:
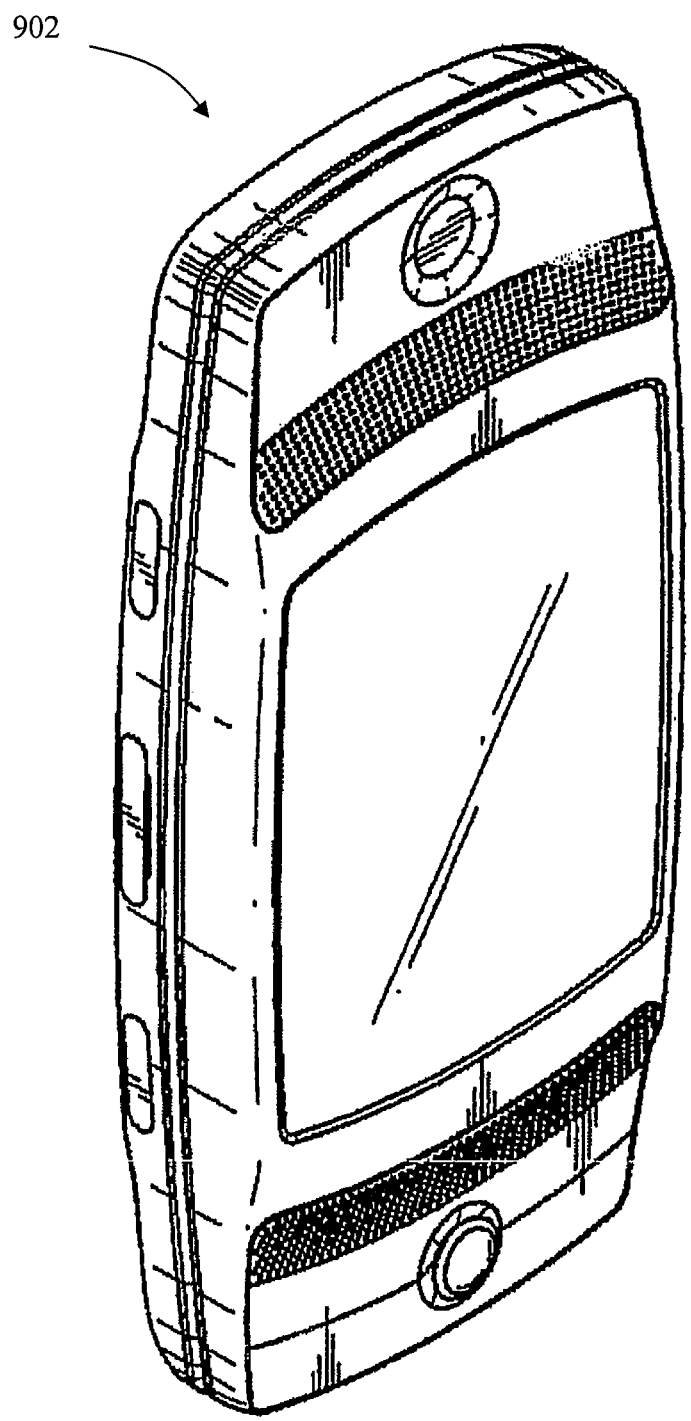
FIG. 19 depicts an exemplary electronic device (i.e. personal digital assistant) that may be used to interact with a multimodal user interface.

In the example of a bank, users may be able to access their accounts via a MMUI (900) using an electronic device (902) such as a personal digital assistant ("PDA") shown in FIG. 19 or a third-generation (3G) telephone. In this example and as will be discussed in more detail below, MMUI (900) is structured in a streamlined manner.

Figure 20:
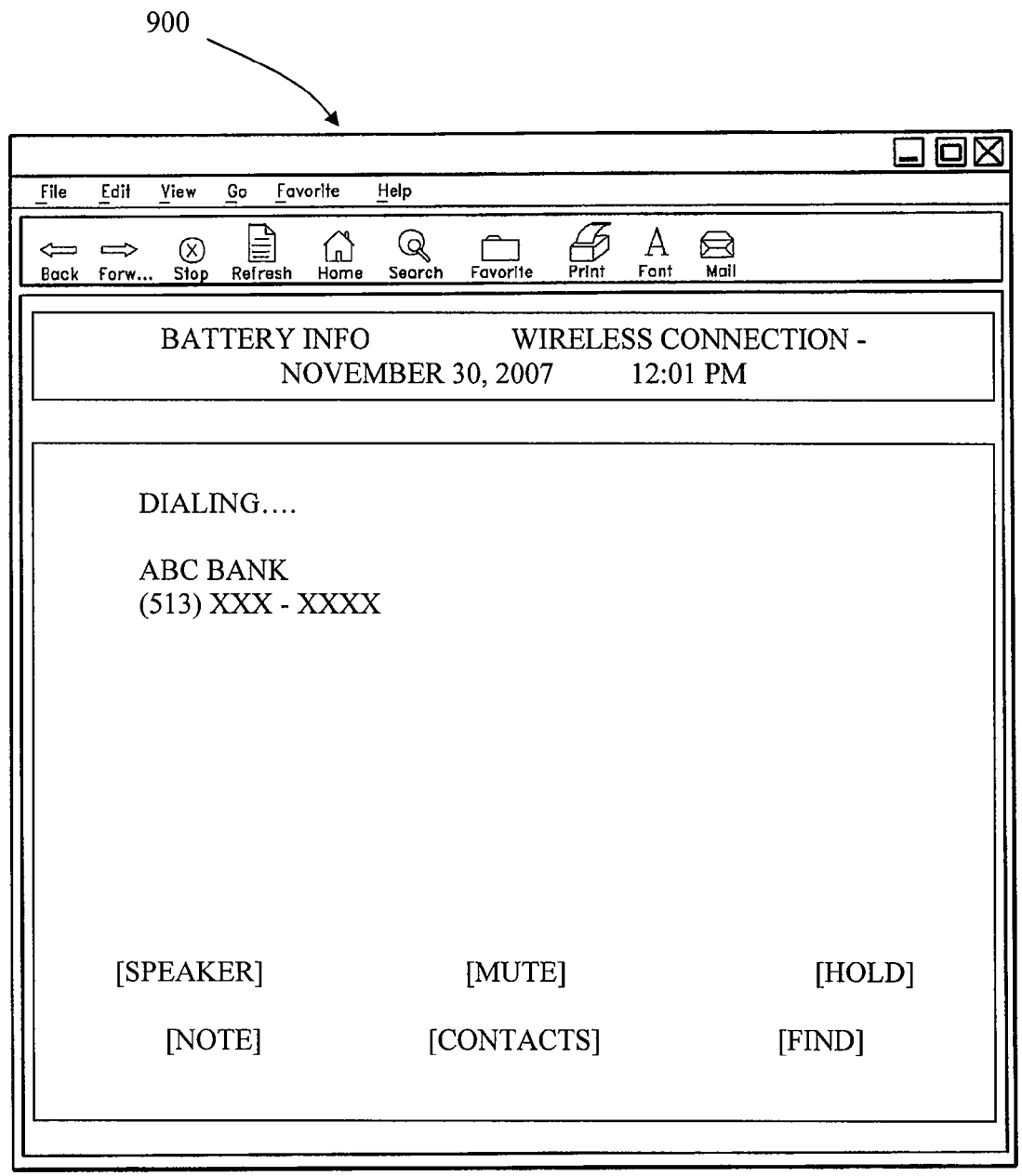
FIG. 20 depicts an exemplary access interface of an exemplary multimodal user interface.

To begin operating MMUI (900), the customer accesses their account by connecting with the bank's network as shown in FIG. 20. The customer may access the bank's network in any suitable manner (i.e., internet, telephone). As shown in FIG. 20, the customer uses a PDA or similar device to dial the bank. The bank may inquire as to the customer's identity and require login information after a connection has occurred. In this sense, the bank is allowing the user to utilize MMUI (900) in a simplified manner in the beginning. For example, the bank may verbally ask a customer: "Please provide your account number and password." A screen would appear on the MMUI that is configured to allow the user to enter (i.e. speaking, typing) the necessary information. In the example, the user speaks the account number, 1234567, and password, secret123. The user may speak the account number in chunks as mentioned earlier. For example, the customer may state "twelve thirty-four five sixty-seven" for the account number and "secret one two three" for the password.

To minimize the complexity required by the customer to use MMUI (900), the customer may be voice prompted to enter the account number and password in an embodiment. For example, the customer may be prompted with: "What is your account number?" After inputting the account number, the customer may be prompted "What is your password?" For security purposes and as mentioned, the customer may be permitted to enter this data without using a voice input tool.

Figure 21:
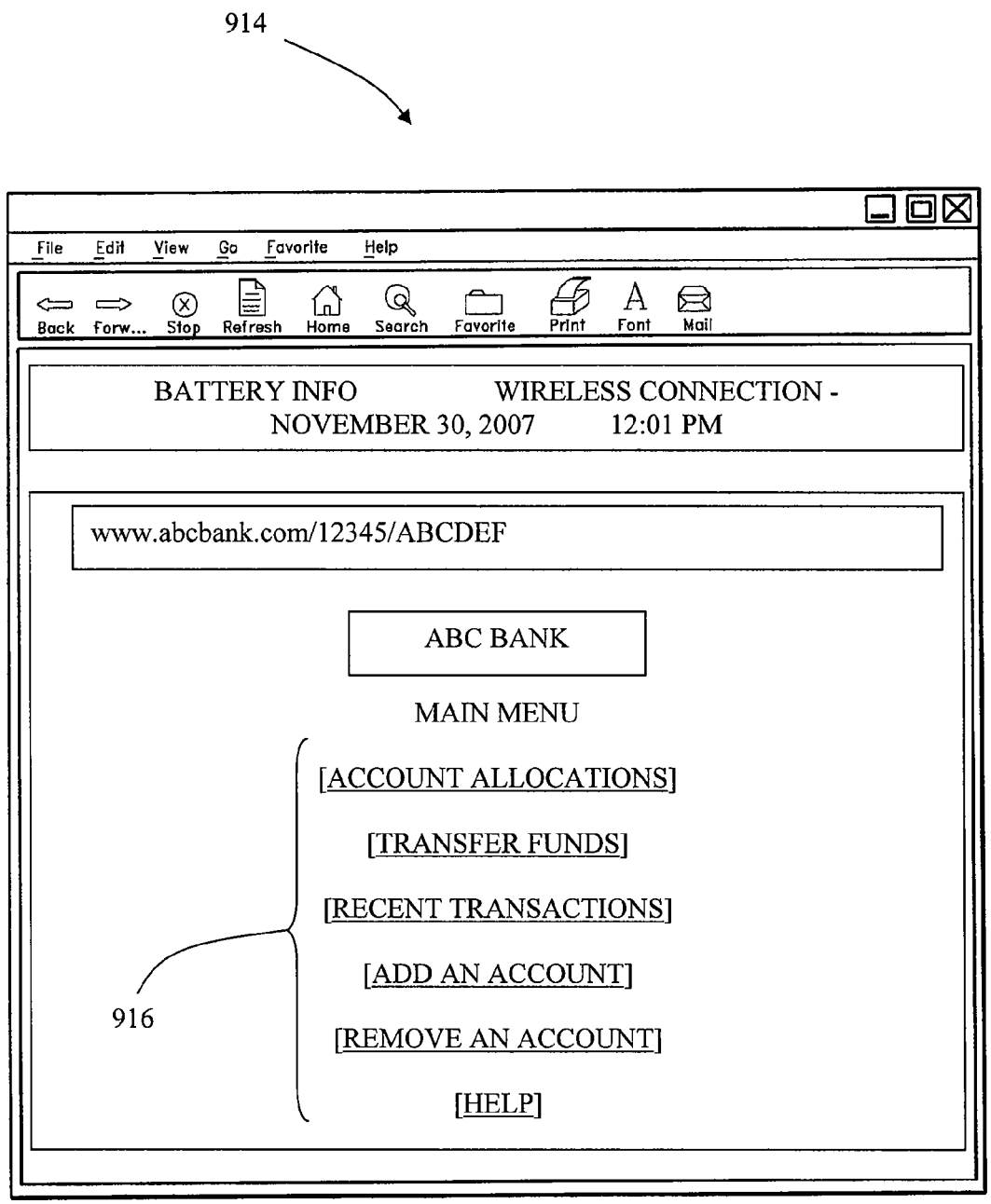
FIG. 21 depicts an exemplary main menu interface of the multimodal user interface of FIG. 20.

Once logged in, the customer may be provided with various options, for example as seen on the Main Menu page (914) displayed in FIG. 21. The customer may be prompted by an automated system verbally stating "Welcome to the bank. How may I help you?" while simultaneously displaying the variety of options (916) shown including: Account Allocations, Transfer Funds, Recent Transactions, Add an Account, Remove an Account, and Help. It will be understood by those skilled in the art that this listing of options is merely exemplary. Any suitable list of options may be used. The list of options may vary for example depending upon the nature use of MMUI (900), and the user's familiarity with operating MMUI (900).

Providing the customer with a list of options increases the complexity of operating the MMUI (900) whereby the customer may select one of the options, as opposed to being limited in one's ability to perform a single action (i.e. enter login information). In this sense, MMUI (900) is training the customer using a ladder approach by first exposing the user to simple actions (i.e. enter login information) and then to more complex actions (i.e. navigation). This type of configuration for MMUI (900) also supports training a customer with respect to specific key words, phrases, terminology, or other options that may be selected by a customer when interacting with MMUI (900). In this setting, MMUI (900) is training the customer to operate MMUI (900) in a streamlined approach. More particularly, as shown with Main Menu page (914), a customer may be trained to learn the keywords Account Allocations, Transfer Funds, Recent Transactions, Add an Account, Remove an Account, and Help.

In this example, assume the customer selects Account Allocations from options (916) using voice input. For example, the customer may state "show my account allocations." Upon selecting this option, the Account Allocations page (918) shown in FIG. 22 appears and displays a summary of the customer's account including the total value of the account, the portion of the account represented by cash, and the portion of the account represented by stocks.

Figure 22:
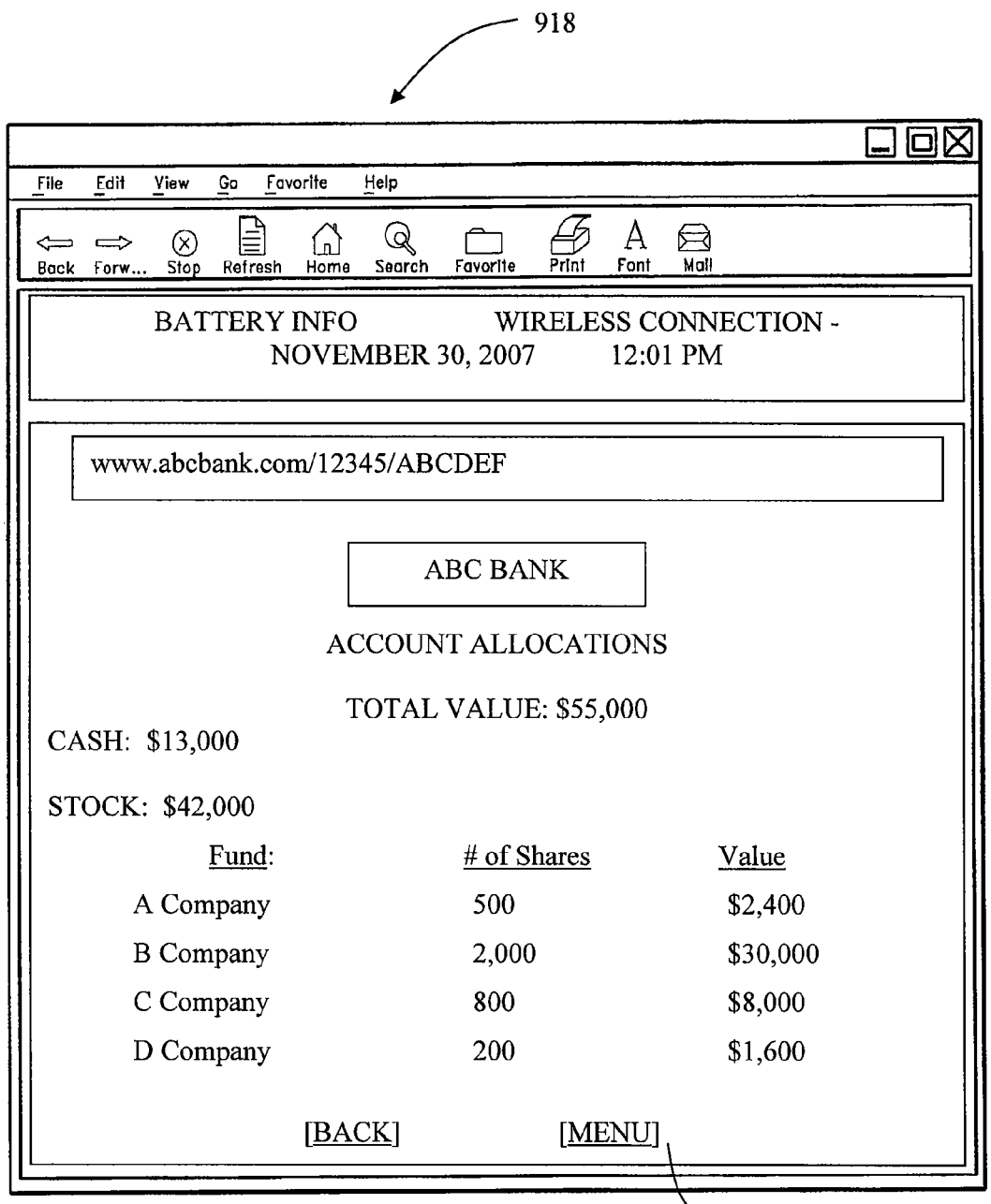
FIG. 22 depicts an exemplary account allocations interface of the multimodal user interface of FIG. 20.

At this stage of operation, as the customer is being shown the display of FIG. 22 with the ability to select the following options shown on the display including "Back" or "Menu," the customer may be prompted to select an option via a voice output stating: "what would you like to do next?" In this example, the customer desires to transfer $5,000 worth of funds from B Company to D Company. In a serial sequence, the customer may navigate from one user interface to the next by selecting the "Menu" option (919) as shown at the bottom of the display in FIG. 22. The customer may then be directed back to the Main Menu page (914) shown in FIG. 21. From the Main Menu page (914), the user selects Transfer Funds from options (916), and continues with transferring the appropriate funds.

However, in a more streamlined non-serial approach, the customer navigates to the Transfer Funds page from options (916) using voice input while the screen shown in FIG. 22 is being displayed. Operating MMUI (900) in this manner streamlines the operation by avoiding the time and energy required to navigate back to the Main Menu page (914) to enter a selection. The customer may enter input to select the option to transfer funds by speaking various keywords. The training should have exposed the customer to the concept that the options (916) shown on Main Menu page (914) contain keywords that may be used when operating MMUI (900). For example, the user may state "transfer $5,000 from B Company to D Company." It will be understood by those skilled in the art that any suitable phrase may be stated including for example "Transfer Funds."

Figure 23:
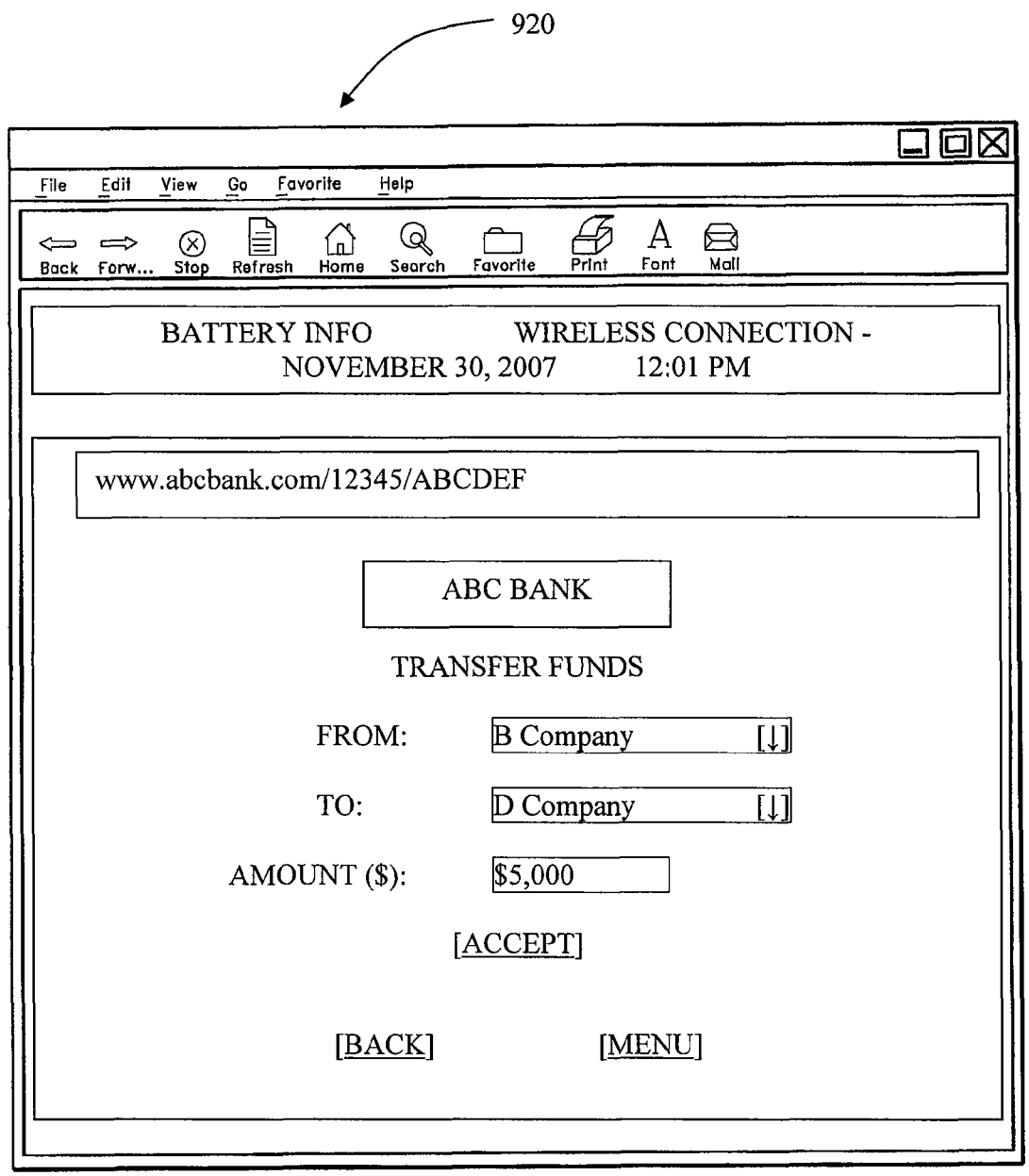
FIG. 23 depicts an exemplary transfer funds interface of the multimodal user interface of FIG. 20.

After responding in this manner, the customer is then navigated to the Transfer Funds page (920) shown in FIG. 23 where the respective data fields are populated with $5,000, B Company, and D Company. The customer is then prompted to respond to the following: "Is the information on the screen is correct?" The network in communication with MMUI (900) is operable to use the voice input to navigate the customer to Transfer Funds page (920) and also recognize the sum being transferred and other details of the transaction involved based on the keywords spoken by the user. The customer has a variety of options available to respond to this display on Transfer Funds page (920). In the situation where the information displayed on the screen is correct, the customer may simply use voice input to enter "yes." Alternatively, if the information is not correct, the customer may enter "no." Also, the customer has the ability to utilize a browser component to alter where the funds are being transferred to and from, and the amount of funds being transferred.

Figure 24:
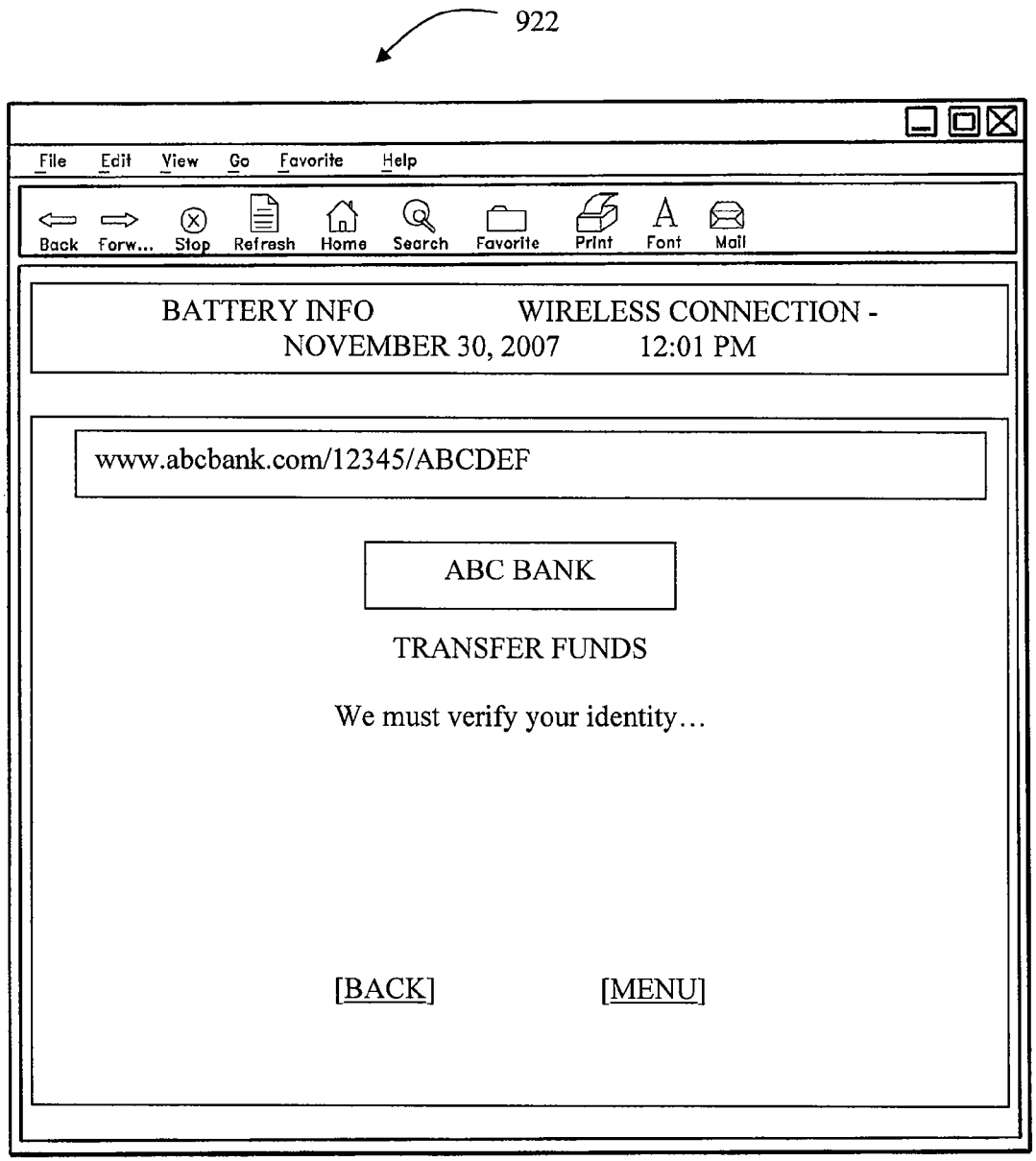
FIG. 24 depicts an exemplary identity verification interface of the multimodal user interface of FIG. 20.
Figure 25:
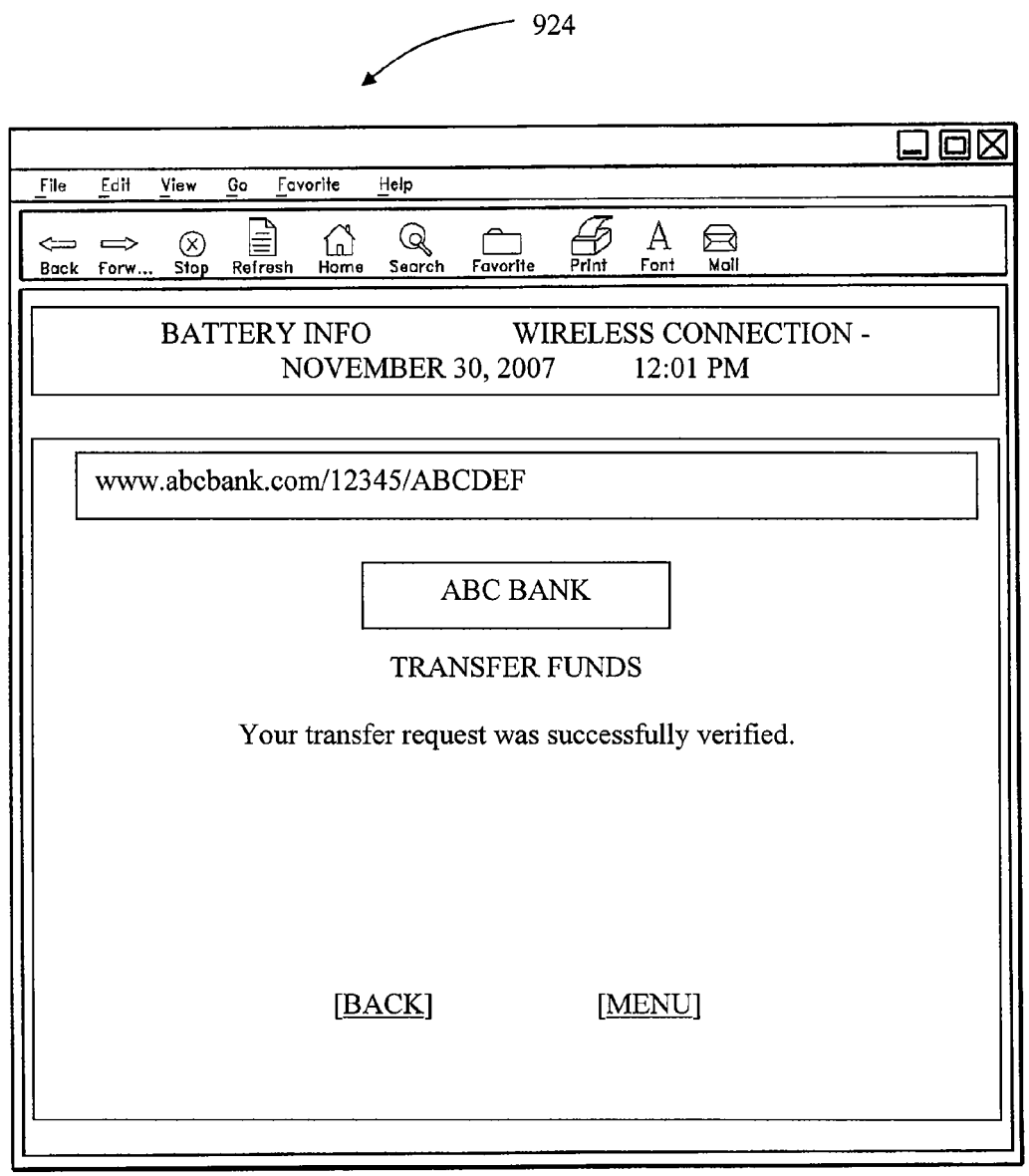
FIG. 25 depicts an exemplary successful verification interface of the multimodal user interface of FIG. 20.

Since the transaction is correct as it appears on Transfer Funds page (920) in FIG. 23, the customer states "yes" in response to the automated communication. By stating "yes", the customer is navigated to a page to verify his or her identity as shown on the Identify Verification page (922) in FIG. 24. In this example, the customer is prompted to speak or enter a certain phrase for voice verification or possibly enter in some type of pin or password. Upon confirming the identity of the customer, the funds are transferred accordingly whereupon the customer is notified of the successful transaction as shown in the Verification Page (924) of FIG. 25.

Upon completion of the transfer of funds, the customer is then prompted with an automated communication asking: "What do you want to do next?" In this example, the customer states "show my recent transactions." The phrase "recent transactions" corresponds to the Recent Transactions option (916) listed on the Main Menu page (914). The user may have learned that this was a keyword to access this feature when viewing Main Menu page (916).

Figure 26:
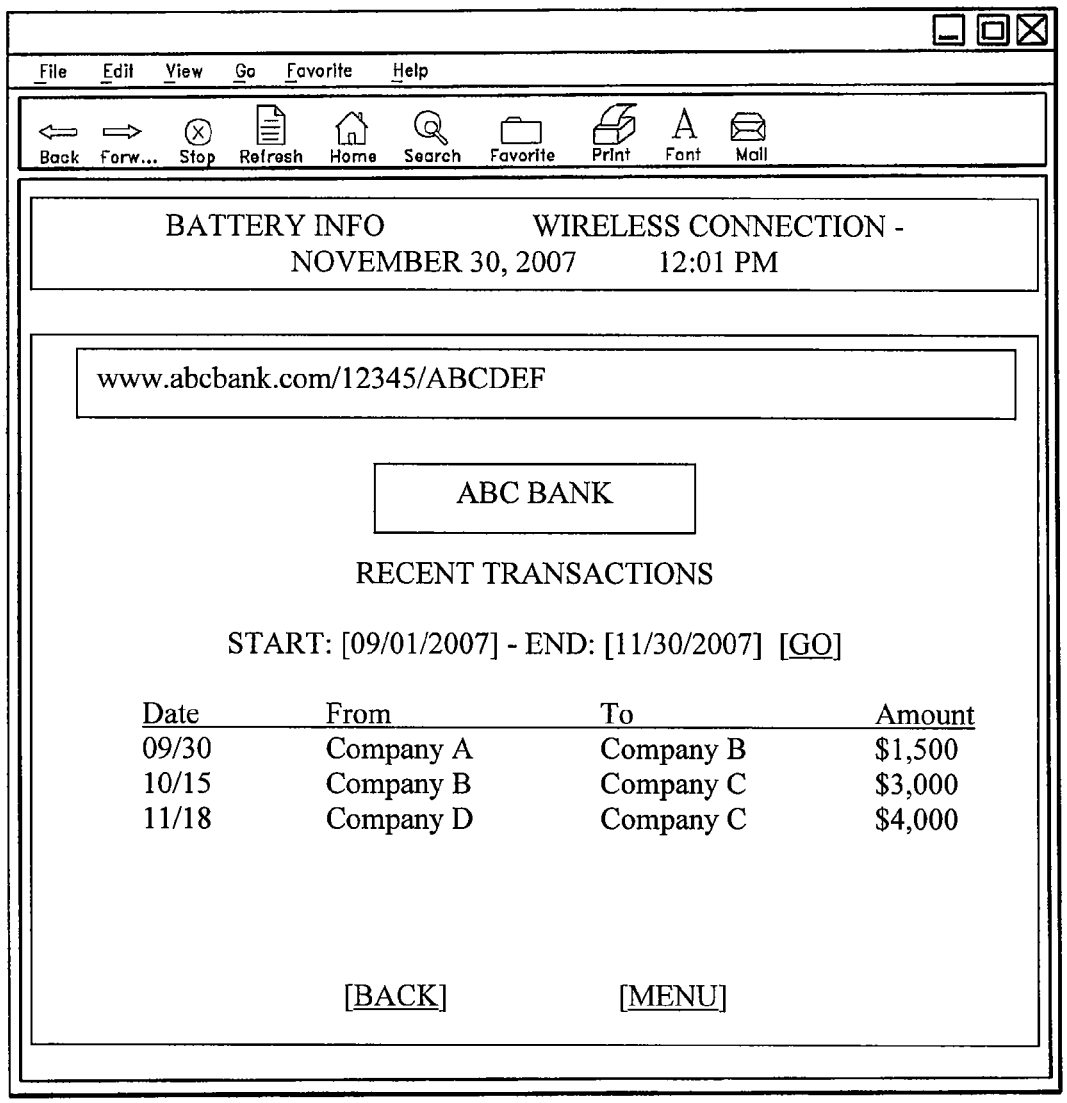
FIG. 26 depicts an exemplary recent transactions interface of the multimodal user interface of FIG. 20.
Figure 27:
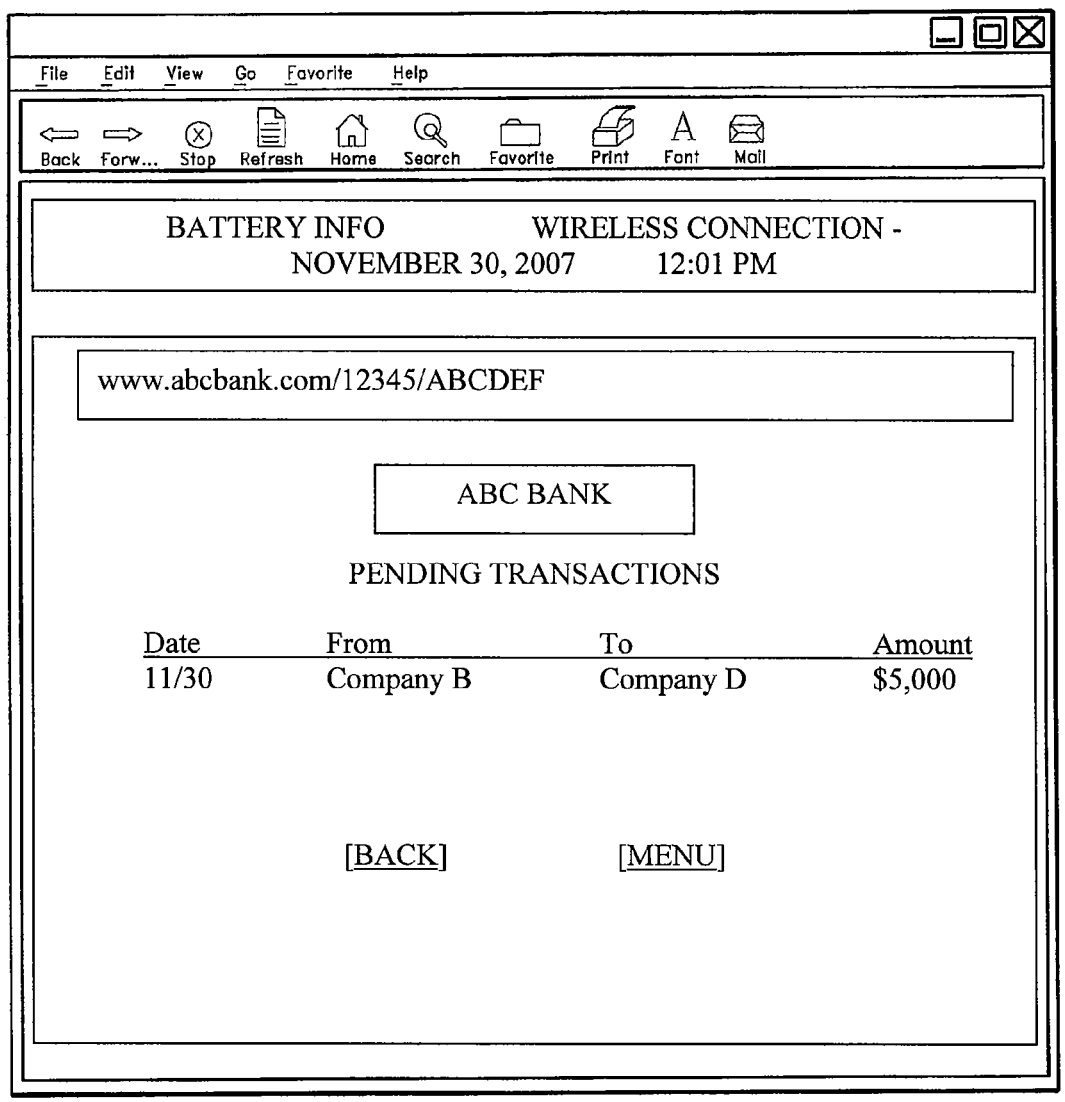
FIG. 27 depicts an exemplary pending transactions interface of the multimodal user interface of FIG. 20.

After stating the phrase "Recent Transactions," the user is navigated to the Recent Transactions page (924) as seen in FIG. 26. Once again, the customer is prompted with the question: "What do you want to do next?" In this example, the user states: "Where is my last transfer?" This phrase is not a phrase recognized by MMUI (900) so MMUI (900) responds with voice output stating: "I'm sorry. I didn't understand that. Let's try it again." The screen shown in FIG. 26 remains displayed while the error is corrected. The user then repeats the same phrase. MMUI (900) is then configured to select an option that MMUI (900) believes adequately responds to the user's request. This may include a real agent interpreting the caller's intention and selecting an option. It will be understood that any suitable technique, component, or structure may be used to determine the appropriate response. For example, an automated agent and/or a human agent may be used to select the option to respond to the user's request in situations where an error occurs and/or the user's response cannot be interpreted properly. In this example, MMUI (900) selects the Pending Transactions option and displays a screen associated with this option as seen in FIG. 27. Simultaneously, MMUI (900) states: "Here is the information you requested." In this example, MMUI (900) displayed the information that the user desired to view. However, in an example where MMUI (900) did not display the desired information, the customer may continue to request information and/or navigate back to the Main Menu page (914) to select from the available options (916).

Generally, the "Menu" option and "Back" option are displayed on the various screens associated with MMUI (900). In this example, the customer may navigate back to the Main Menu page (914) after receiving an automated response informing the customer that MMUI (900) did not understand the user's response. At this point in the example, the customer has completed using MMUI (900) and is therefore able to disconnect from the network. The customer may disconnect from having access by any suitable method including for example stating "goodbye" or "logoff".

The real-life training detailed in the above exemplary sequence is implicit. It will be understood that traditional training for users may be incorporated into this training as well as substituted for it. For example and as discussed earlier, the user may be exposed to an increasing degree of complexity when using a MMUI (900). In this example, the user was offered various options at the Main Menu page (514) and continually exposed to certain options or keywords (i.e. funds, recent transactions) to increase the user's familiarity with a MMUI (900). As the user provided data to the MMUI (900), the user was navigated in a streamlined manner to the appropriate locations whereupon respective data my have been populated into appropriate data fields.

As mentioned earlier, a goal of training may be to allow a user to access and operate an MMUI (150, 900) in a streamlined approach. Examples of a structures that support training users to operate a MMUI in a streamlined manner may be seen in FIGS. 28 and 29, which respectively demonstrate a schematic of the relationship of various components of training.

Figure 28:
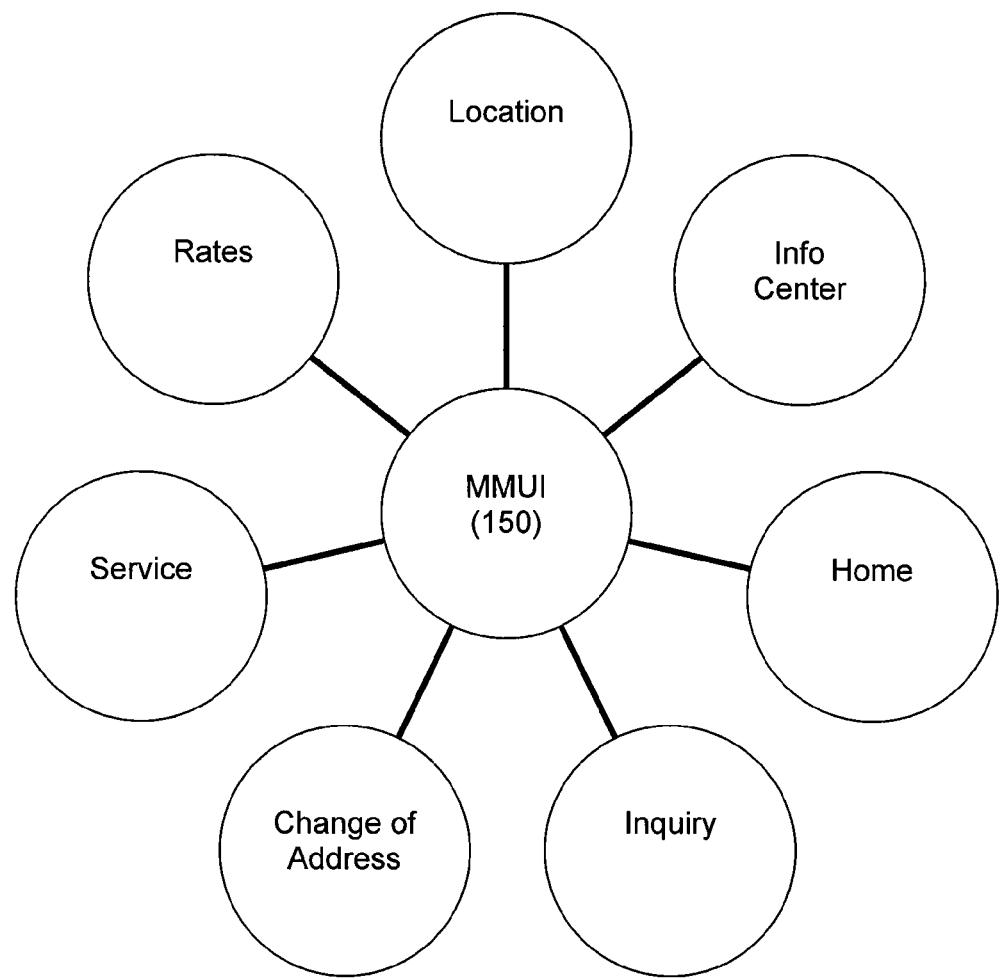
FIG. 28 depicts an exemplary schematic diagram of the configuration of various page options of the graphic user interface shown in FIG. 4.
Figure 29:
FIG. 29 depicts an exemplary schematic diagram of the configuration of various sub-page options of the graphic user interface shown in FIG. 4.

For example, as shown in FIG. 28, a user may access the following pages regardless of the navigation location within MMUI (150): Home, Info Center, Location, Rates, Service, Change of Address, and Inquiry. A user may continue to have access to these various pages even after selecting a certain page to view. For example, as shown in MMUI (150) and as seen in FIG. 4, the user is still able to select and then access other page options after selecting the Service page.

Figure 32:
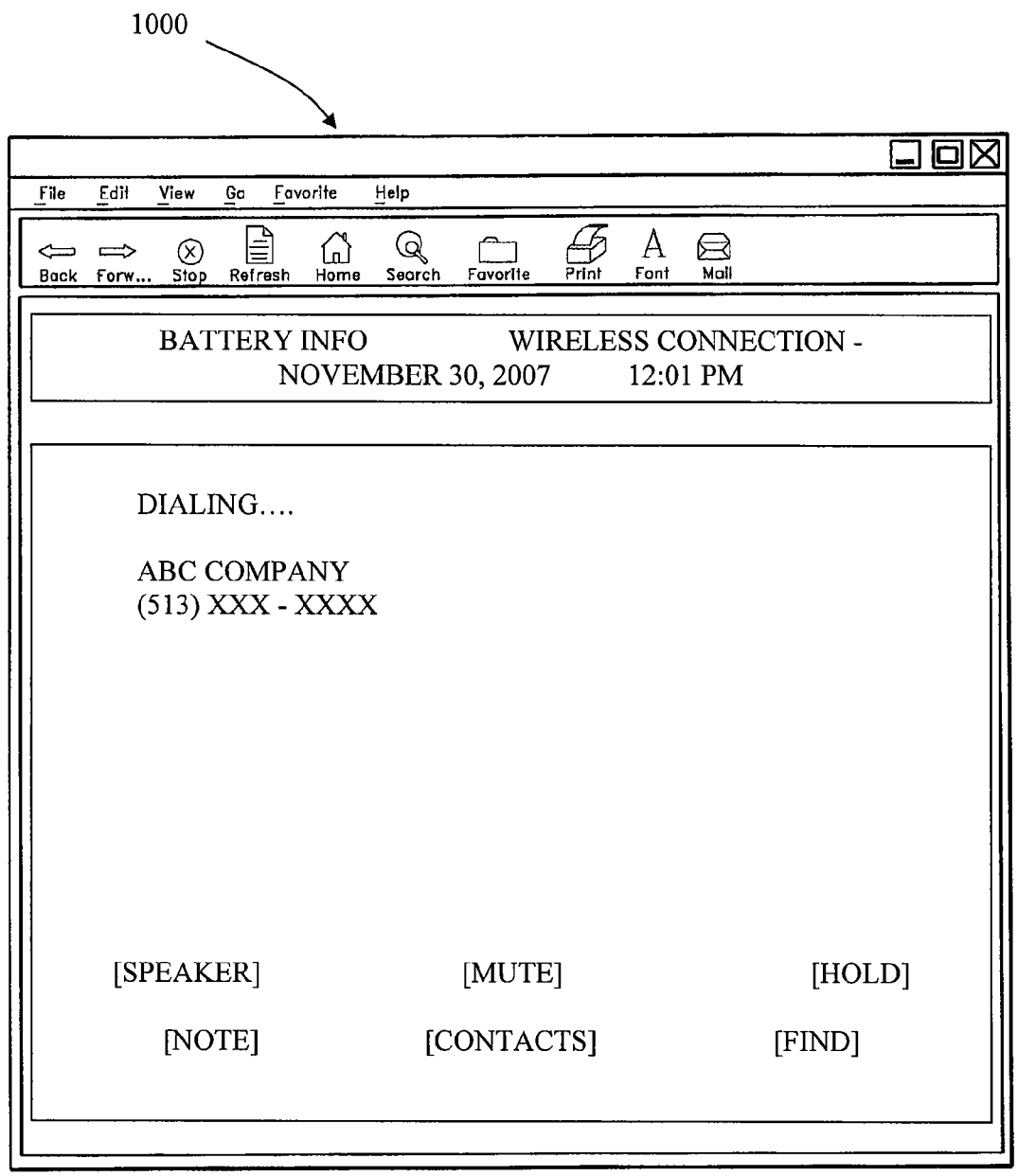
FIG. 32 depicts an exemplary access page of a multimodal user interface interacting with ABC company.
Figure 33:
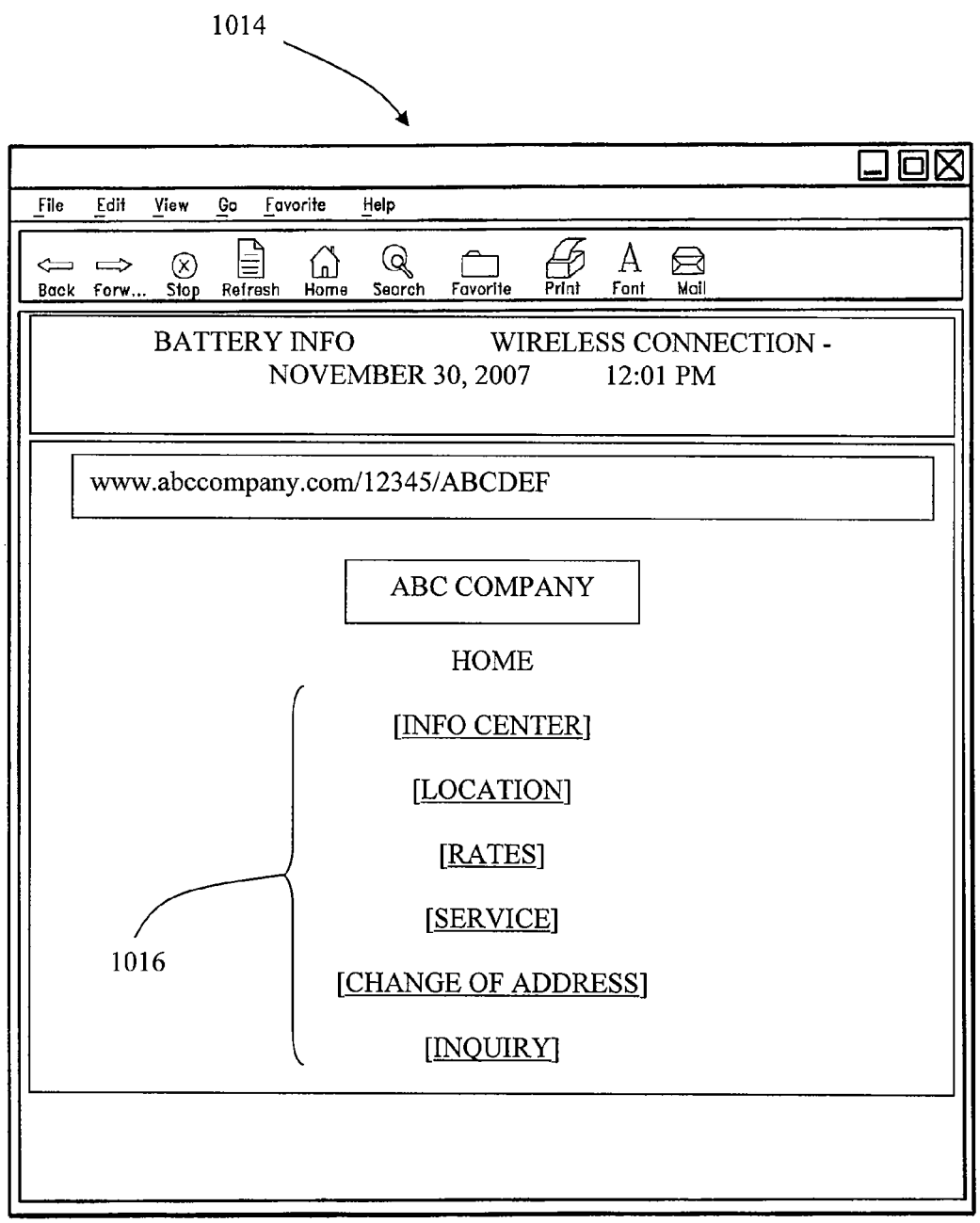
FIG. 33 depicts an exemplary main menu page of the multimodal user interface of FIG. 32.
Figure 34:
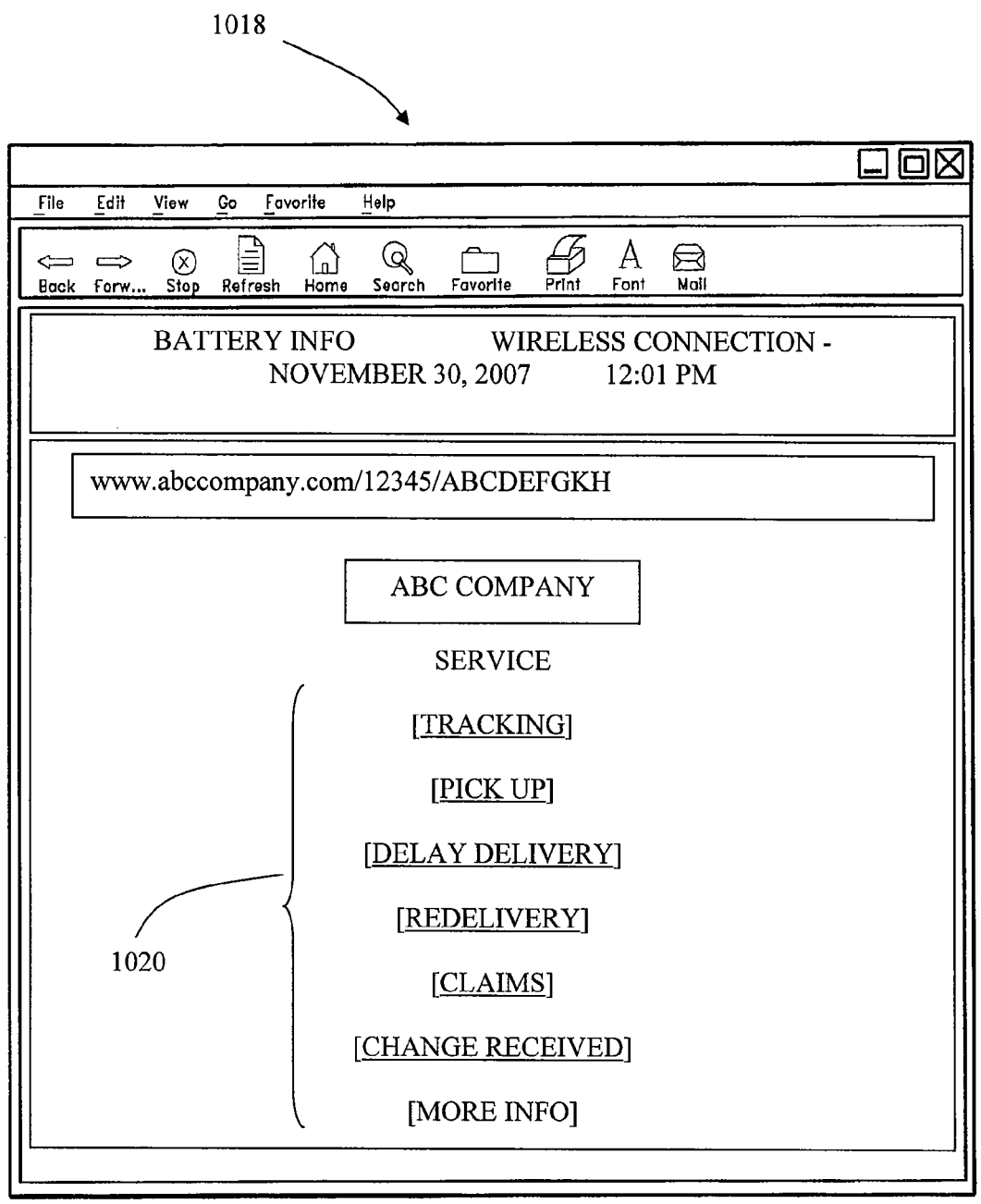
FIG. 34 depicts an exemplary service page of the multimodal user interface of FIG. 32.

An example of a sequence of user interfaces for MMUI (150), similar to those shown in FIGS. 20-22, are shown in FIGS. 32-34. As shown in FIG. 32, the application for MMUI (150) displays page (1000) as the user connects to MMUI (150). Upon connecting, home page (1014) appears as shown in FIG. 33. Interface (1014) displays a plurality of options (1016). In this example, options (1016) correspond to various components of MMUI (150). For example, options (1016) include the following: Info Center, Location, Rates, Service, Change of Address, and Inquiry. From this page, the user may select an option including for example "Service."

Upon selecting "Service" from the list of options (1016), the Service page (1018) appears along with a list of options (1020) as shown in FIG. 34. The user in this example inputs "Redelivery." So far, the user has interacted with this application by implicitly learning vocabulary and selecting from a series of options. At this point, the user has not populated any data entry fields or entered any data specific to the user (i.e. customer name, account number, etc.). As the user continues interacting with the application, the skill level may increase to some degree. This should not be understood as meaning that the skill level will always increase or that only steps requiring more skill are allowed.

Figure 35:
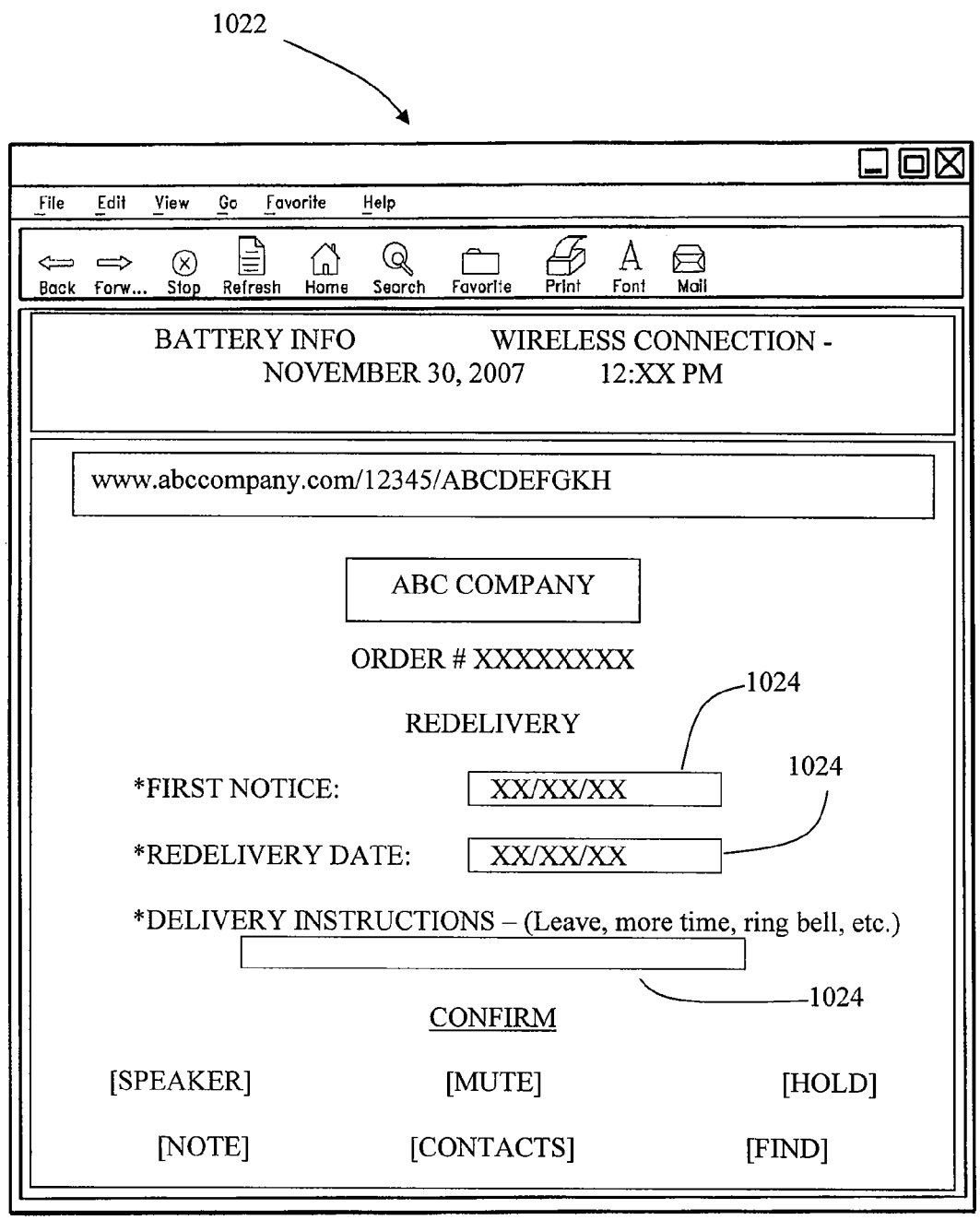
FIG. 35 depicts an exemplary redelivery of the multimodal user interface of FIG. 32.

After selecting "Redelivery," the Redelivery page (1022) shown in FIG. 35 appears. The user interacts with the Redelivery page to confirm and/or change the details of the redelivery. In this example, the user may use voice input to speak "same as before," or similar words. In this instance, the user will be notified that the delivery details will correspond to the first delivery (i.e. ring door bell, leave package, etc.). Alternatively, the user may populate the data fields (1024) relating to the date of notice, date of redelivery, and delivery instructions. The user may use any suitable technique or structure to adequately populate these fields including for example voice input. After interacting with page (1122), the user may confirm the actions taken by the user. It will understood by those skilled in the art that this example is being presented to demonstrate that MMUI (150) may be configured in this manner for purposes of implicitly training a user to operate the application in a streamlined manner as discussed above. The structure and content of the figures shown in FIG. 32-35 should not be limiting, but used only for exemplary purposes.

Variations on the degree of automation used in MMUI training are also possible. For example, training such as described herein could be provided in an automated manner (e.g., help wizards for a PDA or website; automated self-paced training; automated coaching, simulation and curricula for call center agent training, etc. . . . ). As mentioned, embodiments of this system may be applicable to various industries. For example, in the shipping industry, training may be performed for an application for handling a number of specific requests including trace requests, package misdelivery inquiries, and delay delivery requests. In the cable/broadband industry, training may be performed for an application handling a number of specific requests including, but not limited to, customer verification, installation request, change of service, bill explanation, make payment and transfer of service.

Different forms of presentation are also possible. For example, a computer program designed to present training as described herein could be represented by computer executable instructions stored on a computer readable medium, which could then be distributed to users of a MMUI, accessed by service providers who provide training, made available over a network, or provided in other manners. Of course, traditional training, such as provided by human coaches supplemented by visual aids (e.g., slides) is also possible. In a preferred embodiment, training modules may be presented in the sequence defined earlier so that the complexity levels addressed in each module build on prior concepts, and cover all aspects of successful execution of an MMUI-based application.

The structure of the training systems described above or any variations thereof may encompass or communicate with an Application Program Interface, otherwise referred to as an "API" which is well known in the art. Further, the structure of the training systems described above or any variations thereof may encompass or communicate with a wrapper where the wrapper translates one interface for a class into a compatible interface. The wrapper allows classes to work together that normally could not because of incompatible interfaces, by providing its interface to users while using the original interface. The wrapper translates calls to its interface into calls to the original interface, and the amount of code necessary to do this is typically small. The wrapper is also responsible for transforming data into appropriate forms. It will be understood by those skilled in the art that any suitable structure be may be used that is similar to an API or a wrapper for functional purposes.

The foregoing is intended to be illustrative only of potential techniques for training in the use of MMUIs, and that variations on the techniques described above could be implemented by those of ordinary skill in the art in light of this disclosure. Several of such potential modifications have been mentioned, and others will be apparent to those skilled in the art. For instance, the examples, embodiments, components, structures, steps, and the like discussed above are illustrative and are not required. Accordingly, the scope of the present invention should be considered in terms of the following claims and is understood not to be limited to the details of structure and operation shown and described in the specification and drawings.

What is claimed is:

1. a system for training a user of a multimodal user interface to use the multimodal user interface comprising:
　a computer usable medium having a computer readable program code embedded therein, wherein the computer readable program code is encoded with computer-executable instructions to:
　　provide a plurality of modules to the user of the multimodal user interface, wherein each module receives user interaction, the modules comprising:
　　　a basic concepts module that provides a description of the tools and functions that are used within the multimodal user interface;
　　　an advanced concepts module that provides the description of the tools and functions, and further provides exercises for using each of the tools and functions in a context of a specific situation or application;
　　　a service simulation module that provides simulated transactions performed using the multimodal user interface, wherein the simulated transactions utilize one or more of the tools and functions and comprise a user interactions with the multimodal user interface, and wherein the service simulation module provides feedback on performance of the simulated transactions;
　　　a coaching module that provides optimization and remediation techniques for real transactions performed using multimodal user interface, wherein the optimization and remediation techniques are based on a user's interaction with at least one of the basic concepts module, the advanced concepts module, and the service simulation module;
　and an electronic device operable to communicate with the computer usable medium and display the modules, wherein the electronic device comprises at least one instrument configured to allow the user to interact with the modules, wherein the modules are configured to present instructions to the user to operate the multimodal user interface in a streamlined manner, wherein the streamlined manner of operation comprises the ability to navigate the multimodal user interface non-sequentially based on data provided by the user.

2. The system of claim 1, wherein:
　the basic concepts module, the advanced concepts module, and the service simulation module are each operable to store information relating to the user's interaction with the respective module;
　for each of the basic concepts module, the advanced concepts module, and the service simulation module, the users interaction with each module comprises a communication of information between the respective module and the user, which communication occurs after the user is provided with the respective module.

3. The system of claim 1, wherein:
　the tools comprise a push to talk tool;
　the advanced concepts module is operable to list terms and phrases specific to the operation of the multimodal user interface; and
　the service simulation module is operable to simulate a caller and store information with respect to user interaction with the simulated caller.

4. The system of claim 1, wherein each of the modules is operable to, upon completion of the user's interaction with each module, assess whether the user is qualified to at least one of:
　advance to another module; and
　interact with another human entity via the multimodal user interface.

5. The system of claim 4, wherein each of the modules is operable to:
upon completion of the user's interaction with each module, provide a set of assessment questions to the user;
analyze the user's answers to the set of assessment questions to determine whether the user has met a threshold standard to advance to a next sequential module, wherein:
the advanced concepts module is the next sequential module after the basic concepts module;
the service simulation module is the next sequential module after the advanced concepts module; and
the coaching module is the next sequential module after the service simulation module.

6. The system of claim 1, wherein:
the coaching module is based on a real use of the multimodal user interface comprising an interaction between the user and a real human entity; and
the coaching module is operable to permit the user to interact with a real caller.

7. The system of claim 1, wherein:
the service simulation module is based on a simulated use of the multimodal user interface comprising an interaction between the user and a simulated human entity; and
the service simulation module is operable to permit the user to interact with a simulated caller.

8. The system of claim 1, wherein at least one of the basic concepts module, the advanced concepts module, and the service simulation module is operable to score the user based on the user's interaction with the respective module.

9. The system of claim 1, wherein the computer readable program code is further encoded with computer-executable instructions to provide a debrief and remediation module to the user, wherein the debrief and remediation module is operable to:
gather data regarding use of the multimodal user interface by the user;
assess a need for additional customized training for the user based on the gathered data; and
provide, based on analysis of the gathered data, recommendations regarding modifications to at least one of the multimodal user interface, the basic concepts module, the advanced concepts module, the service simulation module, or the coaching module.

10. The system of claim 1, wherein the electronic device comprises one of a personal digital assistant or a third-generation telephone.

11. A method for training a user of a multimodal user interface to use the multimodal user interface, comprising the steps of:
providing a plurality of modules to the user of the multimodal user interface, the providing of the modules comprising:
providing a basic concepts module that provides a description of the tools and functions that are used within the multimodal user interface;
providing an advanced concepts module that provides the description of the tools and functions, and further provides exercises for using each of the tools and functions in a context of a specific situation or application;
providing a service simulation module that simulates transactions performed using the multimodal user interface wherein simulated transactions utilize one or more of the tools and functions and comprise user interactions with the multimodal user interface, and wherein the service simulation module provides feedback on performance of the simulated transactions;
providing a coaching module that provides optimization and remediation techniques for real transactions performed using multimodal user interface, wherein the optimization and remediation techniques are based on a user's interactions between the user and at least one of the basic concepts module, advanced concepts module, or service simulation module;
displaying one or more of the modules on the electronic device; and
via the modules, presenting instructions to the user to operate the multimodal user interface in a streamlined manner, wherein the streamlined manner of operation comprises the ability to navigate the multimodal user interface non-sequentially based on data provided by the user.

12. The method of claim 11, wherein;
the method further comprises storing user-specific information relating to the user's interaction with each module;
the optimization and remediation techniques are based upon the stored user-specific information.

13. The method of claim 11, wherein:
the tools comprise a push to talk tool;
the step of providing the advanced concepts module comprises listing terms and phrases specific to the operation of the multimodal user interface; and
the simulated transactions comprise simulating a caller and storing information with respect to an interaction between the user and the simulated caller.

14. The method of claim 11, further comprising, for each of the modules the user interacts with, assessing whether the user is qualified to at least one of:
advance to another module; and
use the multimodal user interface in a live interaction with another human.

15. The method of claim 14, further comprising, for each of the modules the user interacts with:
providing a set of assessment questions to the user upon completion of the user's interaction with each module;
analyzing the user's answers to the set of assessment questions;
based on the analysis of the user's answers, determining whether the user has met a threshold standard;
based on whether the user has met the threshold standard, determining whether the user is qualified to advance to a next sequential module, wherein:
the advanced concepts module is the next sequential module after the basic concepts module;
the service simulation module is the next sequential module after the advanced concepts module; and
the coaching module is the next sequential module after the service simulation module.

16. The method of claim 11, wherein the optimization and remediation techniques are based on use of the multimodal user interface in an interaction between the user and a live human caller.

17. The method of claim 11, wherein the coaching module is further based on a simulated use of the multimodal interface by the user comprising an interaction between the user and a simulated caller.

18. The method of claim 11, further comprising scoring the user based on the user's interaction with each of the modules.

19. The method of claim 11, further comprising:
gathering data regarding the use of the multimodal user interface by the user;

assessing a need for additional customized training for the user based on the gathered data; and analyzing the gathered data to provide recommendations regarding modifications to at least one of the multimodal user interface, the basic concepts module, the advanced concepts module, the service simulation module, or the coaching module.

20. The method of claim 11, wherein the electronic device comprises one of a personal digital assistant or a third-generation telephone.

21. A system for training a user of a multimodal user interface to use the multimodal user interface through interaction with the multimodal user interface, comprising:

a computer usable medium having a computer readable program code embedded therein, wherein the computer readable program code is encoded with computer-executable instructions to:

provide a plurality of modules top the user of the multimodal user interface, the modules comprising:

a basic concepts module that provides a description of the tools and functions that are used within the multimodal user interface;

an advanced concepts module that provides the description of the tools and functions, and further provides exercises for using each of the tools and functions in a context of a specific situation or application;

a service simulation module that provides simulated transactions performed using the multimodal user interface, wherein simulated transactions utilize one or more of the tools and functions and comprise user interactions with the multimodal user interface, and wherein the service simulation module provides feedback on performance of the simulated transactions;

a coaching module that provides optimization and remediation techniques for real transactions performed using multimodal user interface, wherein the optimization and remediation techniques are based on a user's interaction with at least one of the basic concepts module, advanced concepts module, and service simulation module; and an electronic device operable to communicate with the computer usable medium and display the modules, wherein the electronic device comprises at least one instrument configured to allow the user to interact with the modules; and wherein the multimodal user interface comprises a serial sequence of user interfaces, and wherein the modules are configured to present instructions to the user about operating the multimodal user interface in a streamlined manner such that, based on data provided by the user, the multimodal user interface is configured to vary the serial sequence of user interfaces to present a varied sequence of navigation of the user interfaces to the user that is different from the serial sequence of navigation of the user interfaces.

22. The system of claim 1, wherein the multimodal user interface comprises a serial sequence of user interface screens configured to operate in a serial, non-streamlined manner, and wherein the modules are configured to vary the serial sequence of the user interface screens.

23. The system of claim 22, wherein each of the user interface screens comprise a serial sequence of steps and wherein, in the streamlined manner, the modules are configured to vary the serial sequence of the steps.

24. The system of claim 1, wherein the multimodal user interface comprises a serial sequence of user interface screens such that, in a non-streamlined manner, each user interface screen follows a preceding user interface screen in a predetermined sequence, and wherein, in the streamlined manner, the multimodal user interface is configured to vary the serial sequence of the user interface screens.

25. The system of claim 1, wherein the simulated transactions via the service simulation module are configured to test a user's interaction with a simulated multimodal user interface.

* * * * *